(12) United States Patent
Roth et al.

(10) Patent No.: US 9,367,697 B1
(45) Date of Patent: Jun. 14, 2016

(54) DATA SECURITY WITH A SECURITY MODULE

(71) Applicant: Amazon Technologies, Inc., Reno, NV (US)

(72) Inventors: Gregory Branchek Roth, Seattle, WA (US); Matthew James Wren, Seattle, WA (US); Eric Jason Brandwine, Haymarket, VA (US); Brian Irl Pratt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 260 days.

(21) Appl. No.: 13/765,020

(22) Filed: Feb. 12, 2013

(51) Int. Cl.
*G06F 21/00* (2013.01)
*G06F 21/60* (2013.01)
(52) U.S. Cl.
CPC ..................... *G06F 21/602* (2013.01)
(58) Field of Classification Search
CPC ....... G06F 11/30; G06F 21/10; H04L 9/3249; G11B 20/00086; G11B 20/00115; G11B 20/0021; G11B 20/00231; G11B 20/00246; G11B 20/00253; G11B 20/00449; G11B 20/00818
USPC .................. 713/164, 176, 167, 189
See application file for complete search history.

(56) References Cited

U.S. PATENT DOCUMENTS

| | | | |
|---|---|---|---|
| 4,868,877 A | 9/1989 | Fischer | |
| 4,918,728 A | 4/1990 | Matyas et al. | |
| 5,146,498 A | 9/1992 | Smith | |
| 5,201,000 A | 4/1993 | Matyas et al. | |
| 5,495,533 A | 2/1996 | Linehan et al. | |
| 6,240,187 B1 | 5/2001 | Lewis | |
| 6,546,492 B1 | 4/2003 | Walker et al. | |
| 7,490,248 B1 | 2/2009 | Valfridsson et al. | |
| 7,565,419 B1 | 7/2009 | Kwiatkowski | |
| 7,620,680 B1 | 11/2009 | Lamport | |
| 7,774,826 B1 | 8/2010 | Romanek et al. | |
| 7,877,607 B2 | 1/2011 | Circenis et al. | |
| 7,953,978 B2 | 5/2011 | Greco | |
| 8,024,582 B2 | 9/2011 | Kunitz et al. | |
| 8,091,125 B1 | 1/2012 | Hughes et al. | |
| 8,111,828 B2 | 2/2012 | Raman et al. | |

(Continued)

FOREIGN PATENT DOCUMENTS

| | | |
|---|---|---|
| JP | 2000295209 | 10/2000 |
| WO | WO2011/083343 | 7/2011 |

OTHER PUBLICATIONS

International Search Report and Written Opinion mailed Apr. 29, 2014, in International Patent Application No. PCT/US2014/015404, filed Feb. 7, 2014.

(Continued)

*Primary Examiner* — Mohammad A Siddiqi
(74) *Attorney, Agent, or Firm* — Davis Wright Tremaine LLP

(57) ABSTRACT

A security module securely manages keys. The security module is usable to implement a cryptography service that includes a request processing component. The request processing component responds to requests by causing the security module to perform cryptographic operations that the request processing component cannot perform due to a lack of access to appropriate keys. The security module may be a member of a group of security modules that securely manage keys. Techniques for passing secret information from one security module to the other prevent unauthorized access to secret information.

30 Claims, 27 Drawing Sheets

(56) References Cited

U.S. PATENT DOCUMENTS

| | | |
|---|---|---|
| 8,140,847 B1 | 3/2012 | Wu |
| 8,245,037 B1 | 8/2012 | Durgin et al. |
| 8,261,320 B1 | 9/2012 | Serenyl et al. |
| 8,302,170 B2 | 10/2012 | Kramer et al. |
| 8,607,358 B1 | 12/2013 | Shankar et al. |
| 8,713,311 B1 | 4/2014 | Roskind |
| 8,751,807 B2 | 6/2014 | Ma et al. |
| 8,804,950 B1 | 8/2014 | Panwar |
| 8,904,181 B1 * | 12/2014 | Felsher et al. ............... 713/171 |
| 2002/0141590 A1 | 10/2002 | Montgomery |
| 2003/0093694 A1 | 5/2003 | Medvinsky |
| 2003/0131238 A1 | 7/2003 | Vincent |
| 2003/0163701 A1 | 8/2003 | Ochi |
| 2003/0172269 A1 | 9/2003 | Newcombe |
| 2003/0188188 A1 | 10/2003 | Padmanabhan et al. |
| 2004/0009815 A1 | 1/2004 | Zotto |
| 2004/0093499 A1 | 5/2004 | Arditi et al. |
| 2004/0107345 A1 | 6/2004 | Brandt et al. |
| 2004/0193915 A1 | 9/2004 | Smith et al. |
| 2004/0223608 A1 | 11/2004 | Oommen et al. |
| 2005/0010760 A1 | 1/2005 | Goh et al. |
| 2005/0120232 A1 * | 6/2005 | Hori et al. ............... 713/193 |
| 2005/0165859 A1 | 7/2005 | Geyer et al. |
| 2005/0246778 A1 | 11/2005 | Usov et al. |
| 2006/0010323 A1 | 1/2006 | Martin |
| 2006/0018468 A1 | 1/2006 | Toba et al. |
| 2006/0021018 A1 | 1/2006 | Hinton et al. |
| 2006/0204003 A1 | 9/2006 | Takata et al. |
| 2006/0206932 A1 | 9/2006 | Chong |
| 2006/0291664 A1 | 12/2006 | Suarez |
| 2007/0033637 A1 | 2/2007 | Yami |
| 2007/0050641 A1 | 3/2007 | Flynn et al. |
| 2007/0180153 A1 | 8/2007 | Cornwell et al. |
| 2007/0230706 A1 * | 10/2007 | Youn ............... 380/277 |
| 2007/0283446 A1 | 12/2007 | Yami |
| 2008/0019527 A1 | 1/2008 | Youn et al. |
| 2008/0025514 A1 | 1/2008 | Coombs |
| 2008/0046984 A1 | 2/2008 | Bohmer et al. |
| 2008/0084996 A1 | 4/2008 | Chen |
| 2008/0112561 A1 | 5/2008 | Kim |
| 2008/0127279 A1 | 5/2008 | Futa et al. |
| 2008/0172562 A1 | 7/2008 | Cachin |
| 2008/0298590 A1 | 12/2008 | Katar et al. |
| 2008/0319909 A1 | 12/2008 | Perkins et al. |
| 2009/0025087 A1 | 1/2009 | Peirson, Jr. et al. |
| 2009/0034733 A1 | 2/2009 | Raman et al. |
| 2009/0158033 A1 | 6/2009 | Jeong et al. |
| 2009/0165076 A1 | 6/2009 | Decusatis et al. |
| 2009/0276514 A1 | 11/2009 | Subramanian |
| 2009/0300356 A1 | 12/2009 | Crandell |
| 2010/0008499 A1 | 1/2010 | Lee et al. |
| 2010/0014662 A1 | 1/2010 | Jutila |
| 2010/0017626 A1 | 1/2010 | Sato et al. |
| 2010/0138218 A1 | 6/2010 | Geiger |
| 2010/0211781 A1 | 8/2010 | Auradkar et al. |
| 2010/0303241 A1 | 12/2010 | Breyel |
| 2010/0316219 A1 | 12/2010 | Boubion et al. |
| 2010/0325732 A1 | 12/2010 | Mittal et al. |
| 2011/0116636 A1 | 5/2011 | Steed |
| 2011/0154057 A1 | 6/2011 | England et al. |
| 2011/0173435 A1 | 7/2011 | Liu et al. |
| 2011/0191462 A1 | 8/2011 | Smith |
| 2011/0213971 A1 | 9/2011 | Gurel |
| 2011/0246765 A1 * | 10/2011 | Schibuk ............... 713/158 |
| 2011/0258443 A1 | 10/2011 | Barry |
| 2012/0079289 A1 * | 3/2012 | Weng et al. ............... 713/193 |
| 2012/0134495 A1 * | 5/2012 | Liu ............... 380/46 |
| | | ............... 380/46 |
| 2012/0140923 A1 | 6/2012 | Lee |
| 2012/0191979 A1 | 7/2012 | Feldbau |
| 2012/0198042 A1 | 8/2012 | Dunbar et al. |
| 2012/0204032 A1 | 8/2012 | Wilkins et al. |
| 2012/0260094 A1 | 10/2012 | Asim et al. |
| 2012/0266218 A1 | 10/2012 | Mattsson |
| 2012/0290850 A1 | 11/2012 | Brandt et al. |
| 2012/0291101 A1 * | 11/2012 | Ahlstrom et al. ............... 726/4 |
| 2012/0300936 A1 * | 11/2012 | Green ............... 380/278 |
| 2012/0303961 A1 | 11/2012 | Kean et al. |
| 2012/0311675 A1 | 12/2012 | Ham |
| 2012/0314854 A1 | 12/2012 | Waters |
| 2012/0323990 A1 | 12/2012 | Hayworth |
| 2013/0044878 A1 | 2/2013 | Rich et al. |
| 2013/0157619 A1 | 6/2013 | Di Luoffo et al. |
| 2013/0159732 A1 | 6/2013 | Leoutsarakos |
| 2013/0163753 A1 | 6/2013 | MacMillan et al. |
| 2013/0316682 A1 | 11/2013 | Vieira |
| 2013/0326233 A1 | 12/2013 | Tolfmans |
| 2014/0012751 A1 * | 1/2014 | Kuhn et al. ............... 705/41 |
| 2014/0122866 A1 | 5/2014 | Haeger |
| 2014/0164774 A1 | 6/2014 | Nord |
| 2014/0177829 A1 | 6/2014 | MacMillan et al. |

OTHER PUBLICATIONS

International Search Report and Written Opinion mailed May 30, 2014, International Patent Application No. PCT/US2014/015414, filed Feb. 7, 2014.

International Search Report and Written Opinion mailed May 30, 2014, in International Patent Application No. PCT/US2014/015408, filed Feb. 7, 2014.

International Search Report and Written Opinion mailed May 30, 2014, in International Patent Application No. PCT/US2014/015410, filed Feb. 7, 2014.

International Search Report and Written Opinion mailed May 28, 2014, in International Patent Application No. PCT/US2014/15697, filed Feb. 11, 2014.

Bethencourt et al., "Ciphertext-Policy Attribute-Based Encryption," IEEE Symposium on Security and Privacy 2007, 15 pages.

"IEEE P1363," Wikipedia, The Free Encyclopedia, <https://en.wikipedia.org/wiki/IEEE_P1363> [retrieved Sep. 22, 2015], 3 pages.

"Key Derivation Function," Wikipedia, The Free Encyclopedia, <https://en.wikipedia.org/wiki/Key_derivatin_function> [retrieved Sep. 22, 2015], 4 pages.

Krawczyk, H. et al., "HMAC-based Extract-and-Expand Key Derivation Function (HKDF)," Request for Comments: 5869, Informational, May 2010, 14 pages.

Microprocessor Standards Committee, "IEEE P1363.3/D1 Draft Standard for Identity-Based Public-Key cryptography Using Pairings," Apr. 2008, <http://grouper.ieee.org/groups/1363/IBC/material/P1363.3-D1-200805.pdf> [retrieved Sep. 22, 2015], 85 pages.

Rescorla, E., "Diffie-Hellman Key Agreement Method," Request for Comments: 2631, Standards Track, Jun. 1999, 13 pages.

Sieloff, D., "The New Systems Administrator: The Role of Becoming Root," Inside Solaris 8(10); Oct. 6-9, 2002.

\* cited by examiner

DATA SECURITY WITH A SECURITY MODULE

CROSS REFERENCE TO RELATED APPLICATIONS

This application incorporates by reference for all purposes the full disclosure of co-pending U.S. patent application Ser. No. 13/764,944, filed concurrently herewith, entitled "AUTOMATIC KEY ROTATION", co-pending U.S. patent application Ser. No. 13/764,995, filed concurrently herewith, entitled "POLICY ENFORCEMENT WITH ASSOCIATED DATA", co-pending U.S. patent application Ser. No. 13/764,963, filed concurrently herewith, entitled "DATA SECURITY SERVICE", co-pending U.S. patent application Ser. No. 13/765,209, filed concurrently herewith, entitled "FEDERATED KEY MANAGEMENT", co-pending U.S. patent application Ser. No. 13/765,239, filed concurrently herewith, entitled "DELAYED DATA ACCESS", co-pending U.S. patent application Ser. No. 13/765,265, filed concurrently herewith, entitled "DATA SECURITY SERVICE", and co-pending U.S. patent application Ser. No. 13/765,283, filed concurrently herewith, entitled "SECURE MANAGEMENT OF INFORMATION USING A SECURITY MODULE".

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

BRIEF DESCRIPTION OF THE DRAWINGS

Various embodiments in accordance with the present disclosure will be described with reference to the drawings, in which.

DETAILED DESCRIPTION

Figure 1:
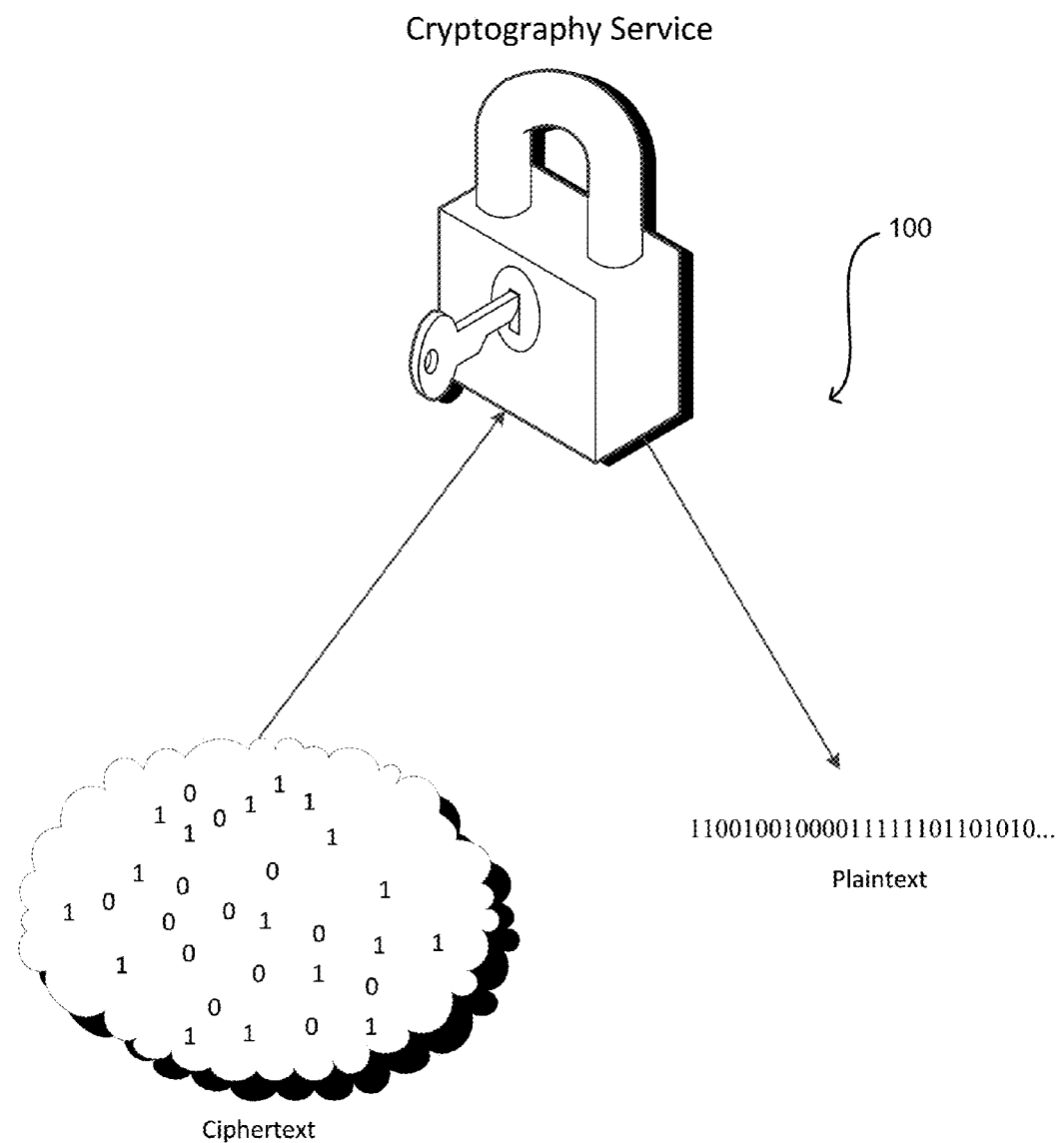
FIG. 1 shows an illustrative diagram representing various aspects of the present disclosure in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein allow for enhanced data security in environments involving distributed computing resources. In one example, a distributed computing environment includes one or more data services which may be implemented by appropriate computing resources. The data services may allow various operations to be performed in connection with data. As one illustrative example, the distributed computing environment includes one or more data storage services. Electronic requests may be transmitted to the data storage service to perform data storage operations. Example operations are operations to store data using the data storage service and using the data storage service to retrieve data stored by the data storage service. Data services, including data storage services, may also perform operations that manipulate data. For example, in some embodiments, a data storage service is able to encrypt data.

Various embodiments of the present disclosure include distributed computing environments that include cryptography services that are implemented using appropriate computing resources. A cryptography service may be implemented as a computer system that receives and responds to electronic requests to perform cryptographic operations, such as encryption of plaintext and decryption of ciphertext. In some embodiments, a cryptography service manages keys. In response to a request to perform a cryptographic operation, the cryptography service may select an appropriate key to perform the cryptographic operation, perform the cryptographic operation, and provide one or more results of the cryptographic operation in response to the received request.

In some embodiments, the cryptography service manages keys for multiple tenants of a computing resource service provider. A tenant of the computing resource may be an entity (e.g., organization or individual) operating as a customer of the computing resource provider. The customer may remotely and programmatically configure and operate resources that are physically hosted by the computing resource provider. When a customer submits a request to the cryptography service to perform a cryptographic operation (or when an entity submits a request to the cryptography service), the cryptography service may select a key managed by the cryptography service for the customer to perform the cryptographic operation. The keys managed by the cryptography service may be securely managed so that other users and/or data services do not have access to the keys of others. A lack of access by an entity (e.g., user, customer, service) to the key of another entity may mean that the entity does not have an authorized way of obtaining the key of the other and/or that the entity does not have an authorized way of causing a system that manages the key of the other of using the key at the entity's direction. For example, the cryptography service may manage keys so that, for a customer, other customers both do not have access to the customer's key(s) and are unable to cause the cryptography service to use the customer's key(s) to perform cryptographic operations. As another example, the cryptography service may manage keys so that other services, such as a data storage service, are unable to cause the cryptography service to use some or all keys to perform cryptographic operations. Unauthorized access to a key may be prevented by appropriate security measures so that, for example, unauthorized access is difficult or impossible. Difficulty may be due to computational impracticality and/or due to a need for an unauthorized (e.g., illegal, tortious and/or otherwise disallowed such as a. compromise of authorization credentials) to occur for access to be gained. Systems in accordance with the various embodiments may be configured to ensure an objective measure of computational impracticality to gain access to a key. Such measures may be, for example, measured in terms of an amount of time, on average, it would take a computer having a defined unit of computational ability (e.g., certain operations per unit of time) to crack encrypted information needed for authorized access to the key.

As noted, a cryptography service may receive requests from various entities, such as customers of a computing resource provider. A cryptography service may also receive requests from entities internal to the computing resource provider. For example, in some embodiments, data services implemented by the computing resource provider may transmit requests to a cryptography service to cause the cryptography service to perform cryptographic operations. As one example, a customer may transmit a request to a data storage service to store a data object. The request may indicate that the data object should be encrypted when stored. The data storage service may communicate a request to a cryptography service to perform a cryptographic operation. The cryptographic operation may be, for example, encryption of a key used by the data storage service to encrypt the data object. The cryptographic operation may be encryption of the data object itself.

Systems in accordance with the various embodiments implement various security measures to provide enhanced data security. For example, in various embodiments, the manner in which a cryptography service can utilize keys it manages is limited. For example, in some embodiments, a cryptography service is configured to only use a key corresponding to a customer upon appropriate authorization. If a request to use a customer's key purportedly originates from the customer (i.e., from a computing device operating on behalf of the customer), the cryptography service may be configured to require that the request be electronically (digitally) signed using appropriate credentials owned by the customer. If the request to use the customer's key originated from another data service, the cryptography service may be configured to require that the data service provide proof that a signed request to the data service has been made by the customer. In some embodiments, for example, the data service is configured to obtain and provide a token that serves as proof of an authenticated customer request. Other security measures may also be built into a configuration of an electronic environment that includes a cryptography service. For example, in some embodiments, a cryptography service is configured to limit key use according to context. As one illustrative example, the cryptography service may be configured to use a key for encryption for requests from a customer or from a data service acting on behalf of the customer. However, the cryptography service may be configured to only use a key for decryption for requests from the customer (but not from another data service). In this manner, if the data service is compromised, the data service would not be able to cause the cryptography service to decrypt data.

Various security measures may be built into a cryptography service and/or its electronic environment. Some security measures may be managed according to policies which, in some embodiments, are configurable. As one example, a cryptography service may utilize an application programming interface (API) that enables users to configure policies on keys. A policy on a key may be information that, when processed by a cryptography service, is determinative of whether the key may be used in certain circumstances. A policy may, for instance, limit identities of users and/or systems able to direct use of the key, limit times when the key can be used, limit data on which the key can be used to perform cryptographic operations on, and provide other limitations. The policies may provide explicit limitations (e.g., who cannot use the keys) and/or may provide explicit authorizations (e.g., who can use the keys). Further, policies may be complexly structured to generally provide conditions for when keys can and cannot be used. When a request to perform a cryptographic operation using a key is received, any policies on the key may be accessed and processed to determine if the request can, according to policy, be fulfilled.

Cryptography services in accordance with the various embodiments utilize security modules for the secure management of keys and/or other secret information. A security module may be a hardware device configured to receive and respond to requests to perform cryptographic operations. The security module may perform the cryptographic operations using keys that the security module securely stores. The keys may be stored on behalf of customers of a computing resource provider to enable customers of the computing resource provider. For example, each customer may have one or more keys, each identified by an identifier for the key. A customer may request that a cryptographic operation be performed using a key that the customer specifies. In response, a cryptography service of the computing resource provider may instruct an appropriate security module to use the specified key to perform the requested cryptographic operation.

A security module may be constructed in a variety of ways in accordance with the various embodiments. For example, a security module may be constructed to have appropriate hardware for performing its various operations. As an example, a security module may have a processor, a storage device, one or more interfaces for communicating with the security module and appropriate circuitry for electronically connecting the various components. Such components, in an embodiment, may comprise commodity components that are generally less costly and easier to obtain (and/or replace with other commodity components), thereby providing enhanced flexibility and scalability in a computing resource environment. As an example, processors often have different internal architectures that are used to implement the same instruction set architecture. Accordingly, executable instructions (which may be encoded on computer-readable media) may be configured to use any suitable processor implementing the same instruction set architecture. Similarly, different storage devices may be configured to operate using the same instruction sets despite having different internal components (e.g., firmware, processors, chipsets and the like). Use of commodity hardware also provides advantages in that the use of conventional, commercially available security modules (such as hardware security modules (HSMs)) can be avoided. Because many conventional HSMs do not follow consistent standards, a computing resource provider or other use of a security module can avoid being tied to a particular manufacturer by utilizing security modules in accordance with the embodiments discussed herein. This provides needed security and freedom, benefiting both users of security modules and their customers. Further, the use of commodity hardware allows for repurposing general purpose computers to operate as security modules and vice versa.

Hardware of security modules in accordance with the various embodiments can be used in particular ways that allows for enhanced security. For example, a security module may utilize a processer register (comprising volatile memory) or other volatile memory to store one or more keys. In this manner, events, such as reboots and power losses that cause the volatile memory to lose power, also cause a loss of access to the keys stored in the volatile memory. As another example, a persistent storage device, such as a solid state or other drive, may be configured with an inherent ability to permanently erase information stored thereon. Certain events, such as a reboot, power loss, or command to enter an administrative "service" mode may cause the storage device to securely erase the information. One or more sensors may be configured to detect intrusion into a housing of the security module. The sensors may be configured to cause the storage device to erase data stored therein upon detection of an intrusion event. When secret data is erased, providing the secret data back to the security module may require a process configured to provide the data without compromising its security.

A cryptography service in accordance with the various embodiments is configured to utilize a plurality of security modules to store a set of keys. Each security module may store the same set of keys, although in some embodiments, each security module may store a different partition of a set of keys so that the security modules collectively store a set of keys. The partitions may, in some embodiments, overlap and some security modules may store the same partition. When multiple security modules are used to store a set of customer keys, the security modules can be said to be part of a cryptographic domain. Use of the cryptographic domain can increase both security and provide enhanced flexibility and usability.

For example, in some embodiments, multiple security modules can be used to securely provide a set of keys from one security module to the other. For instance, each security module may be provided with a common key, which may be referred to as a domain key. A security module may encrypt a set of keys using the domain key and provide the encrypted keys to another security module, which can use its own copy of the domain key to decrypt the keys. A domain key may be provided to a security module using secure transfer methods, such as public-key key exchange algorithms. As one example, a security module can use a public key of another security module to encrypt the domain key. The encrypted domain key can be transferred (e.g., over a network) to the other security module which can then use a corresponding private key to decrypt the domain key. In this manner, the domain key is never accessible except when in possession of an appropriately configured security module. Various other security measures, such as conditions on quorums of operators of security modules may also be utilized in accordance with the various embodiments.

In various embodiments, a security module is configured to be updatable. Updates may include updating code according to which the security module operates to improve performance, fix bugs and/or for other reasons. Other updates, such as changing software settings and/or replacing hardware components are also considered as being within the scope of the present disclosure. To prevent unauthorized access to secrets stored in a security module, security modules may be configured to be updatable only when they lack access to secrets, because they do not have secrets stored and/or because they have secrets stored only in encrypted form without access to a key needed for decryption. In this manner, unauthorized access to the contents of memory of a security module may be prevented. After a security module is updated, secret information may be obtained, e.g., from another security module or from an HSM used for backup and/or temporary storage during updating, and provided to the updated security module. With access to the secret information, the security module may reject or simply not be able to receive administrative requests that may compromise the information inside. In this manner, a cryptography service utilizing security modules in accordance with the various embodiments may include a serviceable component (e.g., a frontend and request processing subsystem) and another component that is not serviceable while secret information is stored using the other component.

FIG. 1 is an illustrative diagram 100 demonstrating various embodiments of the present disclosure. In an embodiment, a cryptography service performs cryptographic operations which may include application of one or more calculations in accordance with one or more cryptographic algorithms. As illustrated in FIG. 1, the cryptography service enables a user or a service to generate plaintext from ciphertext. In an example configuration the cryptographic service can be used to encrypt/decrypt keys and these keys can be used to encrypt/decrypt data, such as data stored in a data storage service. For example, the cryptography service receives a request to generate plaintext from ciphertext encrypted under a key. The cryptography service determines that the requestor is an authorized entity; decrypts the key using a master key and returns the now decrypted key to the service, which can generate plaintext from the ciphertext using the decrypted key. In another configuration, the cryptography service receives ciphertext and processes the received ciphertext into plaintext which is provided as a service by the cryptography service. In this example, the ciphertext may be provided to the cryptography service as part of an electronic request to the cryptography service from an authorized entity, which may be a customer of a computing resource provider that operates the cryptography service and/or which may be another service of the computing resource provider. The cryptography service illustrated in FIG. 1 may utilize one or more cryptographically strong algorithms to encrypt data. Such cryptographically strong algorithms may include, for example, Advanced Encryption Standard (AES), Blowfish, Data Encryption Standard (DES), Triple DES, Serpent or Twofish, and depending on the specific implementation selected, may be either asymmetric or symmetric key systems. Generally, the cryptography service may utilize any encryption and/or decryption algorithm (cipher) or combination of algorithms that utilizes data managed by the cryptography service.

As will be discussed below in more detail, the cryptography service can be implemented in a variety of ways. In an embodiment, the cryptography service is implemented by a computer system configured in accordance with the description below. The computer system may itself comprise one or more computer systems. For example, a cryptography service may be implemented as a network of computer systems collectively configured to perform cryptographic operations in accordance with the various embodiments. Or put another way, the computer system could be a distributed system. In an embodiment, ciphertext is information that has been encrypted using a cryptographic algorithm. In the example of FIG. 1, the ciphertext is the plaintext in an encrypted form. The plaintext may be any information and while the name includes no word text, plaintext and ciphertext may be information encoded in any suitable form and does not necessarily include textual information but it may include textual information. For example, as illustrated in FIG. 1, plan text and ciphertext comprise sequences of bits. Plaintext and ciphertext may also be represented in other ways and generally in any manner by which encryption and decryption can be performed by a computer system.

Figure 2:
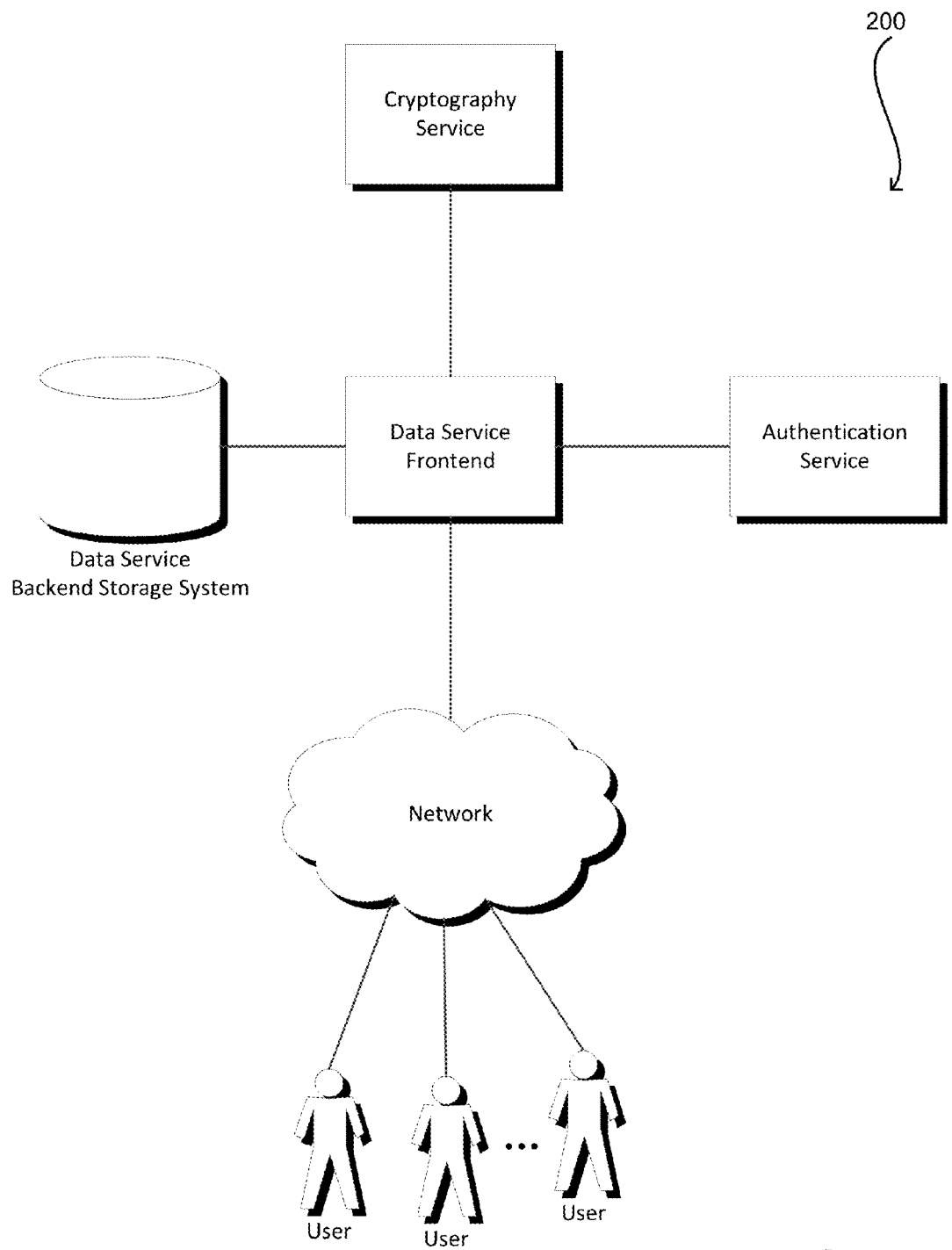
FIG. 2 shows an illustrative example of an environment in which various aspects of the present disclosure may be implemented.

FIG. 2 shows an illustrative example of an environment 200 in which a cryptography service, such as illustrated in FIG. 1, may be implemented. In the environment of 200, various components operate together in order to provide secure data related services. In this particular example, the environment 200 includes a cryptography service, an authentication service, a data service frontend and a data service backend storage system. In an embodiment, the cryptography service is configured in the environment 200 to perform cryptographic operations, such as by receiving plaintext from a data service frontend and providing ciphertext in return or providing envelope keys to services, so that the services can use the envelope keys to perform encryption operations. The cryptography service may perform additional functions, such as described below, such as secure storage of keys for performance of cryptographic operations, such as converting plaintext into ciphertext and decrypting ciphertext into plaintext. The cryptography service may also perform operations involved in policy enforcement, such as by enforcing policy associated with keys stored therein. Example policies that may be enforced by a cryptography service are provided below. The data service frontend in an embodiment is a system configured to receive and respond to requests transmitted over a network from various users. The requests may be requests to perform operations in connection with data stored or to be stored in the data service backend storage system. In the environment 200, the authentication service, cryptography service, data service frontend and data service backend storage system may be systems of a computing resource provider that utilizes the systems to provide services to customers represented by the users illustrated in FIG. 2. The network illustrated in FIG. 2 may be any suitable network or combination of networks, including those discussed below.

The authentication service in an embodiment is a computer system configured to perform operations involved in authentication of the users. For instance, the data service frontend may provide information from the users to the authentication service to receive information in return that indicates whether or not the user requests are authentic. Determining whether user requests are authentic may be performed in any suitable manner and the manner in which authentication is performed may vary among the various embodiments. For example, in some embodiments, users electronically sign messages transmitted to the data service frontend.

Electronic signatures may be generated using secret information (e.g., a private key of a key pair associated with a user) that is available to both an authenticating entity (e.g., user) and the authentication service. The request and signatures for the request may be provided to the authentication service which may, using the secret information, compute a reference signature for comparison with the received signature to determine whether the request is authentic. If the request is authentic, the authentication service may provide information that the data service frontend can use to prove to other services, such as the cryptography service, that the request is authentic, thereby enabling the other services to operate accordingly. For example, the authentication service may provide a token that another service can analyze to verify the authenticity of the request. Electronic signatures and/or tokens may have validity that is limited in various ways. For example, electronic signatures and/or tokens may be valid for certain amounts of time. In one example, electronic signatures and/or tokens are generated based at least in part on a function (e.g., a Hash-based Message Authentication Code) that takes as input a timestamp, which is included with the electronic signatures and/or tokens for verification. An entity verifying a submitted electronic signature and/or token may check that a received timestamp is sufficiently current (e.g. within a predetermined amount of time from a current time) and generate a reference signature/token using for the received timestamp. If the timestamp used to generate the submitted electronic signature/token is not sufficiently current and/or the submitted signature/token and reference signature/token do not match, authentication may fail. In this manner, if an electronic signature is compromised, it would only be valid for a short amount of time, thereby limiting potential harm caused by the compromise. It should be noted that other ways of verifying authenticity are also considered as being within the scope of the present disclosure.

The data service backend storage system in an embodiment is a computer system that stores data in accordance with requests received through the data service frontend. As discussed in more detail below, the data service backend storage system may store data in encrypted form. Data in the data service backend storage system may also be stored in unencrypted form. In some embodiments, an API implemented by the data service frontend allows requests to specify whether data to be stored in the data service backend storage system should be encrypted. Data that is encrypted and stored in the data service backend storage system may be encrypted in various ways in accordance with the various embodiments. For example, in various embodiments, data is encrypted using keys accessible to the cryptography service, but inaccessible to some or all other systems of the environment 200. Data may be encoded by the cryptography service for storage in the data service backend storage system and/or, in some embodiments, data may be encrypted by another system, such as a user system or a system of the data service frontend, using a key that was decrypted by the cryptography service. Examples of various ways by which the environment 200 may operate to encrypt data are provided below.

Numerous variations of the environment 200 (and other environments described herein) are considered as being within the scope of the present disclosure. For example, the environment 200 may include additional services that may communicate with the cryptography service and/or authentication service. For example, the environment 200 may include additional data storage services (which may each comprise a frontend system and a backend system) which may store data in different ways. For instance, one data storage service may provide active access to data where the data storage service performs data storage services in a synchronous manner (e.g., a request to retrieve data may receive a synchronous response with the retrieved data). Another data storage service may provide archival data storage services. Such an archival data storage service may utilize asynchronous request processing. For example, a request to retrieve data may not receive a synchronous response that includes the retrieved data. Rather, the archival data storage service may require a second request to be submitted to obtain the retrieved data once the archival data storage service is ready to provide the retrieved data. As another example, the environment 200 may include a metering service which receives information from the cryptography service (and/or other services) and uses that information to produce accounting records. The accounting records may be used to bill customers for usage of the cryptography service (and/or other services). Further, information from the cryptography service may provide an indication of how charges should be incurred. For instance, in some instances customers may be provided bills for use of the cryptography service. In other instances, charges for use of the cryptography service may be rolled into usage charges of other services, such as a data service that utilizes the cryptography service as part of its operations. Usage may be metered and billed in various ways, such as per operation, per period of time, and/or in other ways. Other data services may also be included in the environment 200 (or other environments described herein).

In addition, FIG. 2 depicts users interacting with the data service frontend. It should be understood that users may interact with the data service frontend through user devices (e.g. computers) which are not illustrated in the figure. Further, the users depicted in FIG. 2 (and elsewhere in the figures) may also represent non-human entities. For example, automated processes executing on computer systems may interact with the data service frontend as described herein. As one illustrative example, an entity represented by a user in FIG. 2 may be a server that, as part of its operations, uses the data service frontend to store and/or retrieve data to/from the data service backend storage system. As yet another example, an entity represented by a user in FIG. 2 may be an entity provided as a service of a computing resource provider that operates one or more of the services in FIG. 2. For instance, a user in FIG. 2 may represent a virtual or other computer system of a program execution service offered by the computing resource provider. Other variations, including variations of other environments described below, are also considered as being within the scope of the present disclosure.

Figure 3:
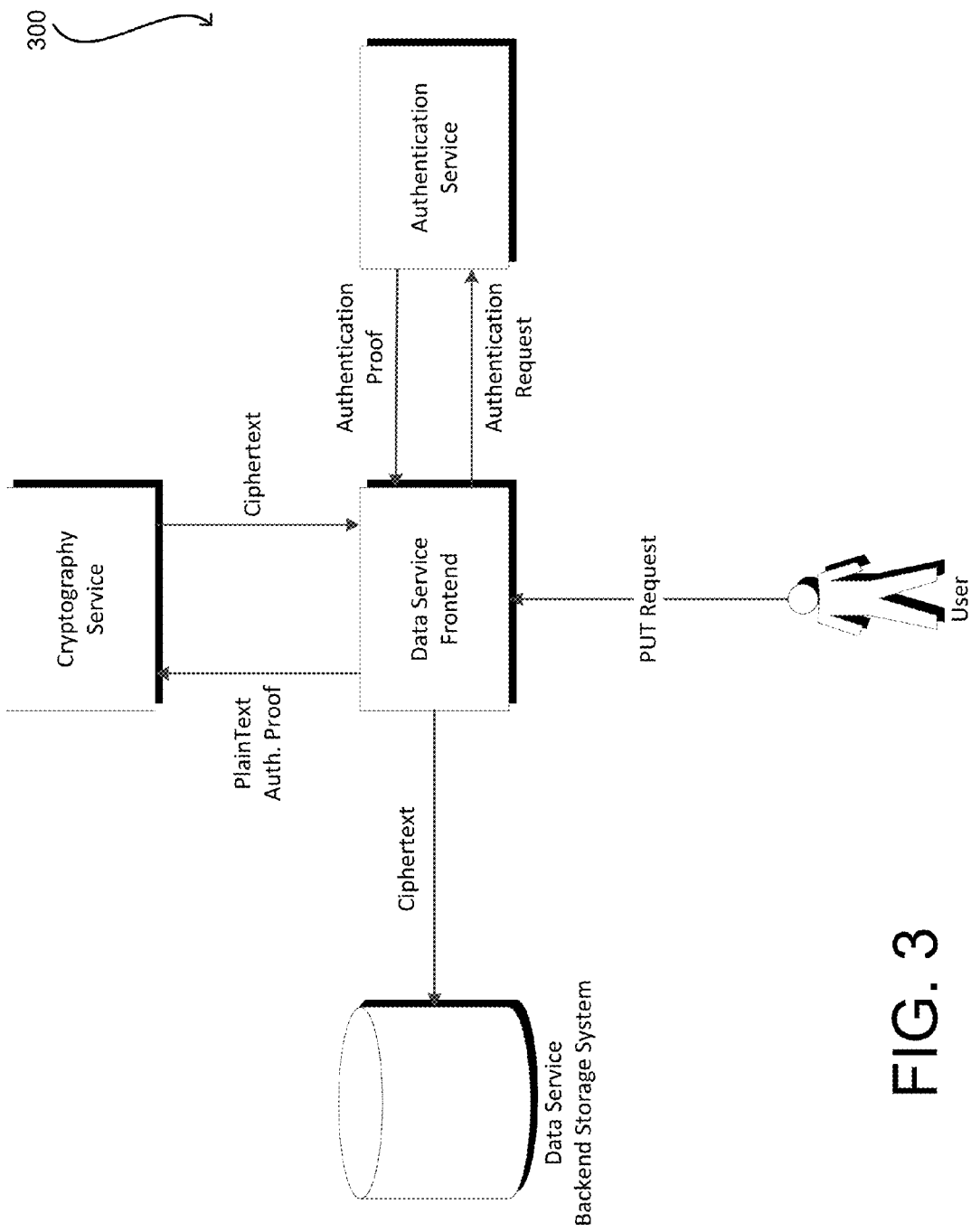
FIG. 3 shows an illustrative example of an environment in which various aspects of the present disclosure may be implemented and an example flow of information among the various components of the environment in accordance with at least one embodiment.

For example, FIG. 3 shows an illustrative example of an environment 300 in which various embodiments of the present disclosure may be implemented. As with FIG. 2, the environment in FIG. 3 includes an authentication service, a data service frontend system (data service front end), a cryptography service and a data service backend storage system. The authentication service, data service frontend, cryptography service and data service backend storage system may be configured such as described above in connection with FIG. 2. For example, users may access the data service frontend through a suitable communications network, although such network is not illustrated in the figure. In the example environment 300 illustrated in FIG. 3, arrows representing a flow of information are provided. In this example, a user transmits a PUT request to the data service frontend. The PUT request may be a request to store specified data in the data service backend storage system. In response to the PUT request, the data service frontend may determine whether the PUT request is authentic, that is if the user has submitted the request in the manner the requested operation can be performed in accordance with authentication policy implemented by the system.

In FIG. 3, an illustrative example of how such authentication decisions may be made is illustrated. In this particular example, the data service frontend submits an authentication request to the authentication service. The authentication service may use the authentication request to determine if the PUT request from the user is authentic. If the request is authentic, the authentication service may provide authentication proof to the data service frontend. The authentication proof may be an electronic token or other information that is usable by another service, such as the cryptography service, to independently determine that an authentic request was received. In one illustrative example, the PUT request is transmitted with a signature for the PUT request. The PUT request and its signature are provided through the authentication service, which independently computes what a signature should be if authentic. If the signature generated by the authentication service matches that signature provided by the user, the authentication service may determine that the PUT request was authentic and may provide authentication proof in response. Determining whether the PUT request is authentic may also include one or more operations in connection with the enforcement of policy. For example, if the signature is valid but policy otherwise indicates that the PUT request should not be completed (e.g. the request was submitted during a time disallowed by policy), the authentication service may provide information indicating that the request is not authentic. (It should be noted, however, that such policy enforcement may be performed by other components of the environment 300.) The authentication service may generate the signature, such as by using a key shared by the authentication service and the user. The authentication proof, as noted, may be information from which another service, such as the cryptography service, can independently verify that a request is authentic. For example, using the example of the cryptography service illustrated in FIG. 3, the authentication proof may be generated based at least in part on a key shared by both the authentication service and the cryptography service, such as a key that is inaccessible to other services.

As illustrated in FIG. 3, the data service frontend, upon receipt of authentication proof from the authentication service, provides plaintext and authentication proof to the cryptography service. The plaintext and authentication proof may be provided according to an API call or other electronic request to the cryptography service (e.g., an Encrypt API call). The cryptography service may analyze the authentication proof to determine whether to encrypt the plaintext.

It should be noted that additional information may be provided to the cryptography service. For example, an identifier of a key to be used to encrypt the plaintext may be provided as an input parameter to the API call from the data service frontend (which, in turn, may have received the identifier from the user). However, it should be noted that an identifier may not be transmitted to the cryptography service. For instance, in various embodiments, it may be otherwise determinable which key to use to encrypt the plaintext. For example, information transmitted from the data service frontend to the cryptography service may include information associated with the user, such as an identifier of the user and/or an organization associated with the user, such as an identifier of a customer on behalf of which the user has submitted the PUT request. Such information may be used by the cryptography service to determine a default key to be used. In other words, the key may be implicitly specified by information that is usable to determine the key. Generally, determination of the key to be used may be performed in any suitable manner. Further, in some embodiments, the cryptography service may generate or select a key and provide an identifier of the generated or selected key to be used later. Another example API parameter can be an identifier for a master key for the customer account the encryption operation is being performed for.

As illustrated in FIG. 3, if the authentication proof is sufficient to the cryptography service for the plaintext to be encrypted, the cryptography service can perform one or more cryptographic operations. In an embodiment, the one or more cryptographic operations can include an operation to generate an envelope key to be used to encrypt the plaintext. The envelope key can be a randomly generated symmetric key or a private key of a key pair. After the envelope key is generated, the cryptographic service can encrypt the envelope key with the master key specified in the API call and cause the encrypted envelope key to be persistently stored (e.g., by storing the encrypted key in a storage service or some other durable storage) or discarded. In addition, the cryptographic service can send a plaintext version of the envelope key as well as and the encrypted envelope key to the data service frontend. The data service can then use the plaintext version of the envelope key to encrypt the plaintext (i.e., the data associated with the encryption request) and cause the envelope key to be stored in persistent storage in association with an identifier for the master key used to encrypt the envelope key. In addition, the data service can discard the plaintext version of the envelope key. As such, in an embodiment after the data service discards the plaintext version of the envelope key it will no longer be able to decrypt the ciphertext.

In an alternative embodiment, the cryptographic operation can involve encrypting the plaintext. For example, the cryptographic service encrypts the plaintext and provides ciphertext to the data service frontend storage system. The data service frontend may then provide the ciphertext to the data service backend storage system for persistent storage in accordance with its operation. Other information may also be transmitted from the data service frontend to the data service backend storage system. For example, an identifier of the key used to encrypt the plaintext to generate ciphertext may be provided with the ciphertext for storage by the data service backend storage system. Other information, such as metadata identifying the user and/or the user's organization, may also be provided.

As with all environments described herein, numerous variations are considered as being within the scope of the present disclosure. For example, the flow of information among the various components of the environment 300 may vary from that which is shown. For example, information flowing from one component to another component through an intermediate component (e.g. data from the authentication service to the cryptography service and/or data from the cryptography service to the data service backend storage system) may be provided directly to its destination and/or through other intermediate components of the environment 300 (which are not necessarily included in the figure). As another example, PUT requests (and, below, GET requests) are provided for the purpose of illustration. However, any suitable request for performing the operations described may be used.

Figure 4:
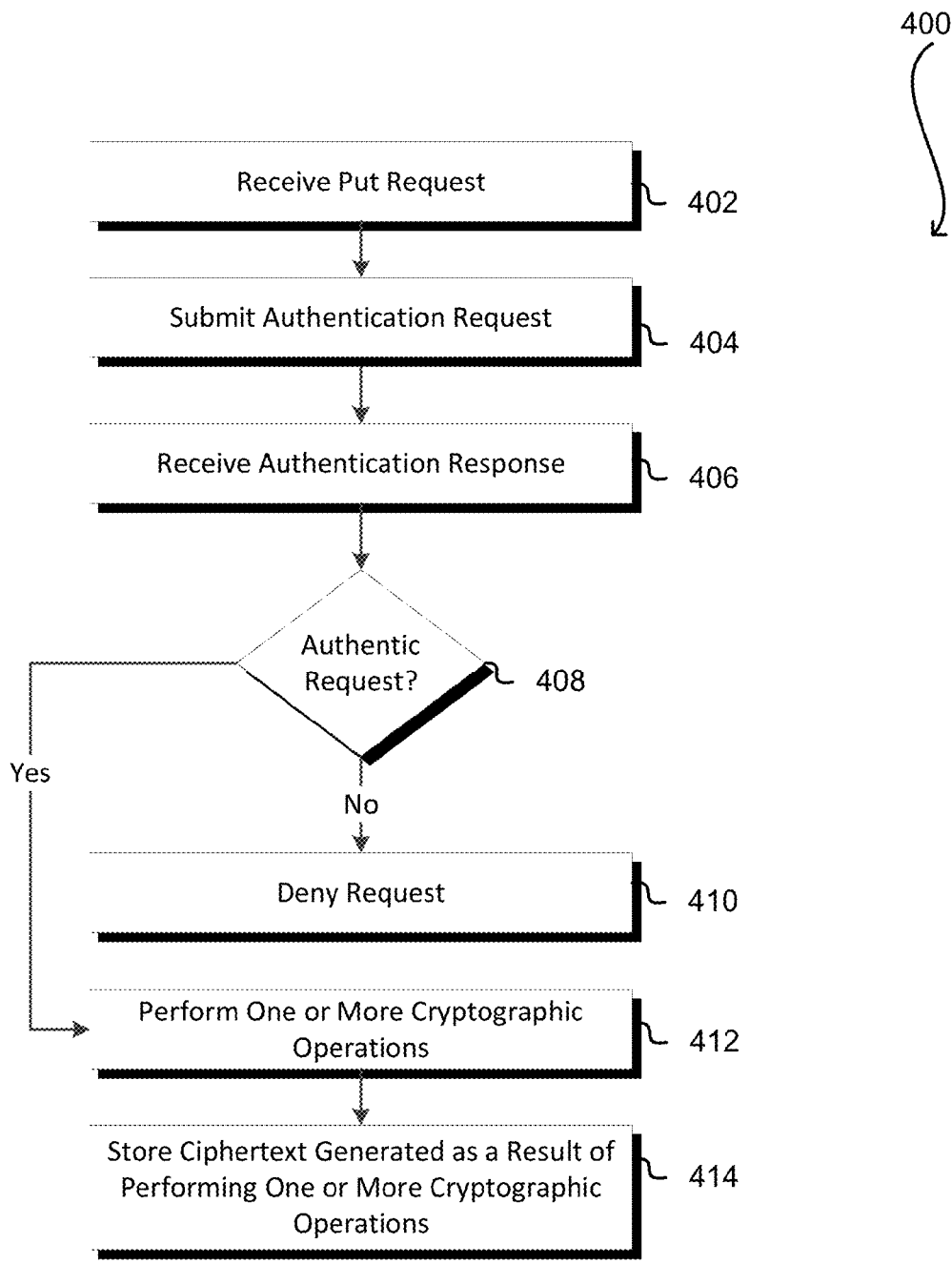
FIG. 4 shows example steps of an illustrative process for storing ciphertext, in accordance with at least one embodiment.

FIG. 4 shows an illustrative example of a process 400 which may be used to store data in a data storage service in accordance with an embodiment. The process 400 may be performed, for example, by the data service frontend illustrated in FIG. 3. Some or all of the process 400 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

As illustrated in FIG. 4, the process 400 includes receiving 402 a PUT request. The PUT request may be electronically received over a network and may include information associated with the request, such as information required for authentication, such as an electronic signature of the PUT request. In response to having received the PUT request, the process 400 may include submitting 404 an authentication request. For example, the system performed in the process 400 may submit (e.g., via an appropriately configured API call) an authentication request to a separate authentication service, such as described above in connection with FIG. 3. Similarly, a data service frontend that performs its own authentication may submit the authentication request to an authentication module implemented by the data service frontend.

Generally, the authentication request may be submitted in any suitable manner in accordance with the various embodiments.

Upon submission of the authentication request, an authentication response is received 406 by the entity to which the authentication request was submitted 404. For example, referring to FIG. 3, the authentication service may provide a response to the data service frontend that includes proof of the authentication for use by other services. Other information, such as an indication of whether or not authentication was successful, may also be transmitted. A determination may be made 408 whether the request is authentic. Authenticity of the request may depend from one or more factors checked by an entity, such as by an authentication service, or a combination of entities that collectively perform such checks. Authenticity may, for example, require that the request provide necessary valid credentials (e.g., an electronic signature generated by a secret key shared by the checking entity) and/or that policy allows the request to be fulfilled. From the perspective of a system that submits 404 an authentication request and receives an authentication response, authenticity may depend from the received authentication response. Accordingly, in an embodiment, the determination 408 whether the request is authentic may be performed based at least in part of the received authentication response. For example, if authentication was not authentic, the authentication response so indicates and the determination 408 may be made accordingly. Similarly, the response may implicitly indicate that the authentication request is authentic, such as by not including information that would be included if the request was authentic. If it is determined 408 that the PUT request is not authentic, then the PUT request may be denied 410. Denying the PUT request may be performed in any suitable manner and may depend upon the various embodiments in which the process 400 is being performed. For example, denying 410, the PUT request may include transmitting a message to a user that submitted the PUT request. The message may indicate that the request was denied. Denying the request may also include providing information about why the request was denied, such as an electronic signature not being correct or other reasons that may be used for determining how to resolve any issues that resulted in the PUT request not being authentic or authorized.

If it is determined 408 that the PUT request is authentic and authorized, then, in an embodiment, the process 400 includes performing 412 one or more cryptographic operations that result in the plaintext being encrypted. For example, a request (e.g., an appropriately configured API call) may be submitted to a cryptography service to provide a key to be used for performing the one or more cryptographic operations. The request provided to the cryptography service may be provided with proof of the PUT request being authentic so that the cryptography service can independently determine whether to perform the cryptographic operation (e.g., to encrypt the plaintext and provide ciphertext or generate an envelope key that can be used to encrypt the plaintext). However, in various embodiments, authentication proof may not be provided to the cryptography service and, for example, the cryptography service may operate in accordance with the request that it receives. For example, if the cryptography service receives a request from the data service frontend, the cryptography service may rely on the fact that the data service frontend has already independently verified authentication of the request. In such an embodiment and other embodiments, the data service frontend may authenticate itself with the cryptography service to provide an additional layer of security. The cryptography service may generate or otherwise obtain a key, encrypt the obtained key or otherwise obtain the encrypted key (e.g., from memory), and provide the obtained key and the encrypted obtained key in response to the request. The obtained key may be encrypted using a key identified in the request to the cryptography service. The obtained key may be used to encrypt the plaintext and, after encrypting the plaintext, the obtained key may be discarded (e.g., irrevocably removed from memory). In alternate embodiment, a system performing the process 400 may generate or otherwise obtain the key used to perform the one or more cryptographic operations, provide the obtained key to the cryptography service to be encrypted.

In some embodiments, performing the one or more cryptographic operations may result in ciphertext being generated. Ciphertext generated as a result of one or more cryptographic operations may be stored 414 for possible retrieval at a later time. As noted above, storage of the ciphertext may include storage of additional information that would enable the decryption of the ciphertext at later time. For instance, the ciphertext may be stored with an identifier of a key used to encrypt the plaintext into the ciphertext so that the key having that identifier may later be used to decrypt the ciphertext to obtain the plaintext. Storage of the ciphertext may also be performed in any suitable manner. For example, storage of the ciphertext may be performed by a data service backend storage system, such as described above.

Figure 5:
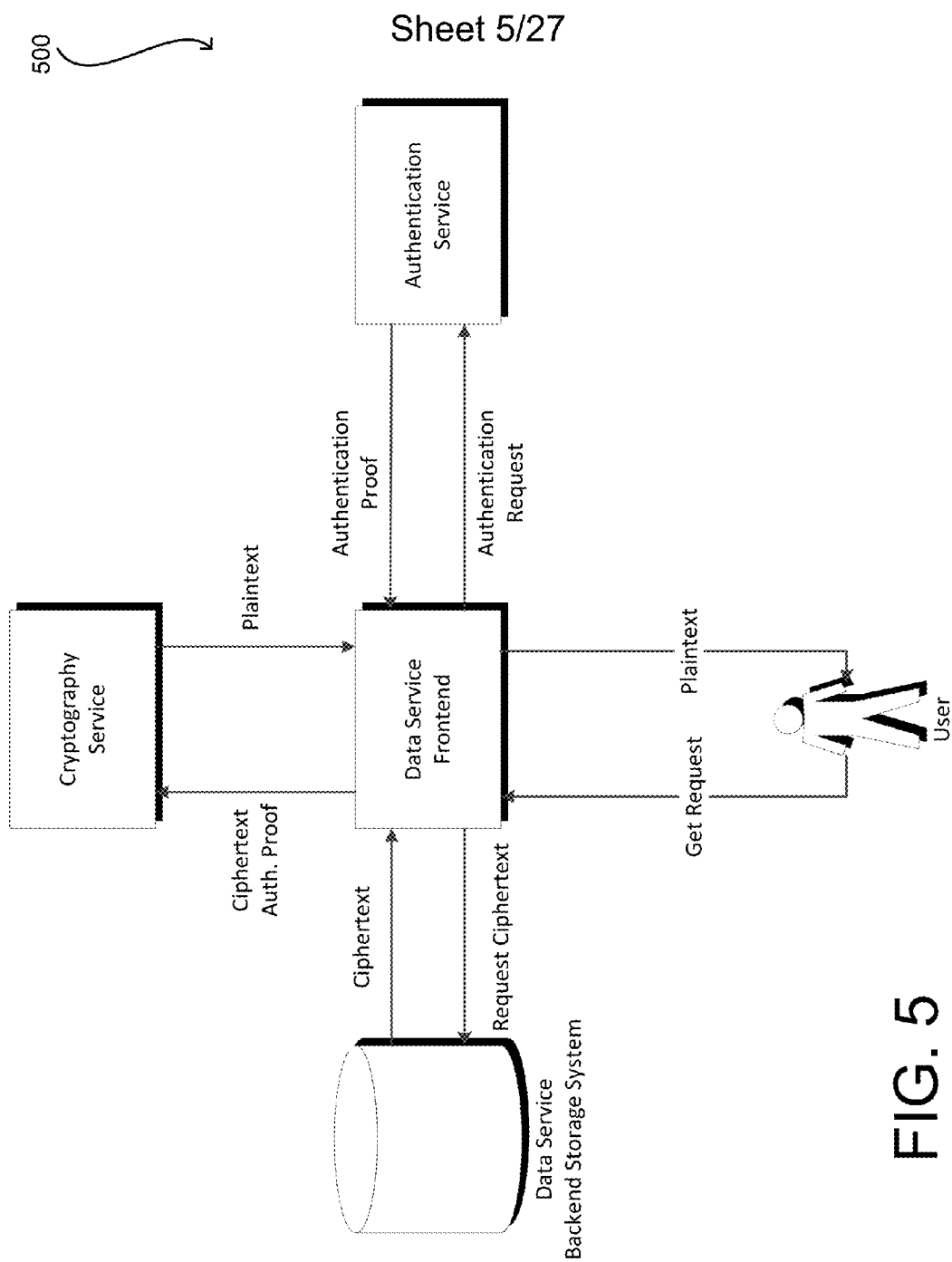
FIG. 5 shows an illustrative example of an environment in which various aspects of the present disclosure may be implemented and an example flow of information among the various components of the environment in accordance with at least one embodiment.

FIG. 5, accordingly, shows an illustrative example of an environment 500 and the flow of information illustrating how plaintext may be obtained. The environment 500 in this example includes an authentication service, a cryptography service, a data service frontend and a data service backend storage system. The authentication service, cryptography service, data service frontend and a data service backend storage system may be systems such as described above. As illustrated in FIG. 5, the data service frontend is configured to receive a GET request from a user and provide plaintext in response. In order to do this, the data service frontend may also be configured to submit authentication requests to an authentication service which itself may be configured to, if appropriate, provide to the data service frontend authentication proof. The data service frontend may also be configured to send a request to the cryptographic service to cause it to execute one or more cryptographic operations related to decrypting the data. In an embodiment where envelope keys are used, the data service can submit a request (e.g., an API call) to the cryptography service that includes or specifies the encrypted envelope key (or an identifier for the encrypted envelope key) authentication proof, and an identifier of the master key used to encrypt the envelope key to the cryptographic service. The cryptographic service can determine whether the authentication proof is sufficient to allow the operation and, if the authentication proof is sufficient, decrypt the envelope key. The decrypted envelope key can be sent back to the data service, which can use the key to decrypt the encrypted plaintext. The data service can then discard the decrypted plaintext key.

In an alternative embodiment, the data service frontend may be configured to provide the received authentication proof to the cryptography service with ciphertext for the cryptography service to decrypt. The cryptography service may, accordingly, be configured to determine whether the authentication proof is sufficient to allow decryption of the ciphertext and, if the authentication proof is sufficient, decrypt the ciphertext using an appropriate key (which may be identified to the cryptography service by the data service frontend), and provide the decrypted ciphertext (plaintext) to the data service frontend. To provide ciphertext to the cryptography service, the data service frontend may be configured to obtain (e.g., via an appropriately configured API call) the ciphertext from the data service backend storage system.

Figure 6:
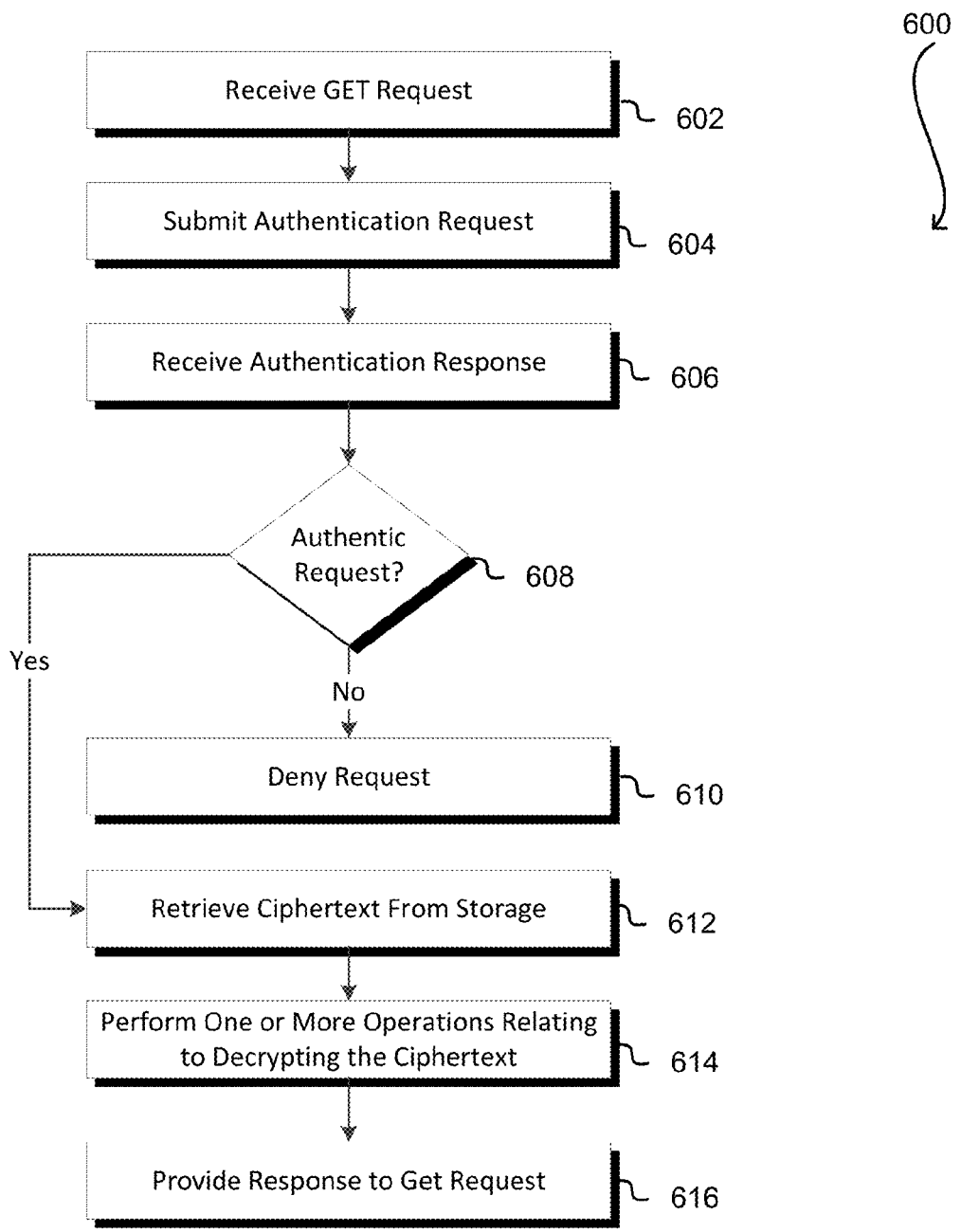
FIG. 6 shows example steps of an illustrative process for responding to a request to retrieve data, in accordance with at least one embodiment.

FIG. 6 shows an illustrative example of a process 600 which may be used to obtain plaintext in accordance with various embodiments. The process 600 may be performed, for example, by the data service frontend system (data service frontend) illustrated above in connection FIG. 5, although the process 600 and variations thereof may be performed by any suitable system. In an embodiment, the process 600 includes receiving 602 a GET request (or other appropriate request) from a user. Receiving the GET request may be performed such as described above in connection with other types of requests. Upon receipt 602 of the GET request, an authentication request may be submitted 604 to an authentication service or in any manner such as described above. An authentication response may, accordingly, be received. Based at least in part on the receive authentication response, a determination may be made 608 whether the GET request is authentic. If it is determined 608 that the GET request is not authentic, the process 600 may include denying 610 the request which, as described above, may be performed in various manners in accordance with the various embodiments.

If it is determined 608 that the GET request is authentic, the process 600 may include retrieving ciphertext from storage. Retrieving 612 ciphertext from storage may be performed in any suitable manner. For example, referring to the environment 500 discussed above in connection with FIG. 5, the data service frontend may submit a request for the ciphertext to the data service backend storage system and may receive the ciphertext in response. Generally, ciphertext may be obtained from storage in any suitable manner. Upon receipt of the ciphertext, the process 600 may include performing 614 one or more operations relating to decrypting the ciphertext. For example, in an embodiment, the data storage service may send a request to the cryptographic service to perform one or more cryptographic operations relating to decrypting the ciphertext 614. In one example configuration, the data service can send the cryptographic service an API call that includes the encrypted envelope key (or an identifier for the encrypted envelope key) authentication proof, and an identifier of the master key used to encrypt the envelope key to the cryptographic service. The cryptographic service can determine whether the authentication proof is sufficient to allow the operation and, if the authentication proof is sufficient, decrypt the envelope key. The decrypted envelope key can be sent back to the data service, which can use the key to decrypt the encrypted plaintext.

In another configuration, the ciphertext may be provided to a cryptography service such as the cryptography service described above in connection with FIG. 5. Other information may also be provided to the cryptography service such as proof of authentication that can be used by the cryptography service to determine whether or not to decrypt the ciphertext. In addition, in some embodiments, an identifier of a key to be used by the cryptography service to decrypt the ciphertext may be provided to the cryptography service. However, in other embodiments, the key may be implicitly indicated to the cryptography service. For example, the cryptography service may use a default key associated with a customer that is indicated to the cryptography service. Generally, any manner by which the cryptography service can determine which key to use to decrypt the ciphertext may be used.

As illustrated in FIG. 6, after the ciphertext is decrypted, the process 600 may include providing 616 a response to the GET request. Providing a response to the GET request may be performed in various ways in accordance with the various embodiments. For example, providing the response to the GET request may include providing the plaintext. In other embodiments, the plaintext may be a key that is used to decrypt other encrypted information which is then provided in response to the GET request. Generally, depending on the role of the plaintext in a particular embodiment of the disclosure, providing a response to the GET request may be performed in various ways.

Figure 7:
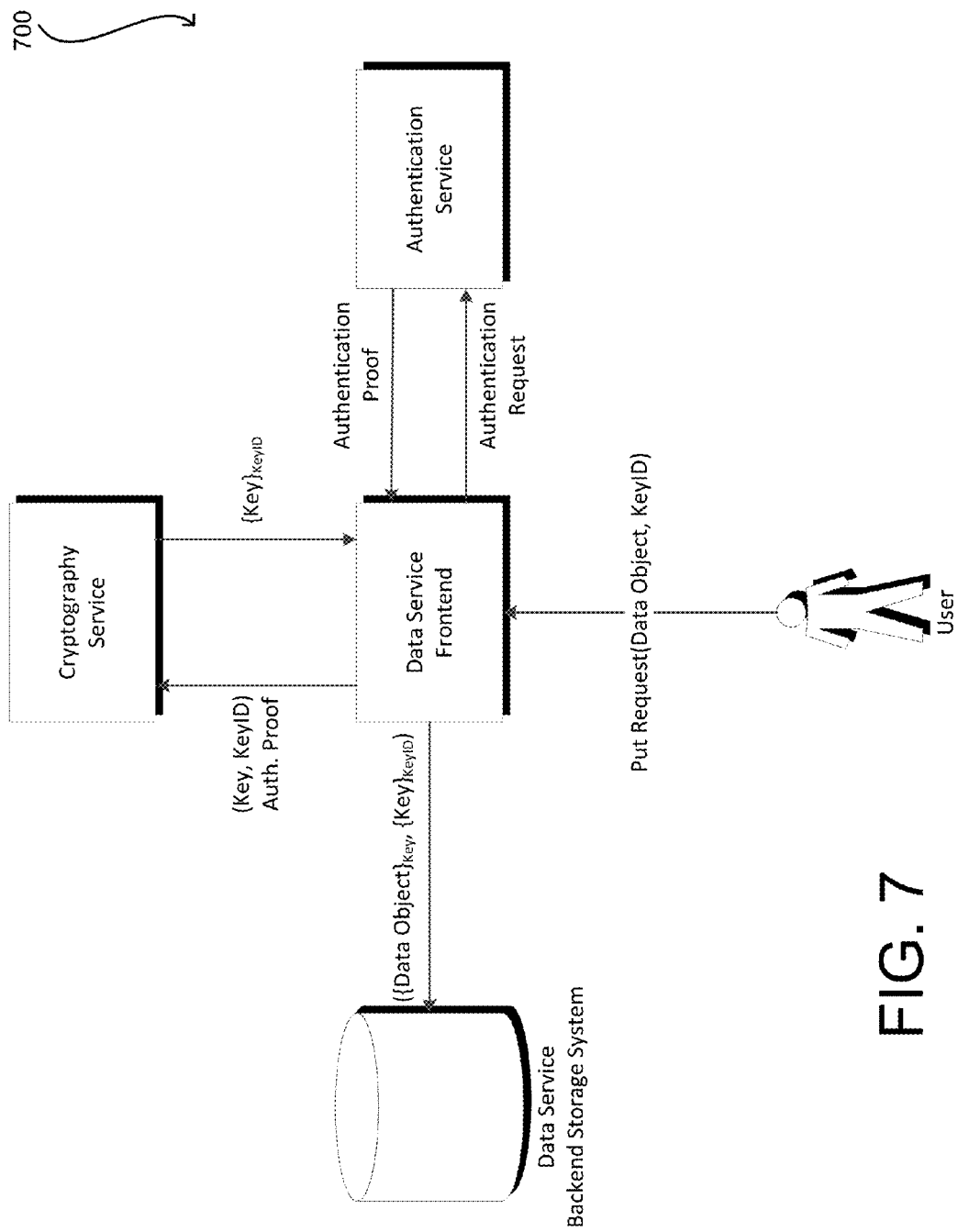
FIG. 7 shows an illustrative example of an environment in which various aspects of the present disclosure may be implemented and an example flow of information among the various components of the environment in accordance with at least one embodiment.

As noted, various embodiments of the present disclosure allow for data to be stored by a data storage service in various ways. FIG. 7 shows an illustrative example of an environment 700 with arrows indicating information flow in accordance with such embodiment. As illustrated in FIG. 7, environment 700 includes an authentication service, a cryptography service, a data service frontend and a data service backend storage system, such as described above. In this particular example, the data service frontend is a computer system configured to receive PUT requests from various users. PUT requests may include or specify data objects to be stored by a data service backend storage system. PUT requests may also specify a key identifier for a key to be used to encrypt the data object. The data service frontend may also be configured to interact with an authentication service, such as described above, in order to provide authentication proof to a cryptography service that is operable to receive keys and key identifiers and provide in response keys encrypted by the keys identified by the key identifiers. The data service frontend may then cause storage in a data service backend storage system. The data that may be stored may include a data object encrypted by the key. The data that may be stored may also include the key encrypted by the key identified by the key identifier. As discussed elsewhere, herein, the encrypted data object and encrypted key may be stored in different services.

As illustrated in FIG. 7, the data service frontend is configured to provide encrypted information to the data service backend storage system for storage. In this example, the data service frontend is configured to provide a data object encrypted under a key and the key encrypted under another key having a KeyID. It should be noted that, for the purpose of illustration, curly bracket notation is used to denote encryption. In particular, information inside of curly brackets is the information that is encrypted under a key specified in subscript. For example, $\{Data\ Object\}_{Key}$ denotes that the data "Data Object" is encrypted under the key "Key." It should be noted that a key identifier may also appear in subscript using this curly bracket notation. When a key identifier appears in subscript, the information inside the curly brackets is encrypted under a key identified by the key identifier. For example, $\{Data\ Object\}_{KeyID}$ denotes that the data object "Data Object" is encrypted under a key identified by the key identifier "KeyID." Similarly, $\{Key\}_{KeyID}$ denotes that the key "Key" is encrypted under the key identified by the key identifier "KeyID." In other words, this disclosure makes use of both keys and key identifiers in subscript and the meaning of the subscript should be clear from context. The ciphertext may include additional metadata usable to determine the identity of the associated decryption key.

Figure 8:
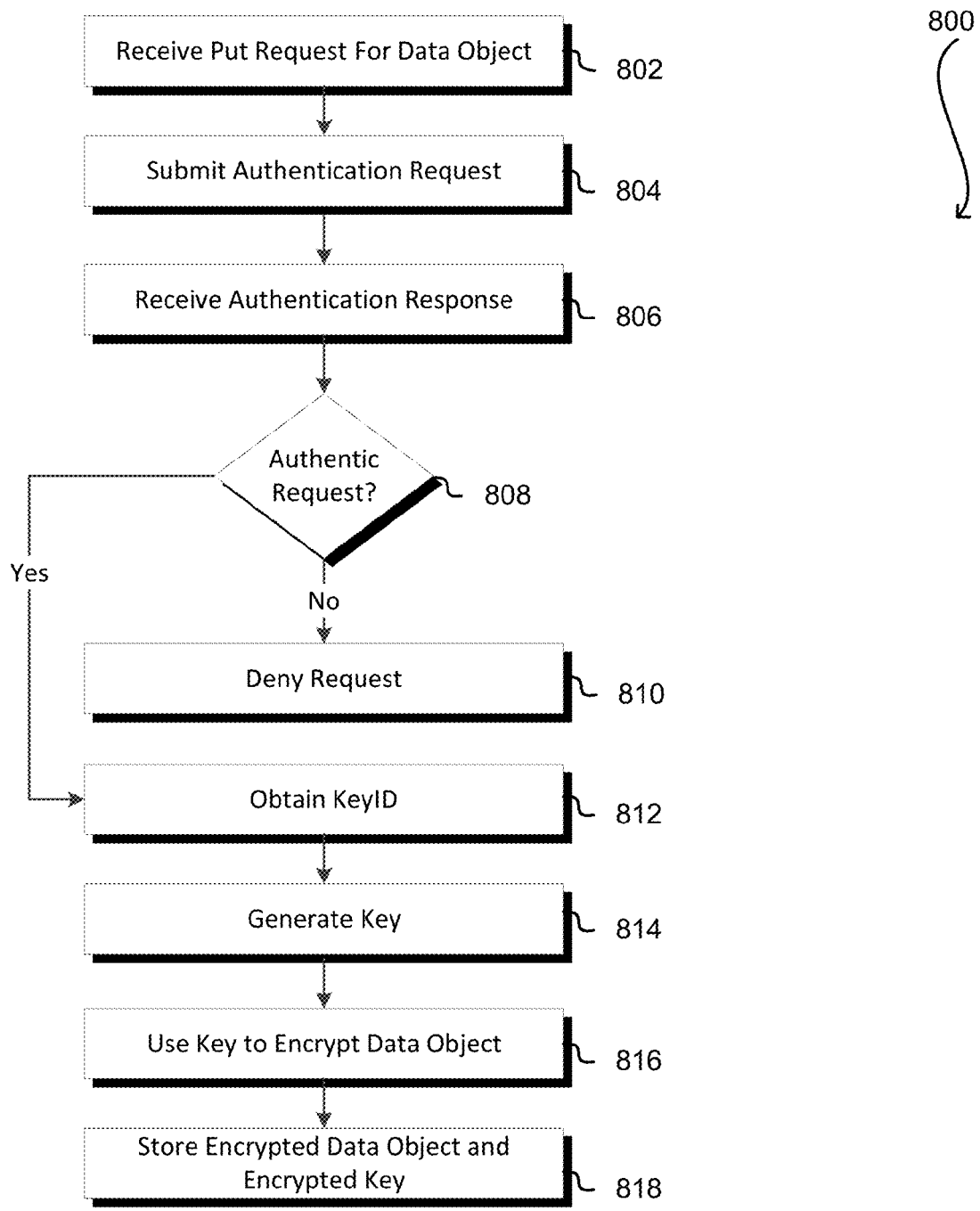
FIG. 8 shows example steps of an illustrative process for responding to a request to store data, in accordance with at least one embodiment.

FIG. 8 shows an illustrative example of a process 800 which may be performed to store a data object in a data storage system, such as the data service backend storage system described above in connection with FIG. 7. The process 800 may be performed by any suitable system, such as by the data service frontend system described above in connection with FIG. 7. In an embodiment, the process 800 includes receiving 802 a PUT request for a data object. Receiving the PUT request for the data object may be performed in any suitable manner, such as described above. It should be noted that the data object can be received in connection with the request or may be received from another service. For example, the request may include an identifier for a data object that may be obtained from another service using the identifier. As with other processes described above, the process 800 in an embodiment includes submitting 804 an authentication request and receiving 806 an authentication response. The authentication response that was received 806 may be used to determine 808 whether the PUT request is an authentic request. If it is determined 808 that the PUT request is not authentic, the process 800 may include denying 810 the request such as described above. If it is determined 808 that the PUT request is authentic, the process 800 may include obtaining 812 a key identifier (KeyID), such as a keyID for a master key used to encrypt envelope keys. Obtaining 812 the KeyID may be performed in any suitable manner and the manner in which the KeyID is obtained may vary in accordance with the various embodiments. For example, as illustrated in FIG. 7, the PUT request may specify the KeyID. As another example, the identity of the user, or otherwise associated with the user, may be used to obtain an identifier or a default key. As another example, the ciphertext may provide an indication of the associated key ID. As yet another example, one or more policy determinations may be used to determine which key identifier to obtain.

In an embodiment, the process 800 also includes generating 814 a key, such as an envelope key. Generating the key may be performed in any suitable manner by, for example, the cryptographic service or the service requesting encryption operations from the cryptographic service (e.g., a data storage service). For example, the key may be generated using a key derivation function using appropriate input to the key derivation function. Example key derivation functions include KDF1, defined in IEEE Std 1363 2000, key derivation functions defined in ANSI X9.42, and HMAC-based key derivation functions, such as the HMAC-Based Extract-and-Expand Key Derivation Function (HKDF) specified in RFC 5869. As another example, the key may be generated by a random or pseudo random number generator, a hardware entropy source or a deterministic random bit generator such as is specified by National Institute of Standards and Technology Special Publication (NIST SP) 800-90A. It should be noted that while FIG. 8 shows the process 800 including generating 814 a key, the key may be obtained in other ways such as by retrieval from storage. In other words, the key may have been pre-generated.

Continuing with the process 800 illustrated in FIG. 8, in an embodiment, the process 800 includes using 816 the generated key to encrypt a data object. For example, in an embodiment where the cryptographic service generates the key, the cryptographic service can provide the key, the KeyID, and an encrypted copy of the key to the data service. For example, referring to FIG. 7, the data service frontend may receive the envelope key and the KeyID for the master key used to encrypt the envelope key from the cryptography service with any other relevant information, such as authentication proof. The plaintext copy of the encryption key may then be used to encrypt the data object. The plaintext copy of the encryption key can be discarded and the encrypted data object as well as the encrypted key may then be stored 818. For example, referring to FIG. 7, the data service frontend may transmit to the encrypted data object and the encrypted key to the data service backend storage system for storage. In a configuration where the service generates the key, the service can provide the key and the KeyID to the cryptography service. For example, the data service frontend may send the envelope key and the KeyID for the master key used to encrypt the envelope key to the cryptography service with any other relevant information, such as authentication proof. The plaintext copy of the encryption key may then be used to encrypt the data object. The service can discard the plaintext copy of the encryption key and the encrypted data object as well as the encrypted key may then be stored. For example, referring to FIG. 7, the data service frontend may transmit to the encrypted data object and the encrypted key to the data service backend storage system for storage.

The encrypted data object and the encrypted envelope key may be stored without the plaintext version of key, that is, the plaintext key may be inaccessible to the data service backend storage system and one or more other systems. The key under which the data object is encrypted (e.g., the master key) may be made inaccessible in any suitable manner. In some embodiments this is achieved by storing it in memory accessible only to the cryptographic service. In some other embodiments this can be achieved by storing the master key in a hardware or other security module or otherwise under the protection of a hardware or other security module. In some embodiments, the memory location storing the plaintext envelope key (e.g., memory of the data service) may be allowed to be overwritten or memory location storing the key may be intentionally overwritten to render inaccessible the key to the data service frontend. As another example, the plaintext envelope key may be maintained in volatile memory that eventually ceases to store the key. In this manner, the envelope key is only accessible if it is decrypted using a key identified by the KeyID or otherwise obtained in an unauthorized manner, such as by cracking the key without the key identified by the KeyID, which may be computationally impractical. In other words, the key identified by the KeyID is required for authorized access to the key under which the data object is encrypted. Thus, if the data service backend storage system of FIG. 7 is compromised, such compromise would not provide access to the unencrypted data object because decrypting the data object would require access to the key, which is only obtainable through decryption using the key identified by the KeyID or through other ways which are not computationally feasible.

Figure 9:
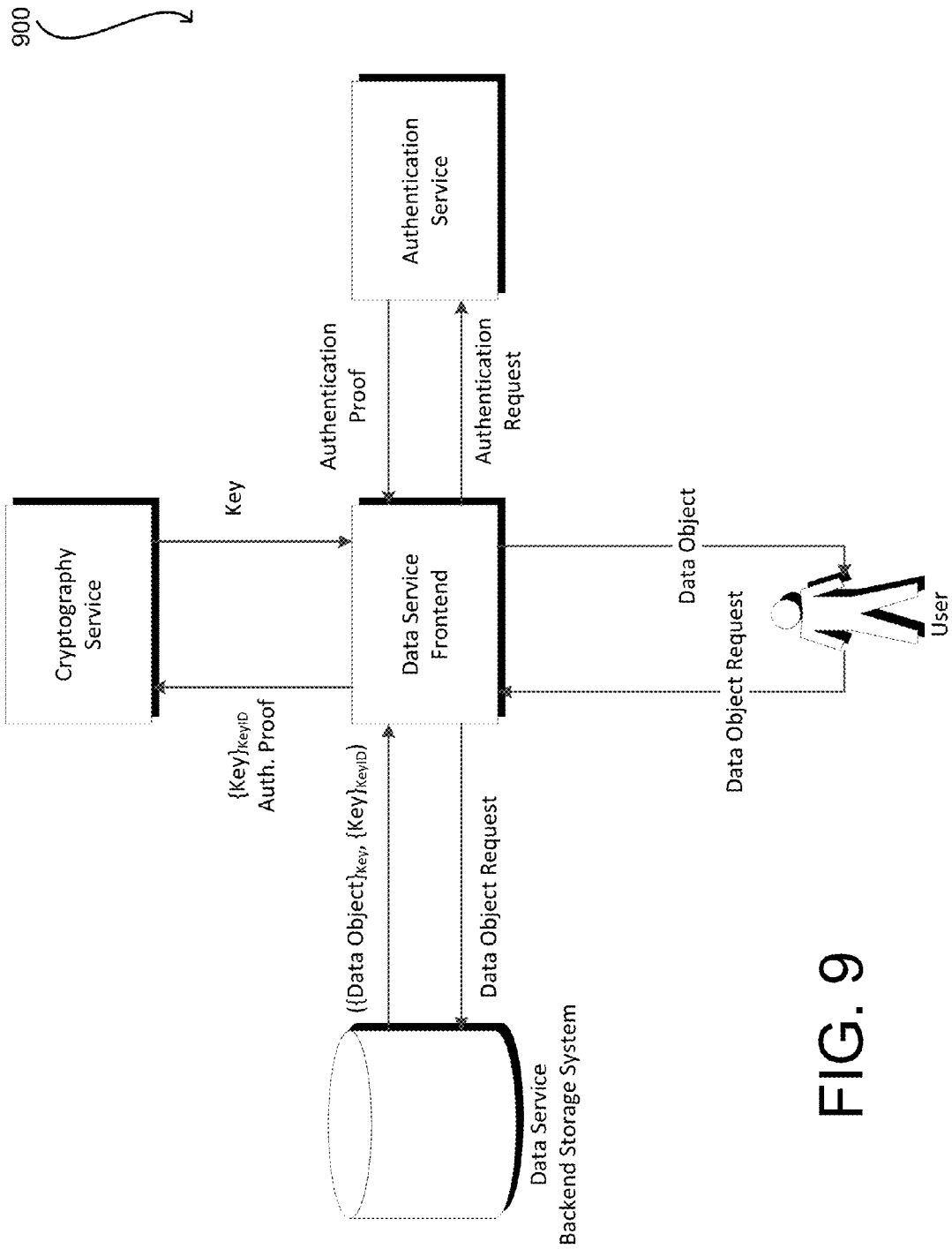
FIG. 9 shows an illustrative example of an environment in which various aspects of the present disclosure may be implemented and an example flow of information among the various components of the environment in accordance with at least one embodiment.

As noted, various embodiments of the present disclosure allow users to both store data objects and retrieve them in a secure manner. FIG. 9, accordingly, shows an illustrative example of an environment 900 which may be used to obtain data objects from storage. As illustrated in FIG. 9, the environment 900 includes an authentication service, a cryptography service, a data service frontend system and a data service backend storage system. The authentication service, cryptography service, data service frontend and data service backend storage system may be computer systems such as described above. As illustrated in FIG. 9, the data service frontend system is configured to receive data object requests and provide data objects in response. In order to provide the data objects in response, the data storage frontend system in this embodiment is configured to interact with the authentication service, the cryptography service, and the data service backend storage system as illustrated in FIG. 9. For example, in various embodiments, the data service frontend system is configured to submit authentication requests to the authentication service and receives authentication proof in response to the requests. As another example, the data service frontend is configured to provide keys encrypted by a key identified by a KeyID and authentication proof to a cryptography service which is operable to determine whether to provide the key based, at least in part, on the authentication proof and, if determined to provide the key, then provide the key to the data service frontend. The data service frontend may also be configured to provide other information, such as the KeyID, to the cryptography service. Although, in some embodiments, the KeyID may be implicitly indicated to the cryptography service, such as through association with other information provided to the cryptography service. It should also be noted that, in some embodiments, the user provides the KeyID to the data service frontend in connection with submitting requests to the data service frontend. Also, as illustrated in FIG. 9, the data service frontend in an embodiment is configured to request the data object from the data service backend storage system and receive in response the data object encrypted by the key and the key encrypted by a key identified by the KeyID. In some embodiments the cryptographic service may be operable to refuse to perform decryption of a ciphertext not generated using a key associated with a specified KeyID.

Figure 10:
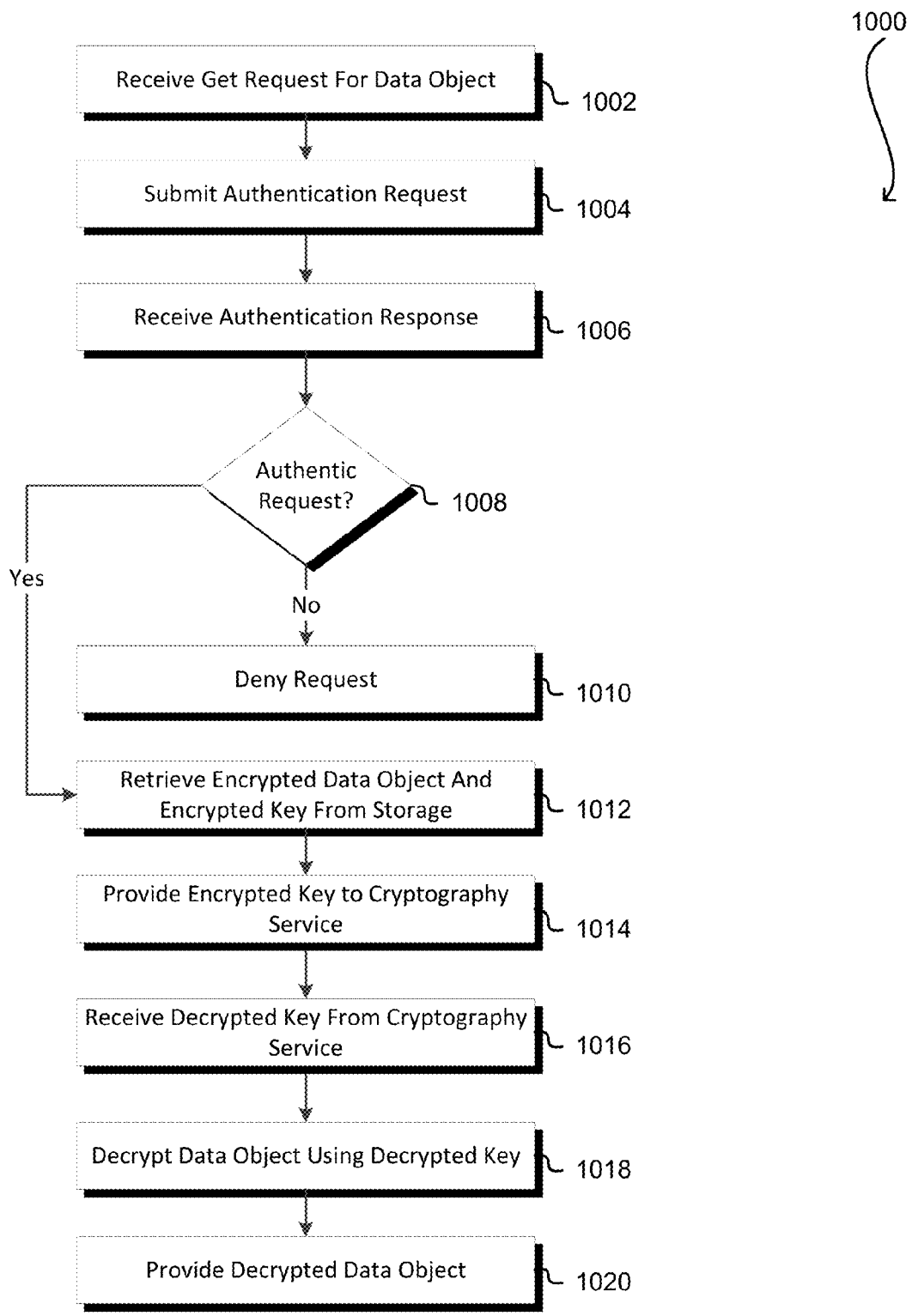
FIG. 10 shows example steps of an illustrative process for responding to a request to retrieve data, in accordance with at least one embodiment.

The data service frontend, in an embodiment, is configured to use the key received from the cryptography service to decrypt the data object and provide the decrypted data object to the user. FIG. 10, accordingly, shows an illustrative example of a process 1000 which may be used to provide the decrypted object in accordance with various embodiments. The process 1000 may be performed by any suitable system such as the data service frontend system described in connection with FIG. 9. In an embodiment, the process 1000 includes receiving 1002 a GET request for a data object. Receiving the GET request for the data object may be performed in any suitable manner such as described above in connection with other types of requests. For example, the GET request for the data object may include information used to authenticate the request and/or other information. The process 1000, accordingly, in an embodiment, as with other processes described herein, includes submitting 1004 an authentication request to an authentication system and receiving 1006 an authentication response. Submitting the authentication request and receiving the authentication response may be performed in any suitable manner, such as described above. The authentication response may be used to determine 1008 whether or not the GET request is authentic. If it is determined 1008 that the GET request is not authentic, the process 1000 in an embodiment includes denying 1010 the request. If, however, it is determined 1008 that the GET request is authentic, the process 1000 in an embodiment includes retrieving 1012 the encrypted data object and an encrypted key from storage. For example, the data service frontend system may obtain the encrypted data object and encrypted key from the data service backend storage system illustrated above in connection with FIG. 9.

In an embodiment, the process 1000 includes providing 1014 the encrypted envelope key to a cryptography service. Providing 1014 the encrypted envelope key to the cryptography service may be performed in any suitable manner and may be provided with other information, such as authentication proof that enables the cryptography service to determine whether to decrypt the encrypted key. In addition, providing 1014 the encrypted envelope key to the cryptography service may include providing an identifier of a key required for authorized decryption of the encrypted envelope key to enable the cryptography service to select a key identified by the identifier from among multiple keys managed by the cryptography service. As noted above, however, keys may be implicitly identified. The cryptography service may, accordingly, select an appropriate key and decrypt the encrypted key. Accordingly, in an embodiment, the process 1000 includes receiving 1016 the decrypted envelope key from the cryptography service. For example, if the cryptography service determines that the authentication proof is valid and/or that decryption of the encrypted is allowable according to any applicable policies, the cryptography service may provide the decrypted key to a system attempting to decrypt the data object. The data object may then be decrypted 1018 using the decrypted envelope key. The decrypted data object may then be provided 1020 to the requestor, such as the user or other system that submitted the GET request.

Figure 11:
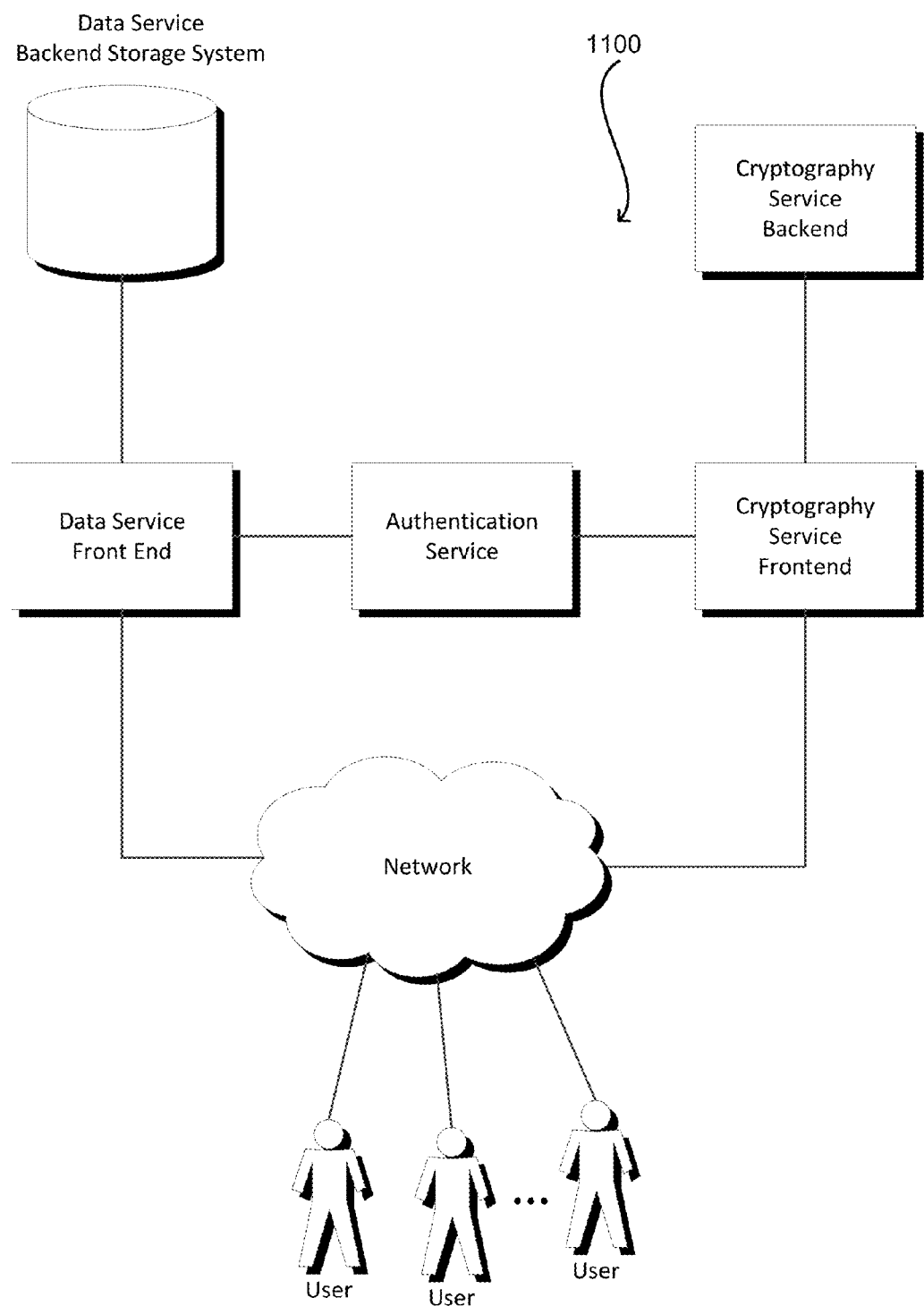
FIG. 11 shows an illustrative example of an environment in which various aspects of the present disclosure may be implemented.

In many instances, it is desirable for users (i.e., generally devices utilizing a cryptography service) to interact directly with the cryptography service. FIG. 11 accordingly shows an illustrative example of an environment 1100 which allows for direct user access to a cryptography service. In environment 1100, included is an authentication service, a data service frontend and a data service backend storage system. The authentication service, data service frontend and data service backend storage system may be as described above. For example, the data service frontend may be configured to receive and respond to requests from users as illustrated in FIG. 11 over a suitable network. As part of responding to requests from the users over the network, the data service frontend may also be configured to interact with the authentication service in order to determine whether user requests are authentic and/or enforce policy on the requests. The data service frontend may also be configured to interact with the data service backend storage system as part of fulfilling user requests. User requests may include, for example, PUT requests to store data in the backend storage system and GET requests to retrieve data from the data service backend storage system. As above, other requests may also be used in accordance with the various embodiments, such as requests to delete data stored in the data service backend storage system, requests to update the data stored in the data service backend storage system and the like.

In the particular example of FIG. 11, in the environment 1100, the cryptography service includes a cryptography service frontend and a data service backend. As with the data service frontend, the cryptography service frontend is configured to receive and respond to requests from users over the network. The cryptography service frontend is also configured to interact with the authentication service to determine whether user requests are authentic. Determining whether user requests are authentic may be performed in a simple manner such as described above. It should be noted that, while the cryptography service frontend and the data service frontend interact with the same authentication service, the cryptography service frontend and the data service frontend may interact with different authentication services. Further, the cryptography service frontend may be configured to enforce policy when responding to user requests.

The cryptography service frontend, in an embodiment, is configured to interact with the cryptography service backend. The cryptography service backend is configured, in accordance with instructions received from the cryptography service frontend, to perform cryptographic operations. Cryptographic operations include encryption, decryption and hash calculations and others. The environment 1100 may be used, for example, by users to have plaintext encrypted by the cryptography service so that the encrypted data can be stored in the data service backend storage system. Examples of such use of the environment 1100 are provided below. In addition, example details of an example cryptography service are also provided below.

Data may be stored in the data service backend storage system in any suitable manner such as described above. For example, techniques for storing encrypted data in the backend storage system described above may be used in the environment 1100. For example, while not illustrated, the data service frontend may communicate with the cryptography service frontend to cause the cryptography service backend to encrypt data which may then be stored in the data service backend storage system. The encrypted data may be a data object and/or an encrypted key that was used to encrypt a data object. In the environment 1100, data may be placed into the data service backend storage system in other ways as well. For example, users may provide plaintext to be encrypted by the cryptography service and may receive ciphertext in response. The users may then interact or may submit a request to the data service frontend to request that the ciphertext be stored in the data service backend storage system. The data service frontend, in this example, may store the ciphertext in any manner. For instance, the data service frontend and backend storage systems may be configured to be indifferent to whether data is encrypted.

In addition, as with all environments illustrated herein, an additional frontend system may be logically located between the users and the data service frontend and the cryptography service frontend and possibly other frontend systems in order to coordinate actions between the systems. For example, in some embodiments, users may interact with a frontend system that itself interacts with the cryptography service frontend and data service frontend so that operations from the perspective of the user are simpler. For example, a user may request that a data object be encrypted and stored and a frontend system responds to the request by appropriate interactions with the cryptography service frontend and data service frontend. From the perspective of the user, however, such may be performed by a single request. Other variations are also within the scope of the present disclosure.

Figure 12:
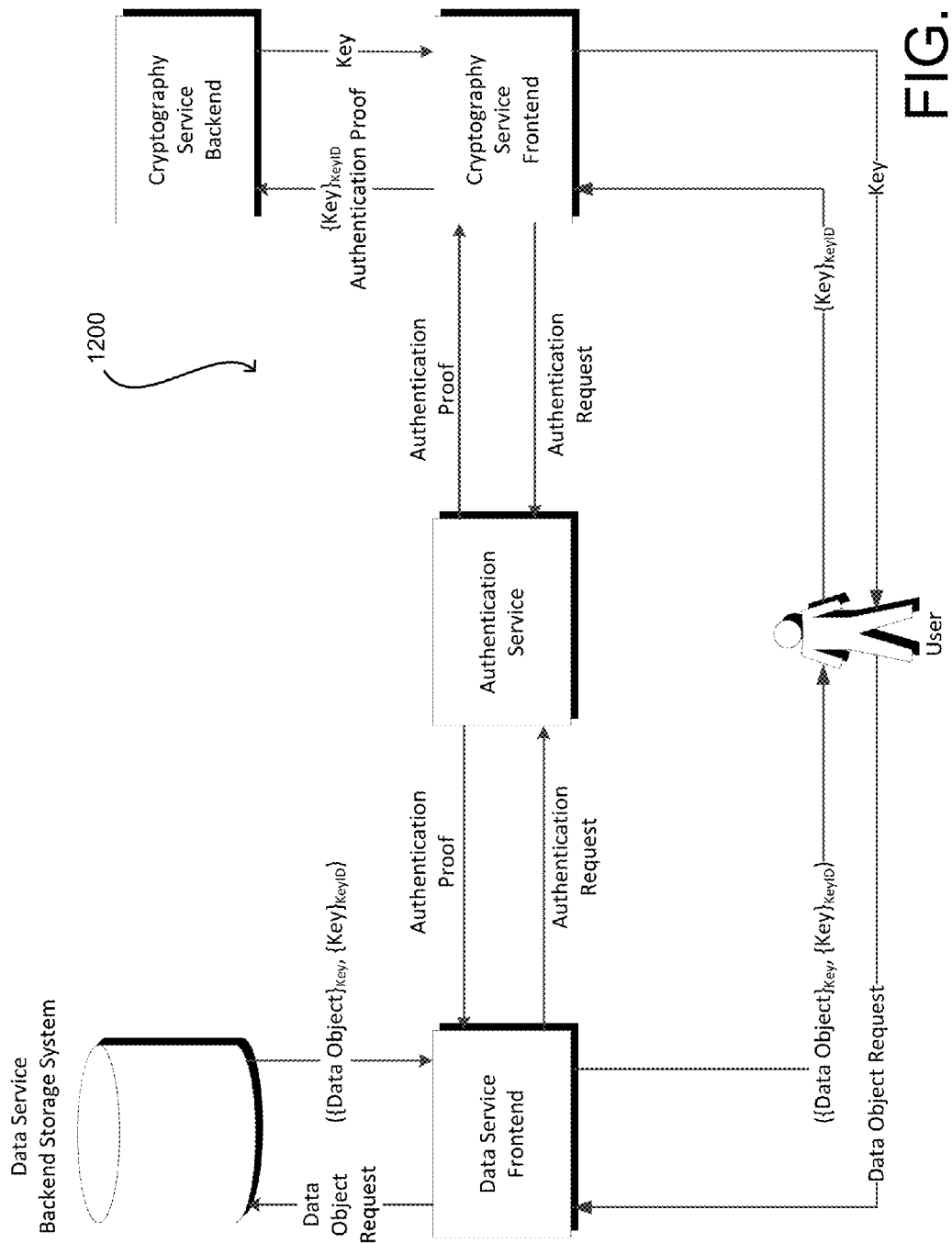
FIG. 12 shows an illustrative example of an environment in which various aspects of the present disclosure may be implemented and an example flow of information among the various components of the environment in accordance with at least one embodiment.

FIG. 12 shows an illustrative example of an environment 1200 which may be used to implement various embodiments of the present disclosure. In FIG. 12, the environment 1200 is configured to enable users to store ciphertext in a data service backend storage system. As illustrated in FIG. 12, accordingly, the environment 1200 includes a data service frontend, a data service backend storage system, an authentication service, a cryptography service frontend and a cryptography service backend. The data service backend storage system, the data service frontend, the authentication service, the cryptography service frontend and the cryptography service backend may be systems such as described above in connection with FIG. 11. For example, as illustrated in FIG. 12, the data service frontend is configured to receive and respond to user requests and may also be configured to enforce policy on user requests. The data service frontend, as part of responding to requests, may be configured to submit authentication requests to the authentication service and receive authentication proof in response in response. Upon successful authentication, the data service frontend may be further configured to interact with the data service backend storage system to obtain encrypted data objects and possibly unencrypted data objects from the data service backend storage system, which may be then provided to a user.

As illustrated in FIG. 12, the cryptography service frontend is also configured to submit authentication requests to the authentication service and receive, in response, authentication proof. Authentication proof may be used to obtain services from the cryptography service backend. For example, the cryptography service frontend may be configured to provide ciphertext to the cryptography service backend with authentication proof and the cryptography service backend may be configured to decrypt the ciphertext and provide the ciphertext in return.

As illustrated in FIG. 12, the ciphertext may be an encrypted key and the cryptography service backend may decrypt the encrypted key and provide the decrypted key, that is a plaintext key, to the cryptography service frontend, which is further configured to provide the plaintext key to the user. The user may then use the key to decrypt the encrypted data object received from the data service frontend or to decrypt encrypted data objects stored within the user's domain (e.g., within a user operated or controlled data center or computer system). In this example, the user may have obtained the encrypted key from the data service frontend. For example, the user may have submitted a request to the data service frontend for the data object and/or the key used to encrypt the data object. While illustrated in FIG. 11 as a single request, the separate requests may be made for both the data object and the key. As illustrated in FIG. 11, the data service frontend may obtain the encrypted data object and encrypted key from the data service backend storage system and provide the encrypted data object and encrypted key to the user.

It should be noted that, as with all environments illustrated herein, variations are considered as being within the scope of the present disclosure. For example, FIG. 12 shows a data object encrypted under a key and the key encrypted by another key identified by a key identifier being provided to the user. Further levels of encryption may also be used. For example, the data object may be encrypted under a key that is only accessible to the user (and/or that is not accessible by the other components of the environment 1200). A key used to encrypt the data object may also be encrypted under the key that is only accessible to the user. In this example, unauthorized access to the components of the environment 1200 (absent the user) still does not provide access to the unencrypted contents of the data object since access to the user's key is still required for authorized decryption.

As another example, in the environment 1200 illustrated in FIG. 12, the data service frontend and the data service backend storage system do not have access to the plaintext data stored by the data service backend storage system because the data service frontend and the data service backend storage system do not have access to a key needed to decrypt the encrypted data. In some embodiments, however, access may be granted to the data service frontend and/or the data service backend storage system. For instance, in an embodiment, temporary access to the key may be provided to the data service frontend to enable the data service frontend to obtain encrypted data, decrypt the encrypted data, use the decrypted data for a particular purpose (e.g., indexing), and then delete or otherwise lose access to the decrypted data. Such actions may be governed by policy enforced by the data service frontend and/or cryptography service and may require authorization from the user.

Figure 13:
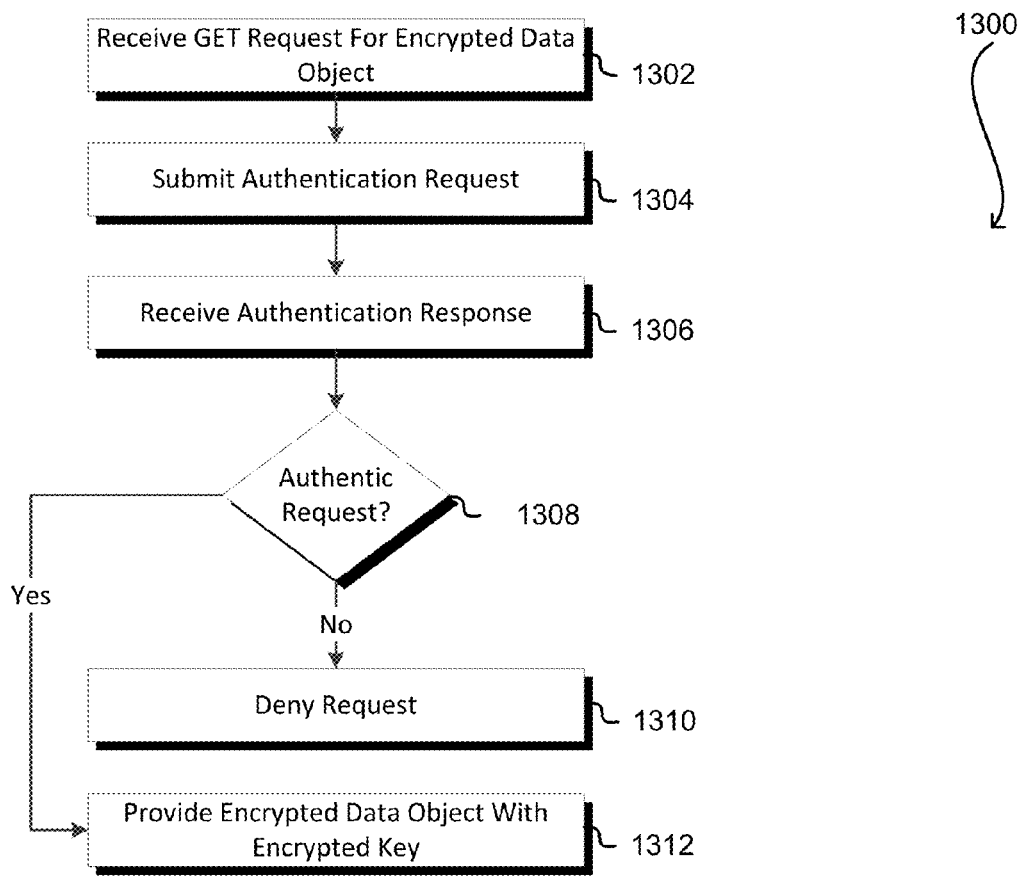
FIG. 13 shows example steps of an illustrative process for responding to a request to retrieve data, in accordance with at least one embodiment.

FIG. 13 shows an illustrative example of a process 1300 which may be used to obtain an encrypted data object and an encrypted key such as from a data service backend storage system such as described above. The process 1300, for example, may be performed by the data service frontend system described above in connection with FIG. 12. In an embodiment, the process 1300 includes receiving 1302 a GET request for an encrypted data object. Receiving the GET request may be performed in any suitable manner such as by receiving the request via an API call to the data service frontend system. As a result of having received the GET request, process 1300 may include submitting 1304 an authentication request and receiving 1306 an authentication response. Submitting 1304 the authentication request and receiving 1306 the authentication response may be performed in any suitable manner such as described above. The authentication response may be used to determine 1308 whether the GET request is authentic. If it is determined 1308 that the GET request is not authentic, the process 1300 may include denying 1310 the GET request. Denying 1310 the GET request may be performed in any suitable manner such as described above. If, however, it is determined 1308 that that GET request is authentic, the process 1300 may include providing 1312 the encrypted data object with an encrypted key that, when decrypted, is usable to decrypt the encrypted data object. It should be noted that, as with all processes described herein, numerous variations are considered as being within the scope of the present disclosure. For example, the process 1300 may be configured to respond to the GET request, when authentic, by providing the encrypted data object but without providing an encrypted key. A requester, that is a user or system that submitted the GET request, may obtain the encrypted key in other ways. For example, in some embodiments, users may store encrypted keys themselves in a data storage system under the user's control. As another example, one storage service may store the encrypted data object and another service may store the encrypted key and the user may obtain the encrypted data object and encrypted key from the respective services. As another example, another service or a third party to the user may be used to store encrypted keys and users may obtain encrypted keys upon request. Generally, any way by which encrypted keys may be provided may be used.

Figure 14:
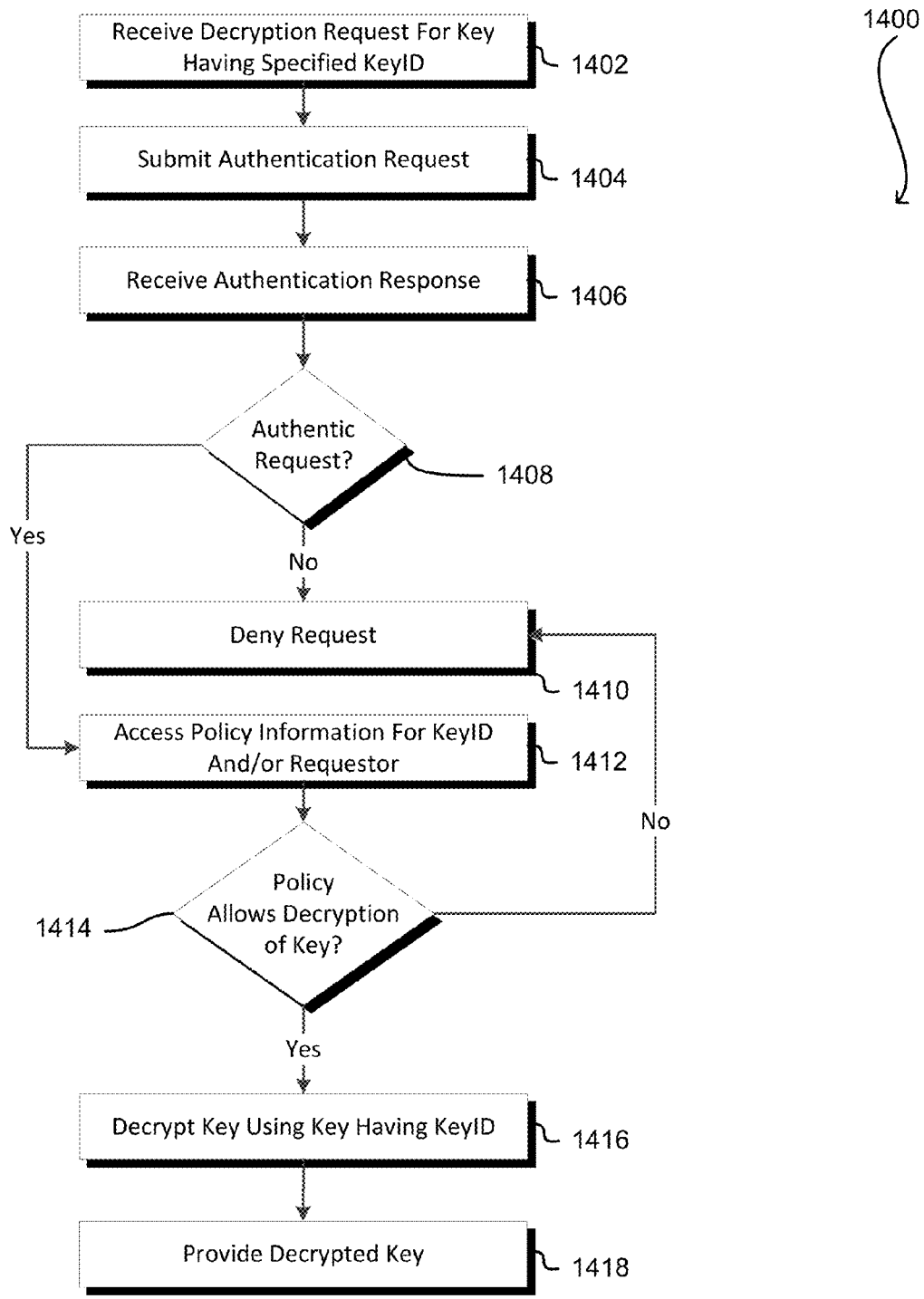
FIG. 14 shows example steps of an illustrative process for responding to a request to decrypt data, in accordance with at least one embodiment.

As illustrated in FIG. 13, the process 1300 may result in an entity having been provided a data object and an encrypted key usable to decrypt the data object. In various embodiments, the encrypted key must be decrypted in order to decrypt the data object. FIG. 14, accordingly, shows an illustrative example of a process 1400 which may be used to provide a decrypted key to an entity in need of such a decrypted key in order to use the decrypted key for decryption of an encrypted data object. The process 1400 may be performed by any suitable system such as by the cryptography service frontend system described above in connection with FIG. 12. In an embodiment, the process 1400 includes receiving 1402 a decryption to decrypt a key using another key having a specified KeyID. While the process 1400 is described in connection with decryption of a key, it should be noted that the process 1400 may be adapted for decryption of data in general. The decryption request may be received 1402 in any suitable manner such as described above (e.g., via an appropriately configured API call). Further, the decryption request may be received by any entity appropriate to the context in which the process 1400 is being performed. For instance, the decryption request may originate from the user or from another system, such as the data service frontend discussed above. The decryption request may also include data (e.g. a key) to be decrypted or a reference thereto. The KeyID may be specified also in any suitable manner. For example, in some embodiments, the decryption request includes the KeyID or a reference to the KeyID, that is, information that can be used to determine the KeyID. As discussed above, the KeyID may also be implicitly specified. For example, the KeyID may be obtained through association with available data such as an identity of a requester that submitted the decryption request. For instance, the key corresponding to the KeyID may be a default key for the requestor or for the entity on behalf of which the request was submitted.

The process 1400, in an embodiment, includes submitting 1404 an authentication request and receiving 1406 an authentication response. Submitting 1404 the authentication request and receiving 1406 the authentication response may be performed in any suitable manner such as described above. Further, as described above, the received authentication response may be used to determine 1408 whether the GET request is authentic. If it is determined 1408 that the GET request is not authentic, the process 1400 may include denying 1410 the GET request. Denying 1410 the GET request may be performed in any suitable manner such as is described above. If, however, it is determined 1408 that the GET request is authentic, the process 1400 may include accessing policy information for the specified KeyID and/or for the requester. Policy information may include information including one or more policies on the KeyID and/or the requester.

In an embodiment, the accessed policy information is used to determine 1414 whether any applicable policy allows decryption of the key having the specified KeyID. If it is determined 1414 that the policy does not allow decryption of the key specified by the KeyID, the process 1400 may include denying 1410 the GET request such as described above. If, however, it is determined 1414 that policy allows decryption of the key having the specified KeyID, the process 1400 may include decrypting 1416 the key using the key identified by the KeyID. Once the key has been decrypted, using a key having the KeyID, the decrypted key may then be provided 1418 such as by transmission over a network to the requester that submitted the decryption request (or, in some embodiments, another authorized destination).

Figure 15:
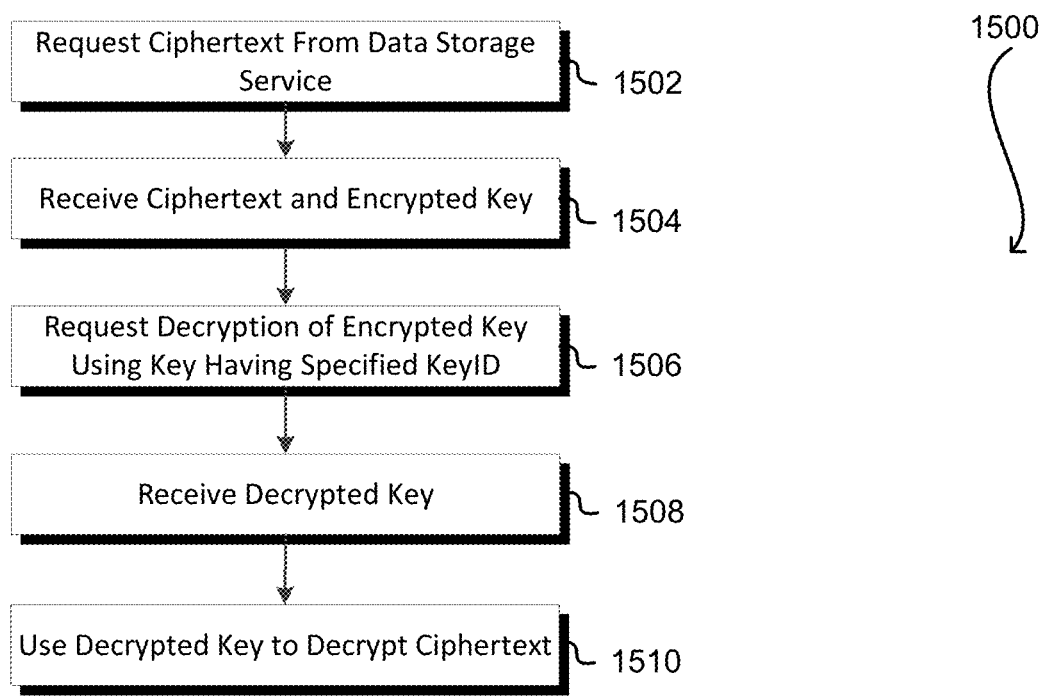
FIG. 15 shows example steps of an illustrative process for obtaining decrypted data, in accordance with at least one embodiment.

As illustrated in the environment 1200 discussed above, a user may obtain encrypted data objects and keys for decrypting the data objects in various ways. FIG. 15 shows an illustrative example of a process 1500 which may be used to obtain plaintext in accordance with various embodiments. The process 1500 may be performed by any suitable system such as by a system being operated and/or hosted by a user such as described in connection with FIG. 12. Other suitable systems include systems operating on behalf of users and not necessarily according to real time user input provided but perhaps according to preprogrammed processes.

In an embodiment, the process 1500 includes receiving 1502 ciphertext from a data storage service. Requesting 1502 ciphertext from a data storage service may be performed in any suitable manner such as described above. For example, a system performing the process 1500 may request 1502 ciphertext, using an appropriately configured API call in the environment 1200 illustrated above in connection with FIG. 12 and/or by the process 1300 described above in connection with FIG. 13.

The process 1500 may also include receiving ciphertext and an encrypted key. Receiving ciphertext and encrypted key may be performed in any suitable manner. For example, the ciphertext and encrypted key may be received in a response to the request for the ciphertext from a data storage service. Generally, however, the ciphertext and encrypted key may be received 1504 in other suitable ways. For example, the request to receive ciphertext from the data storage service may be an asynchronous request and ciphertext may be received 1504 pursuant to another request that is subsequently submitted. Further, the ciphertext and encrypted key may be provided in a single response or may be obtained separately such as by different responses (which may be from the same or from different systems). As another example, a system performing a process 1500 may locally or otherwise store encrypted keys and the encrypted key may be received from local memory.

In an embodiment, the process 1500 includes requesting decryption of the encrypted key, using a key having a specified KeyID. The KeyID may be specified in any suitable manner such as described above. Further, it should be noted that the system performing the process 1500 may be able to specify the KeyID in any suitable manner. For example, the encrypted key and/or information provided therewith may specify the KeyID. As another example, the system performing the process 1500 may have local or remote access to information that enables determining the KeyID. A local or remote database, for instance, may associate data object identifiers with key identifiers for keys used to encrypt the data objects. Generally, any manner in which the system can be enabled to specify the KeyID may be used. Further, in some embodiments, the KeyID need not be specified, such as when information provided to a cryptography service is sufficient to determine the KeyID. The request 1506 for decryption of the encrypted key may be performed in any suitable manner such as in connection with an environment discussed above in connection with FIG. 12 and/or by performance of the process 1400 described above in connection with FIG. 14.

The process 1500, in an embodiment, includes receiving 1508 the decrypted key. Receiving 1508 the decrypted key may be performed in any suitable manner. For example, the decrypted key may be received in response to a request for decryption of the encrypted key. As another example, the request for decryption of the encrypted key may be an asynchronous request and another request may have been submitted for receiving the decrypted key. Generally, the decrypted key may be received in any suitable manner. Further, as with all information flowing from one device to another, the passage of information may be performed using secure channels. For instance, the decrypted key may be once again encrypted for decryption by an entity receiving the decrypted key. Generally, any manner of secure communication may be used to pass information from one entity to another.

Once the decrypted key has been received 1508, the process 1500 may include using 1510 the decrypted key to decrypt 1510 ciphertext and therefore obtain plaintext. It should be noted that, as with all processes described herein, variations are considered as being within the scope of the present disclosure. For example, the process 1500 shows a request for ciphertext and a request for decryption of an encrypted key being performed sequentially. However, as with many operations described herein in connection with the various processes, operations need not be performed sequentially in various embodiments. For example, if a system performing the process 1500 has access to the encrypted key prior to requesting the ciphertext, or is otherwise able to do so, the system may request ciphertext and request decryption of the encrypted key in parallel or in an order different from that which is illustrated. Other variations are also considered as being within the scope of the present disclosure.

Figure 16:
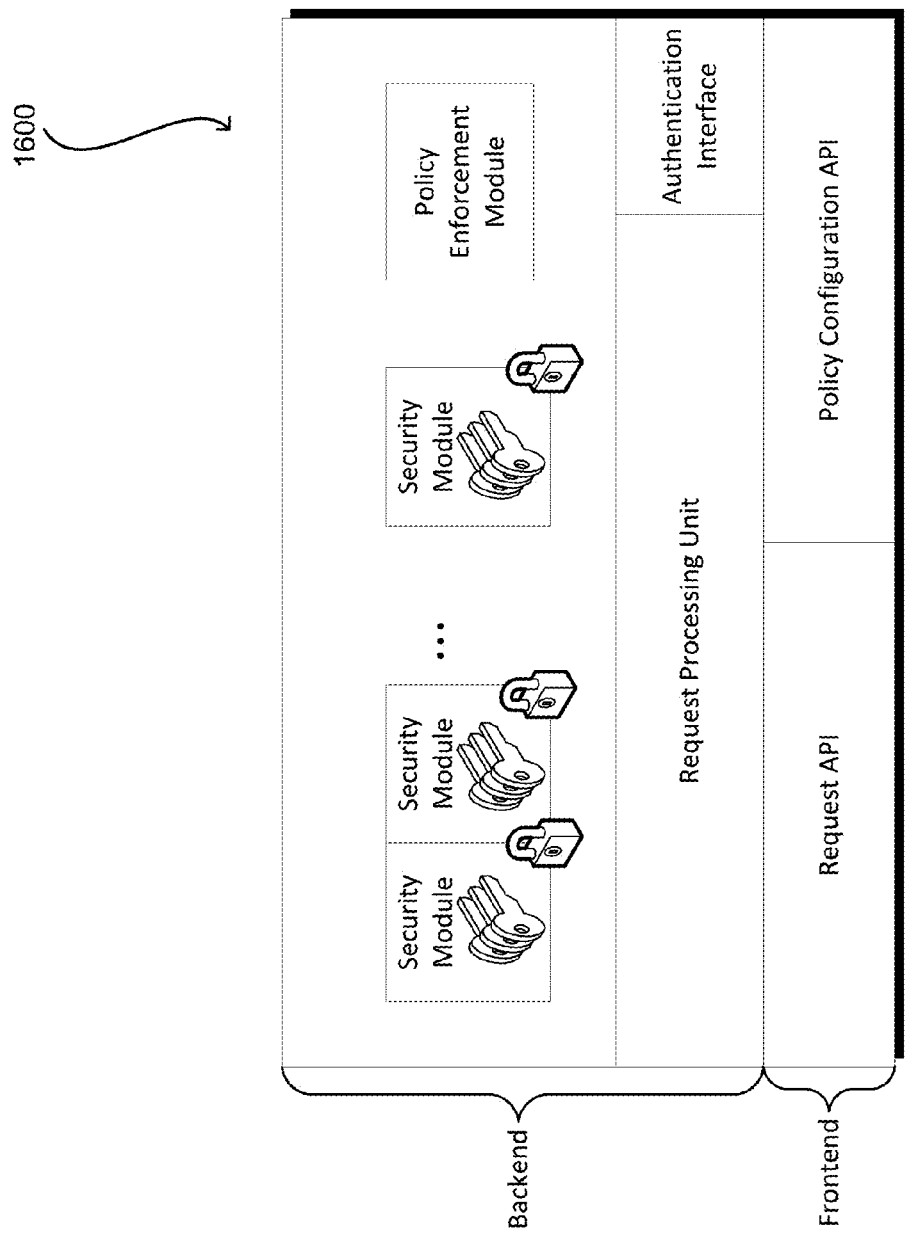
FIG. 16 shows a diagrammatic representation of an example cryptography service, in accordance with at least one embodiment.

As discussed above, various embodiments of the present disclosure are directed to providing cryptography services. Cryptography services may be provided by a cryptography service system such as described above. FIG. 16 accordingly shows an illustrative example of a cryptography service 1600 in accordance with various embodiments. As illustrated in FIG. 16 and as discussed above, the cryptography service 1600 is logically comprised of a frontend system and a backend system. Both the frontend system and the backend system may be implemented by one or more computer systems configured to perform operations described herein. For example, as illustrated in FIG. 16, the frontend system of the cryptography service 1600 implements a request API and a policy configuration API. The request API, in an embodiment, is an API configured for requesting cryptographic and other operations to be performed by the cryptography service. Thus, requests may be made to the frontend system via the request API in order for such cryptographic operations to be performed by the cryptography service.

The request API may be configured with the following example, high-level, requests available:
  CreateKey(KeyID)
  Encrypt(KeyID, Data, [AAD])
  Decrypt(KeyID, Ciphertext, [AAD])
  Shred(KeyID)
  ReKey(Ciphertext, OldKeyID, NewKeyID).

A CreateKey(KeyID) request, in an embodiment, causes the cryptography service to create a key identified by the KeyID identified in the request. Upon receipt of a request, the cryptography service may generate a key and associate the key with the KeyID. It should be known that KeyID's may be, but are not necessarily unique identifiers. For instance, a KeyID may identify a family of keys. For example, in some embodiments, key rotation is performed. Key rotation may involve replacing keys with other keys to prevent collection of enough decrypted data to allow practical cracking of a cipher used. If performed at the direction of an entity different from the cryptography service, use of the CreateKey(KeyID) request may cause the cryptography service to create a new key to replace an old key identified by the KeyID. The old key may remain identified by the KeyID, but may, for instance, be only used for decryption (of data that has already been encrypted using the old key) and not for future encryption. As another example, in some embodiments, users of the cryptography service provide their own key identifiers and there is a possibility that two different customers may provide the same identifier.

In such instances, the identifier may not uniquely identify a key or even uniquely identify a family of keys. Various measures may be in place to address this. For example, an identity or other information associated with a user of the cryptography service may be used to identify the proper key or family of keys. In still other embodiments the cryptographic service may assign a KeyID randomly, sequentially, or using any other method.

It should be noted that, when a KeyID does not uniquely identify a key, various systems may be in place to enable proper functionality. For example, in various embodiments, a family of keys identified by a KeyID is finite. If a decryption operation using a key identified by a KeyID is requested, additional data (e.g., a time stamp of when the encryption was performed) may enable determining the proper key to use. In some embodiments, ciphertexts may include information indicating a key version. In some embodiments, all possible keys are used to provide different decryptions of the data. Since there are a finite number of keys, the proper decryption may be selected from those provided. In some embodiments, decryption with a key is performed in a manner that enables the cryptographic service to detect that the ciphertext was not generated based at least in part on the key, such as by using authenticated encryption. Other variations are also considered as being within the scope of the present disclosure.

An Encrypt(KeyID, Data, [AAD]) request may be used to cause the cryptography service to encrypt the specified data using a key identified by the KeyID. Additional Authenticated Data (AAD) may be used for various purposes and may be data that is not necessarily encrypted, but that is authenticated, e.g. by an electronic signature, a message authentication code or, generally, a keyed hash value included with the AAD. In some embodiments, the ciphertext is generated including at least a portion of the AAD. In some other embodiments the AAD is provided separately during decryption. In some other embodiments, the AAD is generated at decryption time based at least in part on the request and or other metadata such that decryption will only succeed when the metadata passes. In some embodiments, policy may constrain whether a cryptographic operation can be performed with respect to particular AAD. Processing of Encrypt (KeyID, Data, [AAD]) requests may require, by programming logic and/or policy enforced by the cryptography service, both that the AAD contain particular values and that the AAD be authentic (e.g., not modified since original transmission). Similarly, a Decrypt(KeyID, Ciphertext, [AAD]) request may be used to cause the cryptography service to decrypt the specified ciphertext using a key identified by the KeyID. The AAD in the Decrypt(KeyID, Ciphertext, [AAD]) request may be used such as described above. For instance, processing of the Decrypt(KeyID, Ciphertext, [AAD]) may require, by programming logic and/or policy enforced by the cryptography service, both that the AAD contain particular values and that the AAD be authentic (e.g., not modified since original transmission).

The Shred(KeyID), in an embodiment, may be used to cause the cryptography service to electronically shred a key or family of keys identified by the specified KeyID. Electronic shredding may include making the key no longer accessible. For example, use of the Shred(KeyID) request may cause the cryptography system to command one or more hardware devices to perform a SecureErase operation on one or more keys identified by the specified KeyID. Generally, the key(s) identified by the KeyID may be electronically shredded in any suitable manner, such as by overwriting data encoding the key with other data (e.g., a series of zeros or ones or a random string). If the key(s) are stored encrypted under a key, the key used to encrypt the keys may be electronically shredded, thereby causing a loss of access to the key(s). In some embodiments, the shred operation may cause decrypt operations indicating the shredded KeyID to fail at some determined point in the future. Other manners of securely and permanently destroying any possible access to the key(s) may be used.

The ReKey(Ciphertext, OldKeyID, NewKeyID) request, in an embodiment, may be used to cause the cryptography service to encrypt ciphertext under a different key. When the cryptography service receives a ReKey(Ciphertext, OldKeyID, NewKeyID) request, it may use a key identified by the OldKeyID to decrypt the specified ciphertext and then use a key identified by the NewKeyID to encrypt the decrypted ciphertext. If a key identified by the NewKeyID does not yet exist, the cryptography service may generate a key to use and associate the generated key with the specified NewKeyID, such as described in connection the Create(KeyID) request described above. In some embodiments, the ReKey operation may be operable to cause data to be transferrable between isolated instances of a cryptography service. In some embodiments, a policy might permit a rekey operation to be performed on a ciphertext but might not permit the same requestor to directly decrypt the ciphertext. In some embodiments, ReKey might support rekeying a ciphertext from a key identified by a first KeyID within a first account to a key identified by a KeyID within a second account.

Similarly, the frontend system may implement a policy configuration API which, in an embodiment, enables users to submit requests for configuring policies for the performance of cryptographic operations and for other policy-related operations. Policies may be associated with keys, groups of keys, accounts, users and other logical entities in various embodiments. Example policies, which may be configured via the policy configuration API, are provided below. In an embodiment, the cryptography service policy configuration API includes the following requests:

SetKeyPolicy(KeyID, Policy)
Suspend(KeyID, Public Key)
Reinstate(KeyID, Private Key)

In an embodiment, the SetKeyPolicy(KeyID, Policy) request may be used to cause the cryptography service to store a policy on the key (or family of keys) identified by the KeyID. A policy may be information that is determinative of whether a requested cryptographic operation can be performed in a particular context. The policy may be encoded in a declarative access control policy language, such as eXtensinble Access Control Markup Language (XACML), Enterprise Privacy Authorization Language (EPAL), Amazon Web Services Access Policy Language, Microsoft SecPol or any suitable way of encoding one or more conditions that must be satisfied for a cryptographic operation to be performed. Policies may define what operations can be performed, when the operations can be performed, which entities can make authorized requests for operations to be performed, which information is required for a particular request to be authorized, and the like. In addition, policies may be defined and/or enforced using access control lists, privileges associated with users, and/or operation bitmasks in addition to or instead of the examples given above. Example policies appear below.

In some embodiments the cryptographic service may support a suspend operation, e.g., using a Suspend(KeyID, Public Key) API call. A suspend operation enables the customer of the cryptographic service to deny the operator of the cryptographic service use of or access to a key. This can be useful to customers concerned about covert lawful orders or other circumstances in which the operator of the cryptographic service might be compelled to perform some operation using a key. It may also be useful to customers that wish to lock particular data and render it inaccessible online. In some embodiments, a suspend operation might include receiving a public key from a customer and encrypting the key specified by a given KeyID with the received public key and shredding the key specified by the KeyID, such that the provider is not able to access the suspended key unless the private key associated with the public key is provided, e.g., using a Reinstate (KeyID, Private Key) API Call that both specifies the KeyID and includes the private key. In some other embodiments, a suspend operation might involve encrypting a key associated with a specified KeyID using another key managed by the cryptographic service, including without limitation one created for the purpose of the instant suspend operation. The ciphertext produced by this operation can be provided to the customer and not retained within the cryptographic service. The original key identified by the KeyID can then be shredded. The cryptographic service may be operable to receive the provided cipertext and re-import the suspended key. In some embodiments the ciphertext may be generated in a manner that will prevent the cryptographic service from returning a decrypted version to the customer.

As illustrated in FIG. 16, the cryptography service 1600 includes a backend system that itself comprises various components in some embodiments. For example, the backend system in this example includes a request processing system which may be a subsystem of the cryptography service 1600 that is configured to perform operations in accordance with requests received through either the request API or the policy configuration API. For example, the request processing component may receive requests received via the request API and the policy configuration API determines whether such requests are authentic and are therefore fulfillable and may fulfill the requests. Fulfilling the request may include, for example, performing and/or having performed cryptographic operations. The request processing unit may be configured to interact with an authentication interface which enables the request processing unit to determine whether requests are authentic. The authentication interface may be configured to interact with an authentication system such as described above. For example, when a request is received by the request processing unit, the request processing unit may utilize the authentication interface to interact with an authentication service which may, if applicable, provide authentication proof that may be used in order to cause a performance of cryptographic operations.

The backend system of the cryptography service 1600 also, in this illustrative example, includes a plurality of a security modules (cryptography modules) and a policy enforcement module. One or more of the security modules may be hardware security modules although, in various embodiments, a security module may be any suitable computer device configured according to have capabilities described herein. Each security module in an embodiment stores a plurality of keys associated with KeyIDs. Each security module may be configured to securely store the keys so as to not be accessible by other components of the cryptography service 1600 and/or other components of other systems. In an embodiment, some or all of the security modules are compliant with at least one security standard. For example, in some embodiments, the security modules are each validated as compliant with a Federal Information Processing Standard (FIPS) outlined in FIPS Publication 140-1 and/or 140-2, such as one or more security levels outlined in FIPS Publication 140-2. In addition, in some embodiments, each security module is certified under the Cryptogrpahic Module Validation Program (CMVP). A security module may be implemented as a hardware security module (HSM) or another security module having some or all capabilities of an HSM. In some embodiments, a validated module is used to bootstrap operations. In some embodiments, customers can configure some keys that are stored in and operated on only by validated modules and other keys that are operated on by software. In some embodiments, the performance or cost associated with these various options may differ.

The security modules may be configured to perform cryptographic operations in accordance with instructions provided by the request processing unit. For example, the request processing unit may provide ciphertext and a KeyID to an appropriate security module with instructions to the security module to use a key associated with the KeyID to decrypt the ciphertext and provide in response the plaintext. In an embodiment, the backend system of the cryptography service 1600 securely stores a plurality of keys forming a key space. Each of the security modules may store all keys in the key space; however, variations are considered as being within the scope of the present disclosure. For example, each of the security modules may store a subspace of the key space. Subspaces of the key space stored by security modules may overlap so that the keys are redundantly stored throughout the security modules. In some embodiments, certain keys may be stored only in specified geographic regions. In some embodiments, certain keys may be accessible only to operators having a particular certification or clearance level. In some embodiments certain keys may be stored in and used only with a module operated by a particular third party provider under contract with the provider of data storage services. In some embodiments, constructive control of security modules may require that lawful orders seeking to compel use of keys other than as authorized by the customer to involve either additional entities being compelled or additional jurisdictions compelling action. In some embodiments, customers may be offered independent options for the jurisdiction in which their ciphertexts are stored and their keys are stored. In some embodiments, security modules storing keys may be configured to provide audit information to the owner of the keys, and the security modules may be configured such that the generation and providing of audit information not suppressible by the customer. In some embodiments, the security modules may be configured to independently validate a signature generated by the customer such that the provider (e.g., hosting the security modules) is not able to perform operations under keys stored by the security modules. In addition, some security models may store all of the key space and some security modules may store subspaces of the key space. Other variations are also considered as being the scope of the present disclosure. In instances where different security modules store different subspaces of the key space, the request processing unit may be configured such as with a relational table or other mechanism to determine which security module to instruct to perform cryptographic operations in accordance with various requests.

In an embodiment, the policy enforcement module is configured to obtain information from a request processing unit and determine, based at least in part on that information, whether the request received through the API may be performed. For example, when a request to perform cryptographic operation is received through the request API, the request processing unit may interact with the policy enforcement module to determine whether fulfillment of the request is authorized according to any applicable policy such as policy applicable to a specified KeyID in the request and/or other policies such as policy associated with the requestor. If the policy enforcement module allows fulfillment of the request, the request processing unit may, accordingly, instruct an appropriate security module to perform cryptographic operations in accordance with fulfilling the request.

As with all figures described herein, numerous variations are considered as being within the scope of the present disclosure. For example, FIG. 16 shows the policy enforcement module separate from security modules. However, each security module may include a policy enforcement module in addition to or instead of the policy enforcement module illustrated as separate. Thus, each security module may be independently configured to enforce policy. In addition, as another example, each security module may include a policy enforcement module which enforces policies different from policies enforced by a separate policy enforcement module. Numerous other variations are considered as being within the scope of the present disclosure.

Figure 17:
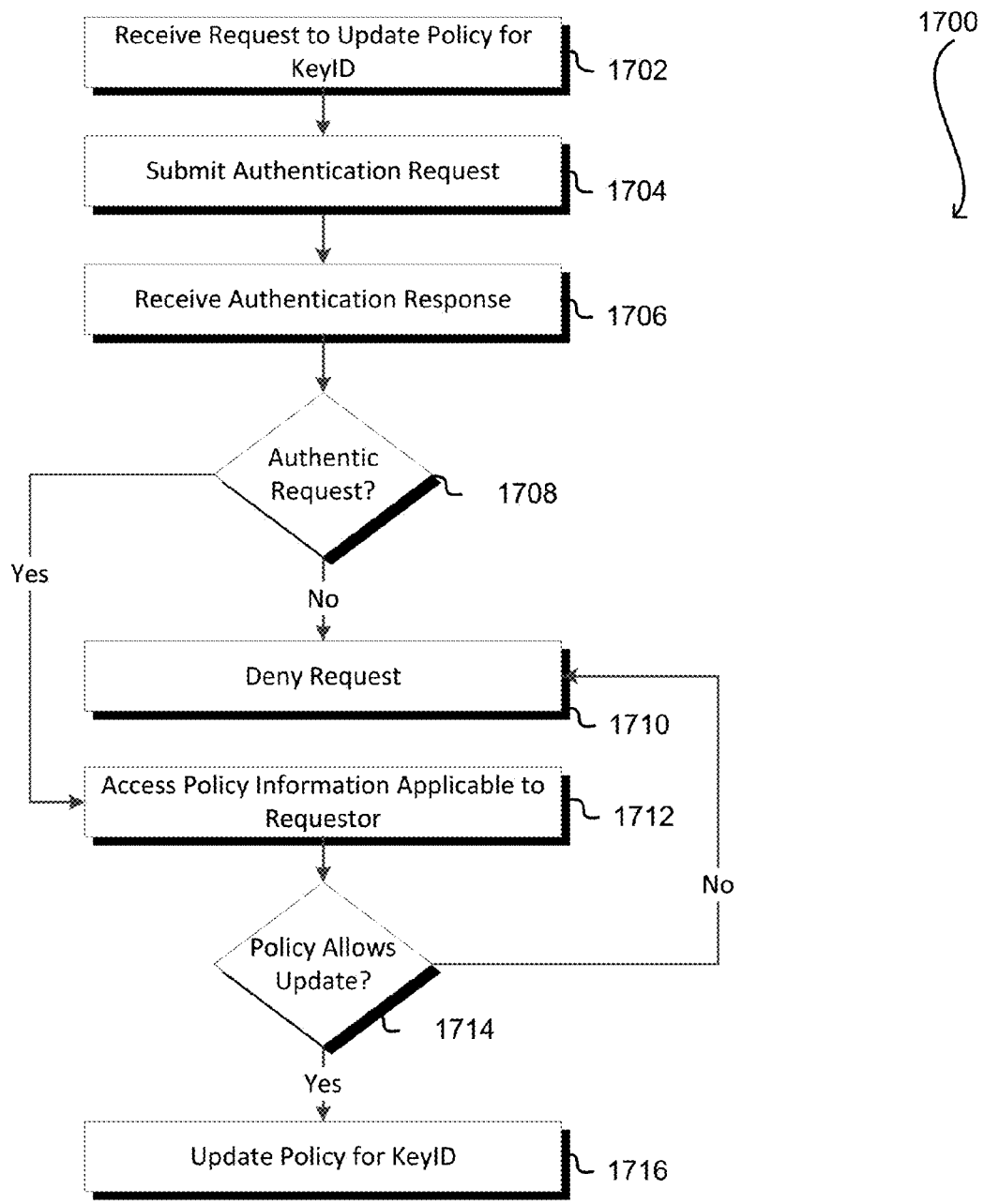
FIG. 17 shows example steps of an illustrative process for configuring policy, in accordance with at least one embodiment.

As discussed above, various policies may be configured by users in or association with KeyID such that when requests specify cryptographic operations being performed in connection with keys corresponding to KeyIDs, policy may be enforced. FIG. 17 provides an illustrative example of the process 1700 for updating policy in accordance with various embodiments. Process 1700 may be performed by any suitable system, such as by a cryptography service system, such as described above in connection with FIG. 16. In an embodiment, the process 1300 includes receiving 1302 a request to update policy for a KeyID. The request may be received 1302 in any suitable manner. For example, referring to FIG. 16 as an example, a request may be received through a policy configuration API of the frontend system of the cryptography service 1600 described above. The request may be received in any suitable manner.

The process 1700 in an embodiment includes submitting 1704 an authentication request and receiving 1706 an authentication response. Submitting 1704 the authentication request and receiving 1706 the authentication response may be performed in any suitable manner such as described above. Also as described above, the received authentication response may be used to determine 1708 whether the request to update policy for the KeyID is authentic. If it is determined 1708 that the received request to update policy for the KeyID is not authentic, the request may be denied 1710. Denying 1710 the request may be performed in any suitable manner as described above. If, however, it is determined 1708 that the received request to update policy for the KeyID is authentic, the process 1700 may include accessing 1712 policy information applicable to the requestor. The policy information may be information from which any policy applicable to the requestor may be enforced. For example, within an organization that utilizes a cryptography service performed by process 1700, only certain users of the organization may be allowed to update policy for KeyIDs. Policy information may indicate which users are able to cause the cryptography service to update policy for the KeyID and/or even whether the policy is updatable according to an existing policy. For example, a cryptography service may, in some embodiments, receive request to enforce a new policy. The cryptography service may check whether any existing policy allows the new policy to be put into place. If the cryptography service determines that the existing policy does not allow enforcement of the new policy, the request may be denied. Generally, the policy information may be any information usable for the enforcement of policy applicable to the requestor.

As illustrated in FIG. 17, the process 1700 includes using the access policy information to determine 1704 whether policy allows the requested update to be performed. If it is determined 1714 that the policy does not allow the requested update to be performed, the process 1700 may include denying 1710 the request such as described above. If, however, it is determined 1714 the policy allows the requested update to be performed, the process 1700 may include updating 1716 policy for the KeyID. Updating policy for the KeyID may include updating policy information and having the updated policy being stored in accordance with or in association with the KeyID. The updated policy information may be stored, for example, by a policy enforcement module of the cryptography service such as described above, in connection with FIG. 16.

Policy may also be enforced by other components of an electronic environment that operate in connection with a cryptography service. For instance, referring FIG. 2, discussed above, a cryptography service may provide an electronic representation of a policy to the data service frontend for the data service frontend to enforce. Such may be useful in circumstances where the data service is better suited to enforce the policy. For example, whether an action is allowed by policy may be based at least in part on information accessible to the data service frontend and not to the cryptography service. As one example, a policy may depend on data stored by the data service backend storage system on behalf of a customer associated with the policy.

Figure 18:
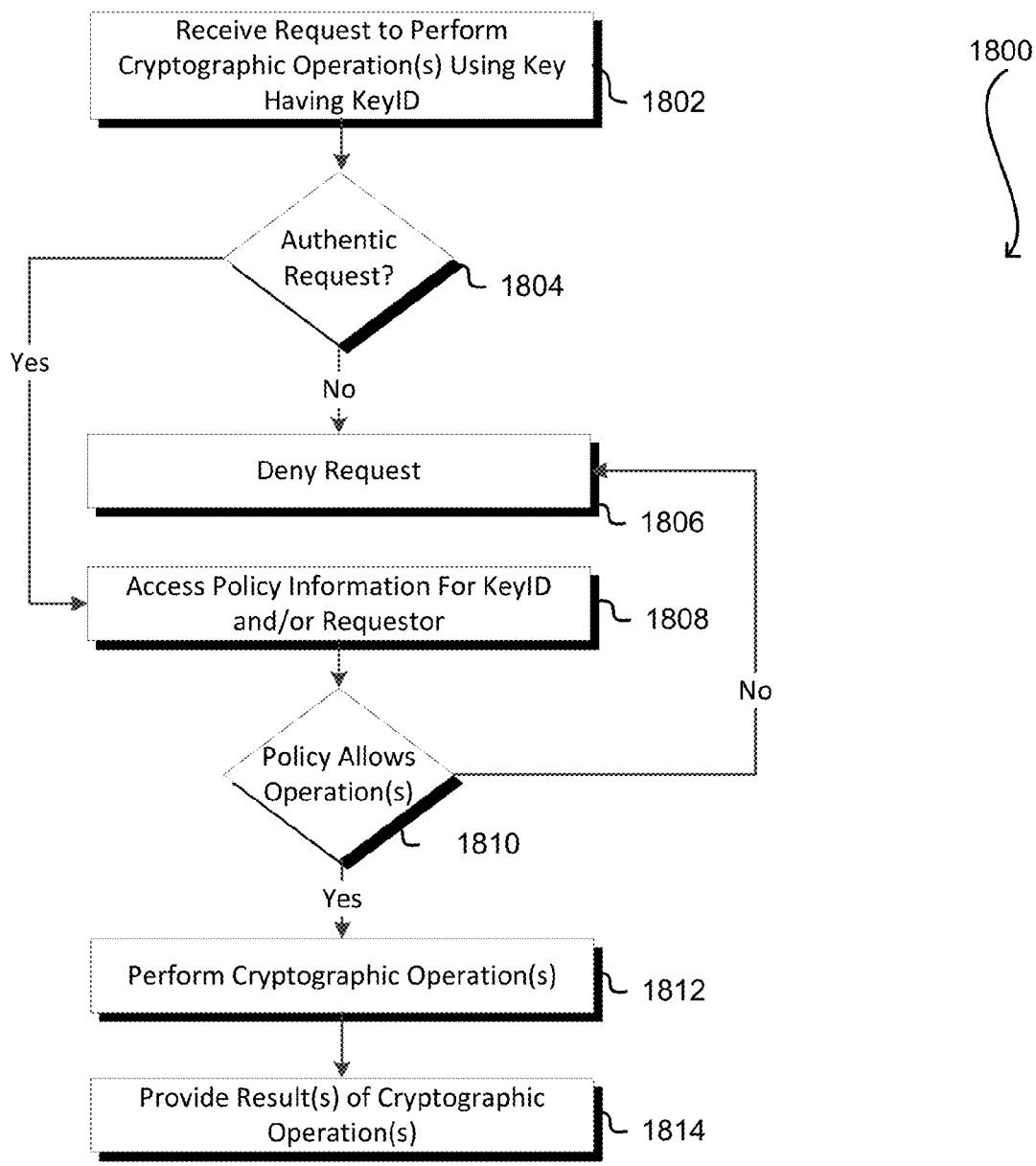
FIG. 18 shows example steps of an illustrative process for performing cryptographic operations while enforcing policy, in accordance with at least one embodiment.

As discussed above, a cryptography service may include various systems that allow for the enforcement of policy in accordance with policy on keys having KeyIDs. FIG. 18, accordingly, shows an illustrated example of a process 1800 which may be used to enforce policy. The process 1800 may be performed by any suitable system such as by a cryptography service system such as described above in connection with FIG. 16. In an embodiment, the process 1800 includes receiving 1802 a request to perform one or more cryptographic operations using a key having a KeyID. While FIG. 18 illustrates the process 1800 as being performed in connection with a request to perform one or more cryptographic operations, it should be noted that the process 1800 may be adapted for use with any request to perform an operation which is not necessarily cryptographic. Example operations are described above.

A determination may be made 1804 whether the received request is authentic. Determining whether the received request is authentic may be performed in any suitable manner such as described above. For instance, determining 1804 whether the request is authentic may include submitting an authentication request and receiving an authentication response such as described above. If it is determined 1804 that the request is not authentic, the process 1800 may include denying 1806 the request. Denying 1806 the request may be performed in any suitable manner such as described above. If, however, it is determined 1804 that the request is authentic, the process 1800 may include accessing 1808 policy information for the KeyID and/or the requestor. Accessing policy information for the KeyID and/or request may be performed in any suitable manner. For example, accessing policy information for the KeyID and/or requestor may be performed by accessing the storage policy information from one or more storage systems that store such policy information. The access policy information may be used to determine 1810 whether policy allows the one or more operations to be performed.

If it is determined 1810 that policy does not allow the one or more operations to be performed, the process 1800 may include denying 1806 the request. If, however, it is determined that policy does allow the one or more operations to be performed, the process 1800 may include performing 1812 the requested one or more cryptographic operations. One or more results of performance of the one or more cryptographic operations may be provided 1814 such as provided to the requestor that submitted the received 1802 request to perform the one or more cryptographic operations. In some embodiments information derived at least in part from allowed requests and or denied requests may be provided through an audit subsystem.

As discussed, embodiments of the present disclosure allow for flexible policy configuration and enforcement. In some embodiments, policies may state which services can perform which operations in which contexts. For example, a policy on a key may allow a data storage service to cause the cryptography service to perform encryption operations but not decryption operations. A policy on a key may also include one or more conditions on the ciphertext and/or decrypted plaintext. For example, a policy may require that the ciphertext and/or plaintext produce a certain hash value (which may be a keyed hash value) before results of an operation be provided in response to a request. Policies may specify one or more restrictions and/or permissions that are based at least in part on time, Internet Protocol (IP) from which requests originate, types of content to be encrypted/decrypted, AAD, and/or other information.

Numerous variations are considered as being within the scope of the present disclosure. For example, various embodiments discussed above discuss interaction with a separate authentication service. However, components of the environments discussed above may have their own authorization components and determining whether requests are authentic may or may not involve communication with another entity. Further, each of the environments discussed above are illustrated in connection with particular operations and capabilities enabled by the environments. The techniques discussed above in connection with different environments may be combined and, generally, environments in accordance with the present disclosure may allow for flexible use of the various techniques. As just one example, a cryptography service may be used to, upon request, encrypt both keys and other content, such as non-key data objects. As another example, a cryptography service may be configured to receive and respond to requests from both users (e.g., customers of a computing resource provider) and other services (e.g., data storage services). In some embodiments, a cryptography service and/or associated authentication service may be configured for use with a mobile device to perform encryption of stored data. In some embodiments at least one unlock pin may be validated by a cryptography service. In still other embodiments a cryptographic service, as part of an operation, may receive information generated by a hardware attestation. In some embodiments a cryptography service may be operable to provide digital rights management services with respect to content.

Figure 19:
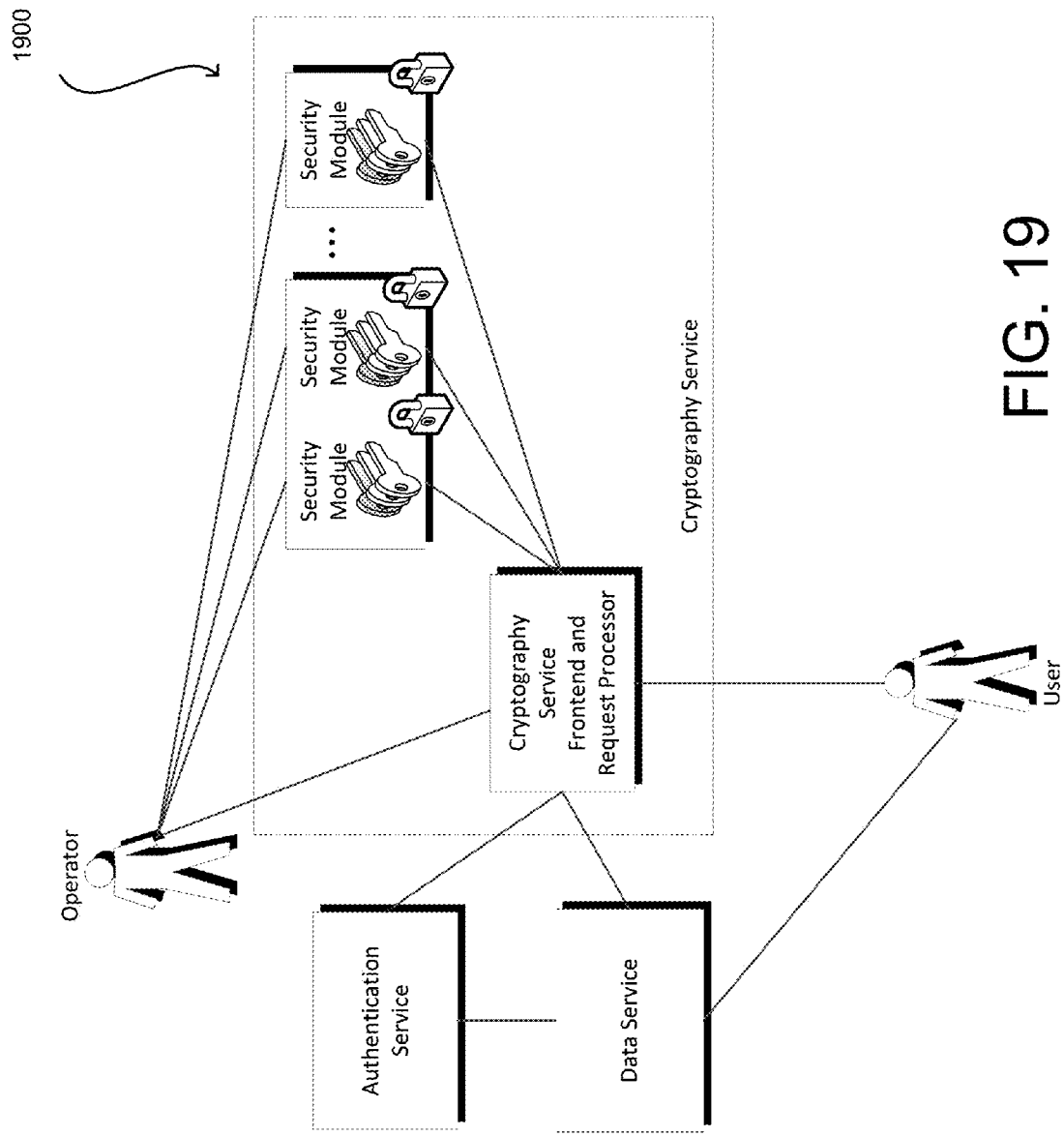
FIG. 19 shows an illustrative example of an environment in which various embodiments may be implemented.

As discussed above, various embodiments of the present disclosure involve the use of security modules. FIG. 19 shows an illustrative example of an environment 1900 in which various embodiments of the present disclosure utilizing security modules may be implemented. The environment 1900 illustrated in FIG. 19 may be and/or may include components of environments described above. For example, as illustrated in FIG. 19, the environment 1900 includes an authentication service, a data service and a cryptography service. The authentication service may be configured to communicate with the data service and/or other services for the purpose of authentication, such as in ways discussed above. The data service may, in order to determine whether to fulfill requests submitted to the data service, provide information to the authentication service for information indicating whether the requests should be fulfilled, such as described above. Similarly, as illustrated, the data service may be configured to communicate with users of the data service such as described above. For instance, the users may be human operators operating corresponding computing devices and/or systems or services. Also, the data service may be operable to submit requests to the cryptography service to cause the cryptography service to perform cryptographic operations. For instance, the data service may be operable to make the same type of API calls to the cryptography service as do users. The data service may be, for example, a data storage service or a remote program execution service such as described above. Generally, any service that operates in connection with data may be used as the data service in the environment 1900. Similarly, while the environment 1900 shows a single entity labeled as a data service, the environment 1900 may have multiple data services. Similarly, in some instances, the environment 1900 may lack a data service.

The cryptography service, in an embodiment, includes a cryptography service frontend and request processor and one or more security modules. While the cryptography service frontend and request processor may be separate components of a cryptography service, they are illustrated as one in FIG. 19 for the purpose of simplification of the illustrated embodiment. For example, the cryptography service frontend may be configured, such as described above. The request processor may be configured to process requests received through the frontend.

Referring to FIG. 16, in an embodiment, the request processor comprises the request processing unit and authentication interface of the cryptography service illustrated in the figure, although other configurations are considered as being within the scope of the present disclosure. As such, as illustrated in FIG. 19, the cryptography service frontend and request processor may utilize at least two APIs, a lower latency API for requesting operations in connection with customer keys and the other for administrative operations, such as described below. The two different APIs may use different protocols. For instance, the lower latency API may operate over UDP and the other API may use a SSL transport.

A security module, such as illustrated in FIG. 19, may be a system configured to manage keys on behalf of entities utilizing the cryptography service frontend. For example, if the cryptography service is hosted by a computing resource provider, a security module may manage keys on behalf of customers of the computing resource provider. A security module may also manage keys on behalf of other entities such as data services and/or internal users of an organization hosting the security module. In various embodiments, a security module operates according to executable instructions that are not updatable while the security module has access to the customer keys. The cryptography service and frontend, on the other hand, may operate according to executable instructions that are updatable while the security module has access to the customer keys.

As illustrated in FIG. 19, the environment 1900 may include one or more operators. An operator may be a component (e.g., user, via a user computing device) capable of executing API calls against a cryptography domain (discussed below) via security modules that are members of the cryptography domain. As such, an operator may be a user utilizing a computing device or a system configured to interact with the cryptography service frontend and request processor and one or more of the security modules in order to perform administrative functions such as described below. Operators may, accordingly, have administrative privileges in the cryptography service. However, policy may be enforced such that, for example, the set of API calls that an operator can (successfully) make is constrained at the time the operator is added to a security domain. An operator may interact with the cryptography service frontend for the purpose of maintenance, code updates, auditing and the like. Similarly, an operator may interact with security module for the purpose of providing code updates to the security module, providing keys to the security module (such as described below) and/or for obtaining audit logs from a security module and/or for performing other administrative functions including other additional functions described below. Further, as described below, an operator may orchestrate communications between the cryptography service frontend and the one or more security modules. For instance, as described in more detail below, an operator may orchestrate communications between the security modules and a request processing unit of the request processor to create cryptographic domains and/or join security modules to cryptographic domains.

It should be noted that, while FIG. 19 shows a single operator, the environment 1900 may include multiple operators. For example, in some contexts, certain functions may require input from multiple operators (e.g., input from a set of operators that satisfies a set of one or more conditions for a quorum) to be performed. Such requirements may be useful, for example, in contexts where security concerns are addressed by requiring multiple human actors in order for certain functions to be performed, thereby reducing the likelihood that a single human actor can cause security breaches.

Other variations, such as those described below, are also considered as being within the scope of the present disclosure.

Figure 20:
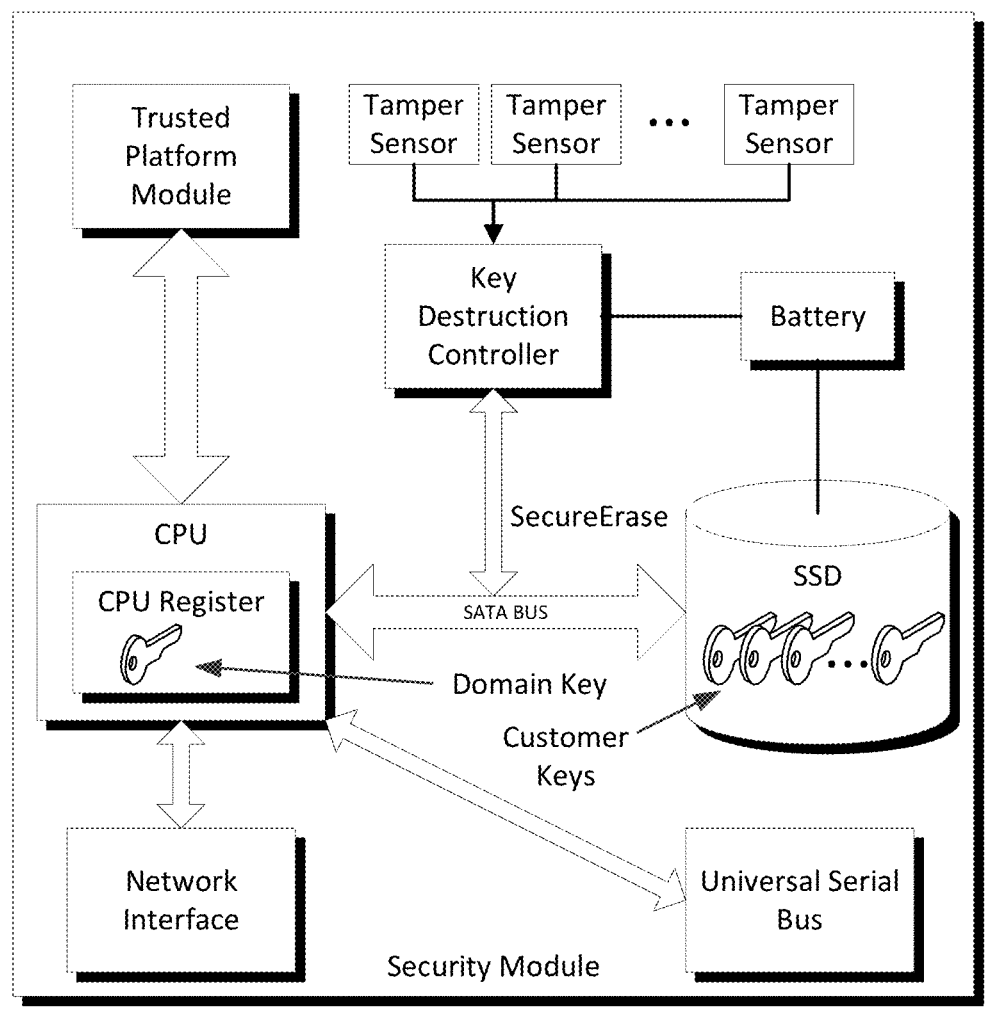
FIG. 20 shows an illustrative component diagram of a security module in accordance with at least one embodiment.

As noted above, various types of computer systems may implement security modules such as described above. Generally, any computer system configured to perform operations of the security module may be used in various embodiments. FIG. 20 shows an illustrative example of a security module in accordance with an embodiment. In this example, the security module includes numerous components that collectively operate to perform operations. It should be noted that the security module illustrated in FIG. 20 is simplified for the purpose of illustration and that security modules may include additional components which are not illustrated. In addition, in some embodiments certain components are omitted and/or replaced by other components. While not illustrated in the figure, a security module may include a motherboard and/or other appropriate circuitry for electronically connecting the various components that are illustrated. Similarly, a security module may include other components such as a housing, a power supply connectible to a power grid (e.g., through a rack power supply) and/or other components not illustrated in FIG. 20.

As illustrated in FIG. 20, the security module may include a network interface. The network interface may be hardware configured to enable communication of the security module over a network. For example, the network interface may be a network interface controller, also known as a network interface card or network adaptor, comprising hardware configured to enable communication of that security module to other computing devices over a suitable communications network. It should be noted that various types of network interfaces may be used in accordance with the present disclosure and characteristics of a network interface may vary according to different networks used to implement various embodiments of the present disclosure. For example, in an embodiment, the network interface includes an Ethernet network controller that enables the security module to communicate over a local area network. Other types of network interfaces may be used for other types of network communication, such as optical communication over fiber.

Communications received by the network interface may be provided to a central processing unit (CPU) of the security module. For example, electronic requests to perform cryptographic operations may be received through the network interface provided to the CPU for processing. The CPU may be any suitable processor or collection of processors operable to operate in accordance with executable instructions. Further, while a single processor is illustrated, a security module may include multiple processors. Executable instructions may be provided to the processor from local storage and/or the processor may be preprogrammed with the executable instructions. That is, the processor may be a commodity processor or a custom built processor configured to perform operations described herein. As illustrated in the figure, the CPU includes a CPU register which may comprise an amount of data storage for use by the CPU. Further, as illustrated by FIG. 20, the CPU register may be used to store a domain key for a cryptographic domain, which is described in more detail below. The CPU register may also be used for storage of other information, such as one or more customer keys managed by the security module. Further, keys stored in the CPU register may be dynamically determined. For instance, the security module may be configured to measure the frequency of customer key use. A number of most frequently used customer keys may be stored in the CPU register, thereby increasing the speed at which the CPU is able to access and use the most frequently used customer keys. The customer keys stored in the CPU register may be updated as use frequency changes over time. By storing the domain key and/or other information in the CPU register, a loss of power to the security module, in various embodiments, will result in a loss of access to the domain key and/or other information, even if/when power is restored.

Generally, the CPU is configured to communicate with various other components of the security module. For instance, in an embodiment, the security module includes a trusted platform module (TPM). The TPM, in an embodiment, is hardware implementing trusted platform module specifications published by the Trusted Computer Group. For example, in an embodiment, the TPM includes an input/output interface, a cryptographic processor persistent memory and a volatile memory. The cryptographic processor may be configured to perform various cryptographic operations, such as random number generation, key generation such as for RSA keys, hash generation such as for SHA-1 hash generation and/or encryption and/or decryption according to one or more cryptographic algorithms, such as those discussed above. In an embodiment, the TPM is configured to perform various operations such as remote attestation which may comprise generation of a hash-key summary of the hardware and software of the TPM, thereby allowing other entities to verify, using the hash key summary, that software of the TPM has not been modified from an expected stage. The TPM may be a custom TPM or may be a commodity TPM obtained from any of a number manufacturers such as TPMs produced by Atmel, Broadcom, Infineon, Sinosun, STMicroelectronics, Nuvoton, ITE, Toshiba and/or Intel.

In an embodiment, the security module includes a solid state drive (SSD) which stores various information accessed by the CPU in order to perform various operations. For example, in some embodiments, the SSD may store instructions executable by the CPU to enable the CPU to perform various operations described herein. In addition, as illustrated in FIG. 20, the SSD may store one or more customer keys. In an embodiment, a customer key is a key managed by the security module on behalf of another entity such as a user or the data service described above. For the purpose of illustration, keys stored in the SSD of the security module of FIG. 20 are referred to as customer keys and described in connection with embodiments where each customer key is managed on behalf of a customer of a computing resource provider that hosts the security module and, while the term "customer key" is used for the purpose of illustration, and to distinguish from other types of keys, the keys managed by the security module are not necessarily those of customers of a particular entity. For example, various techniques described herein are applicable in a variety of contexts, such as use of a security module in an organization's internal operations.

The CPU may obtain data from the SSD in various ways. For example, in an embodiment, the security module includes a bus that enables the transfer of data between the CPU and the SSD. In an embodiment, the bus is a serial ATA (SATA) bus, although other buses may be used in accordance with various embodiments and different components which may be utilized as the security module.

In an embodiment, the security module also includes a universal serial bus (USB). The USB enables operators to provide and obtain information from the security module by connecting directly to the security module. For example, as described below, an operator may provide executable instructions for operation of the security module using a flash drive utilizing a USB interface. The security module may be configured to only accept code updates via the USB interface. For example, an operator may use the USB to provide updated code to the security module for the purpose of enhancements, bug fixes other updates. While a USB interface is used for the purpose of illustration, it should be noted that any suitable wired or other interface may be used in various embodiments. For example, the network interface may be used to provide code updates for the security module, in some embodiments.

In an embodiment, the security module is constructed with enhanced security for customer keys managed by the security module. Accordingly, in an embodiment, the security module includes one or more tamper sensors. For example, in various embodiments, components of the security module are enclosed in a housing, which may comprise a metal and/or plastic shell enclosing a cavity in which the components of the security module are positioned. The housing may include multiple components that are secured together with adhesive tape and/or glue that is configured to irreversibly indicate a break in the tape and/or glue caused by an attempt to separate housing components. One or more of the tamper sensors may be configured to detect attempts to open the housing or otherwise gain access into the interior of the housing. For example, a tamper sensor may comprise circuitry configured to change its operational characteristics in accordance with various events that can occur in connection with the housing of the security module. For example, opening the security module may cause an electrical connection to be severed, therefor causing one or more of the tamper sensors to activate. Other sensors may also be used such as vibration sensors, sensors that detect changes in the security module's physical orientation, sensors that detect a loss of power from a main power supply and/or generally any sensors that are configured to detect intrusion into the interior of the security module or other events that trigger erasure of customer keys (such as main power supply losses, as described below). In some embodiments, the housing includes components that are mechanically secured together by a lockable mechanism, such as a latch. The lock may be configured with sensors that activate when an attempt to pick the lock (e.g., attempt to unlock the lock without a key configured for the lock) occurs. Other types of sensors and/or combinations thereof may also be used.

In an embodiment, the security module is configured such that activation of one or more of the tamper sensors causes customer keys to become inaccessible. Causing customer keys to become inaccessible may be performed in various ways in accordance with the various embodiments. For example, FIG. 20 illustrates one way in which customer keys may be rendered inaccessible. In particular, as illustrated in FIG. 20, the tamper sensors are communicatively connected with a key destruction controller which may be hardware (e.g., circuitry including a processor) configured to issue an erase command to the SSD to erase customer keys when appropriate. In an embodiment, the key destruction controller's processor(s) is/are separate from the CPU, e.g. as part of a data storage subsystem, such that, even if the CPU is inoperable, the key destruction controller is able to operate as described below. For example, in an embodiment, the key destruction controller is electrically connected to the SATA bus such that, when a need to erase customer keys is detected by the key destruction controller, the key destruction controller issues a SecureErase command over the SATA bus to the SSD, thereby causing the SSD to securely erase the customer key stored thereon. In other embodiments, such as where different types of storage devices are used, a different type of command causing lost access to customer keys may be used. In the embodiment illustrated in the figure, the key destruction controller may be electrically connected to the SATA bus in any suitable manner. For example, the key destruction controller may be connected with the SATA bus such that any commands issued simultaneously with the erase command do not conflict, potentially causing the erase command to be unfulfilled by the SSD. For example, the key destruction controller may be configured to break one or more circuits between the SSD and the CPU to disable the CPU's ability to transmit a conflicting command to the SSD. Other techniques for avoiding conflicting commands may also be used.

The key destruction controller may also perform other operations. For example, in an embodiment, the key destruction controller may generate a certificate that states that the SecureErase operation was completed correctly. The certificate may state metadata about the SecureErase operation, such as the time the operation was completed. The security module may, upon reboot or other events, perform a self-test routine to confirm that the SecureErase command was successfully completed. Failure of the self-test may cause the security module to perform one or more predefined operations, such as issuing a SecureErase command again.

Further, as illustrated in FIG. 20, the security module includes a battery, comprising one or more battery cells, to which at least the key destruction controller and SSD are connected. The battery may be rechargeable (e.g., comprising one or more lithium ion or other rechargeable cells) and may be charged during normal operation of the security module by charging circuitry of the security module (not shown). By use of a battery, if a main power supply to the security module is cut off, the battery provides enough power to the key destruction controller and the SSD to enable the key destruction controller to issue the SecureErase command and enable the SSD to fulfill the SecureErase command and securely render the customer keys inaccessible.

It should be noted that the particular configuration of components and the security module are provided for the purpose of illustration and that numerous other components may be used. For example, while FIG. 20 shows an SSD used in accordance with various embodiments, any data storage device may be used. In addition, in other embodiments, customer keys may be stored in volatile memory such that intrusion events and/or a loss of power may cause customer keys to be rendered inaccessible despite the loss of power (from the main power supply). In some embodiments, a volatile memory is separate from the CPU, although, in other embodiments, as noted above, some or all customer keys may be stored in the CPU register. Other variations are also considered as being within the scope of the present disclosure. For instance, in some embodiments, customers are able to specify the type of storage in which keys are to be stored. A customer may, for instance, request that one key be stored in persistent memory (e.g., in one or more SSDs) and another key be stored in volatile memory. Such requests may be part of a request to create a key and/or may be submitted after a key is created. In the latter case, the request may identify key(s) by its/their KeyID.

In an embodiment, a security module operates in a plurality of modes. The plurality of modes, in an embodiment, include a service mode and a use mode. In the service mode, the security module does not store customer keys and does not store a domain key. For example, the security module may be configured to destroy its access to the domain key and customer keys upon detection of entry into security mode (or, alternatively, upon detection of leaving use mode). Access may be destroyed in any suitable manner, such as through a SecureErase command issued to an SSD storing customer keys, removal of power to volatile memory (e.g., CPU register) storing the domain key and/or one or more customer keys, encrypting the domain key and/or one or more customer keys with another key and then losing access to the other key, overwriting (with random, pseudorandom, or other data) memory locations storing the domain key and/or one or more customer keys and/or destroying access in other ways. In security mode, however, an administrative interface is enabled to allow the security module to receive code updates and to perform other administrative functions. The administrative interface may include a secure shell (SSH) console login, a remotely accessible desktop and/or other functionalities. In an embodiment, the security module transitions between the two modes, although, in other embodiments, the security module may have more than two modes.

In use mode, in an embodiment, the security module is configured to store a domain key and one or more customer keys, to use the domain key and/or one or more customer keys such as described in more detail below. For example, when in use mode, a security module may receive requests to perform cryptographic operations using a customer key identified by a KeyID, perform the requested cryptographic operations, and provide results of the performed cryptographic operations in response to the requests. In use mode, however, some or all administrative interfacing abilities of the security module are disabled. For example, in use mode some or all functionalities available through an administrative interface may be blocked while in use mode, although, in some embodiments, a limited number of administrative capabilities may be allowed. For example, in some embodiments, functions using the simple network management protocol (SNMP) may be available in use mode and/or in other modes. As such, in various embodiments, when in use mode, a security module cannot receive code updates. Other capabilities may also be disabled when in use mode.

In an embodiment, some or all components of a security module are implemented using commodity hardware (e.g., a commodity processor, commodity storage device, commodity TPM; commodity motherboard; commodity sensors, commodity cooling fans and/or other commodity hardware components). Commodity hardware may be hardware configured to operate in accordance with a standard, which may be defined by the international Organization for Standardization or another organization and which may be an open standard. Example standards include industry standard architecture (ISA), peripheral component interconnect (PCI), PCI Express, Universal Serial Bus (USB), Serial ATA (SATA) and other standards. As such, a commodity hardware component of a security module that operates in accordance with a standard may be replaceable by another component, possibly of a different manufacture, that operates according to the same open standard. In other words, commodity hardware components may be replaced by other components without affecting the operation of the security module. Commodity hardware components may also lack specialization. For example, commodity hardware components may be obtained from a mass producer of the hardware components without need to specialize the hardware components. In some embodiments, a security module comprises solely commodity hardware. Thus, embodiments of the present disclosure provide numerous technical advantages as they allow the use of commodity hardware (which is obtainable at substantially lower costs than non-commodity hardware) while still ensuring data security.

Security modules in accordance with the present disclosure may be configured to maintain various security measures. For example, in various embodiments, security modules are configured such that customer secrets (e.g., customer keys) may exist in plaintext only in volatile memory. Customer secrets in non-volatile memory must be stored in encrypted form, the encryption performed using a key to which only security modules in the same cryptography domain have access. Further, in various embodiments, security modules are configured such that operators have access to a security module only when the security module itself lacks access to customer secrets in plaintext form. Thus, in such embodiments, a security module cannot be logged into by an operator, although a security module's software stack may provide mechanisms for extracting logs, but will not permit on-box debugging. Logging mechanism that could expose the contents of volatile memory (or generally that could expose customer secrets in plaintext form) are disabled while the security module has access to the customer secrets in plaintext form. In some embodiments, security modules provide verifiable shredding (destruction) of customer secrets by a quorum mechanism combined with master-key rotation (i.e., rotation of the domain key). Further, in various embodiments, security modules are configured to be unable to make API calls to one another. A cryptography service using such security modules may be configured to coordinate all information transfer among security modules of a cryptographic domain. In various embodiments, security modules are FIPS-compliant and/or have gone through FIPS validation, as discussed above. A security module may use a FIPS validated crypto library and minimize dependencies to ease the validation process.

Figure 21:
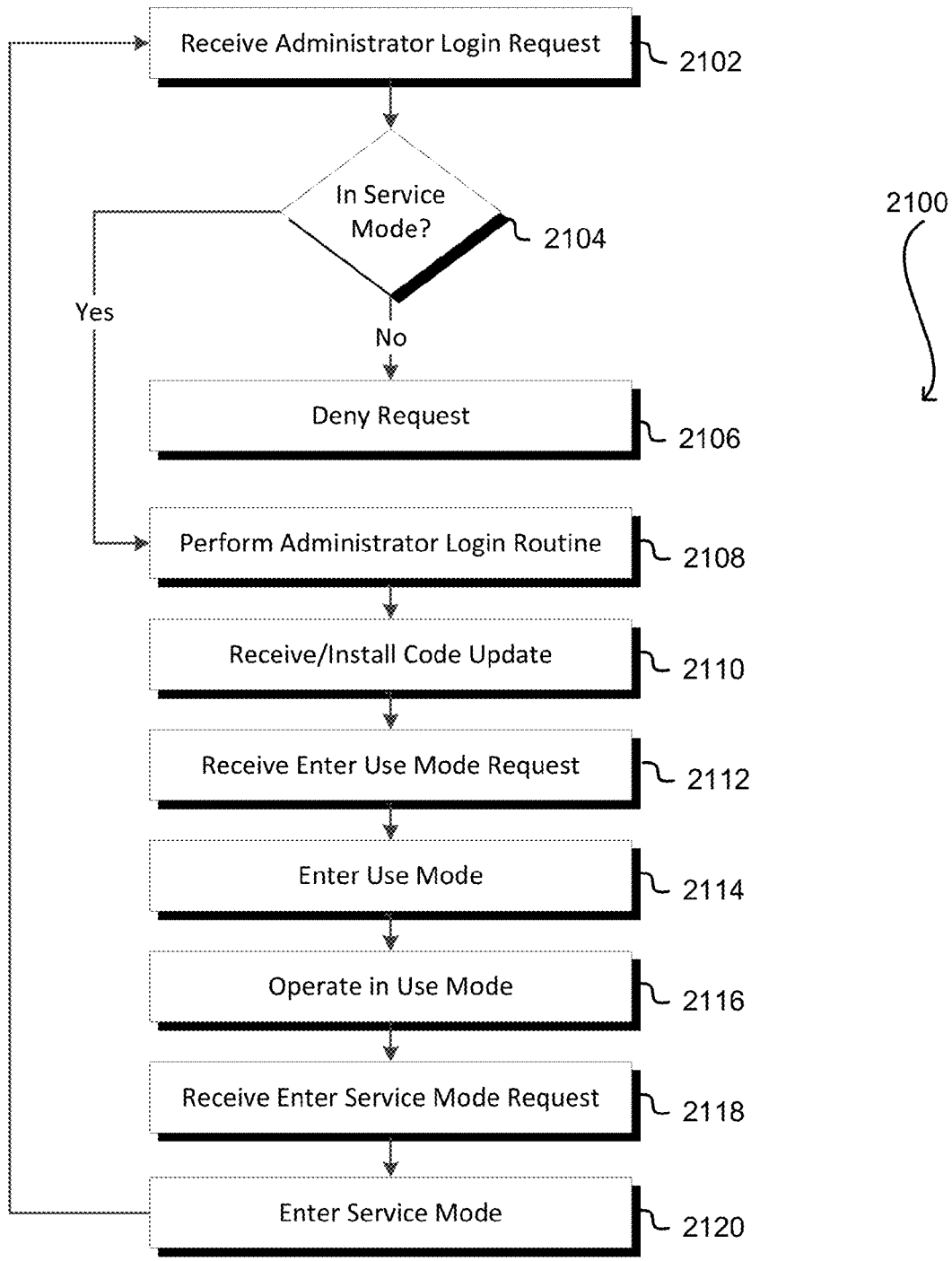
FIG. 21 shows example steps of a process for operating a security module in accordance with at least one embodiment.

FIG. 21 shows an illustrative example of a process 2100 for operation of a security module between security mode and use mode, in accordance with various embodiments. The process 2100 may, for example, be performed by a security module such as described above in connection with FIG. 20 or elsewhere described herein. In an embodiment, the process 2100 includes receiving 2102 an administrator log-in request. The administrator log-in request may be an electronic request to log into an administrative interface of a security module such as through a network or other interface. The administrator login request may be made from an operator as illustrated in FIG. 19 and may include valid security credentials for the operator and/or other information. The security module may determine 2104 whether it is in service mode. If it is determined 2104 that the security module is not in service mode, in an embodiment, the request is denied 2106. Denying 2106 the request may be performed in any suitable manner such as described above. For instance, a message may be transmitted from the security module that the request is denied or the security module may simply not do anything in response to the administrator log-in request. It should be noted that, in various embodiments, the security module may not receive an administrator login request and/or not determine whether it is in service mode. For example, in some embodiments any ability for the security module to receive an administrator login request (or some or all types of administrative requests) may be disabled when the security module is not in service mode. In such embodiments, a reboot (which may be forced by a temporary loss of power) and/or activation of a switch or button of the security module may be required for the security module to enter security mode.

Returning to the illustrated embodiment, if it is determined 2104 that the security module is in service mode, the security module may perform 2108 an administrator log-in routine. The administrator log-in routine may be any routine which the security module is configured to perform in response to the receipt of an administrator log-in request. For example, the administrator log-in routine may comprise, as appropriate, requesting, receiving and/or checking administrator credentials of the administrator that submitted the administrator log-in request. The administrator log-in routine may also include various policy enforcement tasks such as tasks configured to ensure that the administrator is both authorized to log-in to the security module and/or that the administrator is using a computing device that is authorized to be used to log into the security module. Other policy tasks may also be performed, such as by checking whether the security module has been provided information sufficient to indicate a quorum of operators authorizing the login. While not illustrating such, performance of the administrator log-in routine may result in the process 2100 ending. For example, if the administrator log-in routine fails, the process 2100 may end.

Assuming the administrator log-in routine is successful, in an embodiment, the process 2100 includes receiving and installing 2110 a code update which may include updated programming logic for the security module. The code update may be received, for example, over an interface of the security module, such as the USB interface discussed above. Receiving and installing the code update may be performed in any suitable manner and may include various policy enforcement tasks, such as checking whether policy enforced by the security module allows installation of the code update, checking whether information indicating a quorum of operators authorizing the code update has been provided, and/or other policy enforcement. Further, receiving and installing the code update may include other security checks. For instance, the security module performing the process 2100 may use a TPM to provide an attestation of its hardware and software state to enable an operator to verify that the security module is configured correctly and has not been modified. Other information that the security module may provide to enable an operator to enforce policy includes network measurements (e.g., latency, network hops between endpoints and other tracer route data, network fingerprinting information and the like) performed by the security module. With such information, the operator is able to determine that the security module is in the right network. An operator may, if received information indicates something wrong, prevent the security module from managing keys until issues are resolved. Receiving and installing updated code security module may also include receiving an electronic signature of the updated code and checking if the electronic signature is valid. The security module may also, according to the instructions of the updated code, check that it is a valid security module and, if not, configure itself to be unable to execute remaining portions of the code. It should be noted that receiving and/or installing 2110 a code update is provided for the purpose of illustration and that other administrative operations may be performed in addition to or as alternative to receiving and/or installing the code update. Generally, while in service mode, the process 2100 may include any performance of any administrative operation or combination of operations that are authorized while the security module is in the service mode.

Once administrative operations have completed, the process 2100 may include receiving 2112 a request to enter use mode. For example, referring to the environment 1900 discussed above, the operator may transmit an electronic request to the security module performing the process 2100 that the security module is to enter use mode. As with all requests transmitted to the security module, while omitted from the figure for the purpose of simplification of the illustrated embodiment, the process 2100 may include policy enforcement checks to determine whether the requests can, according to policy, be fulfilled. Upon receipt 2112 of the request to enter use mode, the process 2100, in an embodiment, includes entering 2114 use mode. Entering may be performed such as described in more detail below. Once in use mode, in an embodiment, the process 2100 includes operating 2116 in use mode. Operating 2116 in use mode may include performing various cryptographic operations upon request such as described elsewhere herein. Further, operating in use mode may include performing operations involved in the creation and update of cryptographic domains, such as described below.

At some point after operating 2116 in use mode, the process 2100 may include receiving 2118 a request to enter service mode. The request may be received, e.g., from an operator as described above. For example, the operator may be tasked with updating code on the security module performing the process 2100. In some embodiments, physical manipulation or electrically initiated reconfiguration is a prerequisite for entering service mode. For instance, in an embodiment, activation of a switch may physically disconnect one or more storage devices storing keys and connect an administration module configured to allow administrative access to the security module (other than the disconnected storage device(s). As another example, activation of a switch may, without causing a physical disconnection, cause a reconfiguration such that no access to a set of stored keys is available at a time during which an administrative interface is available. Upon receipt 2118 of the request to service mode, the process 2100 may include entering 2110 service mode. Entering service mode may be performed in any suitable manner such as described below. As illustrated in FIG. 21, this process may repeat over time as the security module is used.

As with all processes described herein, variations are considered as being within the scope of the present disclosure. For example, the process 2100 may be modified so that a request to enter service mode is not necessary for a security module to enter service mode. As one example, any reboot of the security module may cause the security module to enter service mode. A reboot may be caused by a request to reboot transmitted to the security module, a detected need to reboot by the security module (e.g., due to a timer expiration, a predetermined number of operations having been performed, and/or for other detected reasons), and/or a power loss or other event causing reboot.

As another example, in some embodiments, at least two operators are required to perform a code update for a security module. For instance, updating code on a security module may involve encrypting, by the security module, customer keys and/or other sensitive (e.g., secret) with a key (e.g., a domain key) that is then exported to a first operator. A second operator, without access to the exported key, may perform operations for providing the security module a code update and, once updated, the first operator may reinstall the key after the second operator has logged out of the security module. Accordingly, obtaining the key by the first operator may involve the first operator logging into the security module, obtaining the key, and then logging out before the second operator is allowed to login and update the security module.

Figure 22:
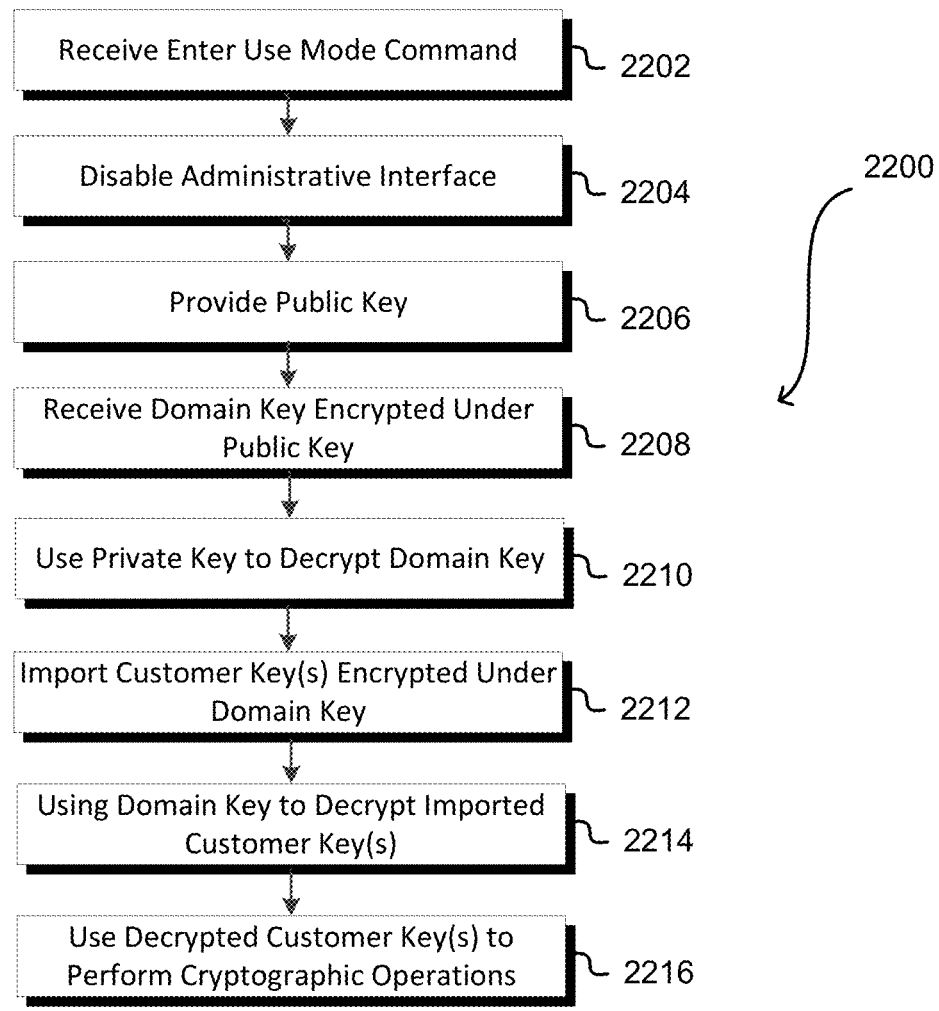
FIG. 22 shows example steps of a process for entering a use mode and performing cryptographic operations in accordance with at least one embodiment.

FIG. 22 shows an illustrative example of a process 2200 which may be used to enter and operate use mode in accordance with an embodiment. The process 2200 may be performed by a security module such as described above. Further, performance of the process 2200 may, in some embodiments, be performed in connection with the process 2100 described above in connection with FIG. 21. In an embodiment, the process 2200 includes receiving 2202 a request to enter use mode. Receiving the request to enter use mode may be performed in any suitable manner. For example, the request to enter use mode may be received 2202 from an operator such as an operator described above in connection with FIG. 19. Further, while not illustrated as such, other actions may be performed in connection with receipt of the request to enter use mode. For example, one or more checks whether the request is authentic may be performed and the process 2200 may not include entering use mode if, for example, it is determined that the received request is not authentic. Also, checks based at least in part on policy may also be performed. Such checks may, for instance, check whether the request includes or whether the security module has been provided information indicating that a quorum of operators have authorized the request.

Turning to the process illustrated in FIG. 22, in an embodiment, the process 2200 includes disabling 2204 an administrative interface. Disabling an administrative interface may be performed in any suitable manner. For example, in an embodiment, the administrative interface is configured such that certain administrative API calls cannot be made while in service mode. Accordingly, disabling 2204 the administrative interface may include reconfiguring the security module such as to not accept API calls that may be made to the administrative interface when the security module is in service mode. In some embodiments, the administrative interface may be configured to deny certain API calls and in other embodiments, the administrative may be completely disabled so that receipt of the API calls is not possible. Disabling the administrative interface may be temporary. For example, in some embodiments, a reboot or other event allowing entrance into service mode may enable the administrative interface.

In an embodiment, the process 2200 includes securely obtaining a domain key for a cryptographic domain. In an embodiment, securely obtaining the domain key includes providing 2206 a public key of the security module performing the process 2200. The public key may be a public key usable in a cryptographic process that utilizes public and private keys, where the security module has access to an appropriate private key that is usable to decrypt information encrypted under the public key. The security module may be the only entity that has access to the private key in plaintext form (e.g., private keys may be configured to be destroyed upon physical intrusion into the security module and/or private keys may be stored only in volatile memory so that a loss of power results in loss of the private key and a need to regenerate a private key for future operations).

Example cryptographic processes are cryptographic processes utilizing various techniques including, but not limited to Diffie-Hellman key exchange and other public-key key exchange techniques, Digital Signature Standard (DSS) incorporating the digital signature algorithm; ElGamal, elliptic curve cryptosystems, password-authenticated key agreement techniques, the Paillier cryptosystem, the RSA encryption algorithm (PKCS#1), the Cramer-Shoup cryptosystem, the NTRUEncrypt cryptosystem, the McEliece cryptosystem, and other techniques. Other ciphers, such as the Advanced Encryption Standard (AES), AES in one of several modes such as GCM (Galois Counter Mode) or CCM (Counter with CBC-MAC mode), Transport Layer Security (TLS) and/or others may also be used. Providing the public key may be performed by providing an appropriate entity the public key for use. For example, referring to the environment 1900 described above in connection with FIG. 19, providing the public key may include providing the public key to another security module having access to a domain key, where the security module is operable to encrypt the domain key under the public key, assuming that a request to the security module to encrypt the domain key is able to be fulfilled (e.g., because quorum and/or other conditions are fulfilled). Providing the public key to the security module may be performed indirectly, e.g., by providing the public key to an operator that then provides the public key to the security module. Indirectly providing the public key to another security module may be performed, for example, when security modules are configured to be unable to communicate with one another or to have a limited communication with one another.

After the public key has been provided and as otherwise has been used by one or more other entities, the process 2200 may include receiving 2208 a domain key encrypted under the public key. As noted above, the domain key may have been encrypted by another security module so that the domain key never leaves a security module in unencrypted form. In an embodiment, the process 2200 accordingly includes using 2210 a private key to decrypt the domain key. Using 2210 the private key to decrypt the domain key may be performed in any suitable manner and may vary according to the cryptographic technique(s) which were used to encrypt the domain key.

In an embodiment, the process 2200 includes importing 2212 one or more customer keys encrypted under the domain key. Importing 2212 one or more customer keys may be performed in any suitable manner such as by receipt of the one or more customer keys over a network. While illustrated as a discrete block in the process 2200 illustrated in FIG. 22, importing the one or more customer keys may be performed as a multi-step process over a period of time. For example, one customer key may be imported at one time and, at another time, another customer key may be imported. Further, as illustrated, as subsequent to receiving and decrypting the domain key, it should be noted that the domain key may be imported at other times such as before the domain key is received 2208 and/or decrypted 2210. As with other operations, importation of the customer keys may be provided to the security module performing the process 2200 by another security module, through an operator in embodiments where the security modules are not able to communicate customer keys directly with one another.

Customer keys may also be imported in other ways. For example, customer keys may be encrypted under the public key discussed above (and subsequently decrypted using a suitable private key).

In embodiments when the one or more customer keys are encrypted under the domain key, the process 2200 includes using 2214 the domain key to decrypt one or more of the imported customer keys. Further, the process 2200 includes using 2216 the decrypted customer keys to perform cryptographic operations.

Figure 23:
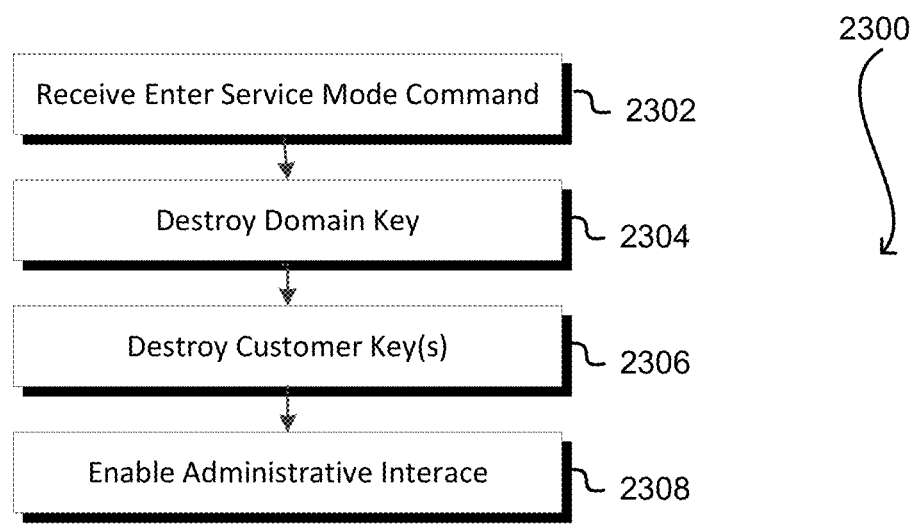
FIG. 23 shows example steps of a process for entering a service mode in accordance with at least one embodiment.

FIG. 23 shows an illustrative example of a process 2300 of entering service mode (e.g., from use mode) in accordance with at least one embodiment. As with the process 2200 described above in connection with FIG. 22, the process 2300 may be performed by a security module such as the security module described above. In an embodiment, the process 2300 includes receiving 2302 a request to enter service mode. Receiving 2302 a request to enter service mode may be performed in any suitable manner. For example, the request may originate from an operator such as described above.

The process 2300 in an embodiment includes destroying 2304 a domain key stored by the security module performing the process 2300. Destroying the domain key may be performed in any suitable manner. For example, in some instances, destroying the domain key may include overwriting memory in which the domain key stored. Destroying the domain key may be performed in other ways such as by cutting electrical power to volatile memory in which the domain key is stored, thereby causing the domain key to cease to be stored in the volatile memory. As yet another example, the domain key may be encrypted and a key used to encrypt the domain key may be destroyed. Generally, any way of permanently causing a security module performing the process 2300 to lose access of the domain key may be used to destroy the domain key.

As illustrated in FIG. 23, the process 2300 also includes destroying 2306 one or more customer keys stored by the security module performing the process 2300. Destroying the customer keys may be performed in any suitable manner such as manner described above. Further, the domain keys and customer keys may be destroyed in different ways, such as if the domain key and customer keys are respectively stored in different types of memory. For instance, if customer keys are stored in an SSD, destroying the customer keys may be performed by issuing a SecureErase request to the SSD over a SATA bus. Generally, destroying customer keys and domain keys may be performed in any suitable manner.

In an embodiment, the process 2300 includes enabling 2308 an administrative interface of the security module performing the process. The security module, for example, may be configured to only enable the administrative interface once the domain key and customer keys have been destroyed. Enabling the administrative interface of the security module performing the process 2300 may include reconfiguring the security module to accept administrative requests.

It should be noted that, with all processes described herein, variations are considered as being within the scope of the present disclosure. For example, the process 2300 illustrates one example of how a security module may transition into service mode from another mode such as use mode. However, other ways of transitioning into service mode may be performed in addition to or as an alternative to the process 2300 described above and variations thereof. For example, in some embodiments, a security module is configured to only store customer keys in volatile memory. Causing the security to enter service mode may be performed by causing the security module to perform a reboot operation. The reboot operation may be caused in any suitable manner such as by transmitting a reboot request to the security module and/or by cutting power from the power supply to the security module, thereby causing the security module to perform a boot sequence. In this manner, in various embodiments, once power is cut, customer keys stored in volatile memory will be lost.

As yet another example, the security module may be configured to store customer keys in encrypted form where each of the customer keys is encrypted by the domain key. When a customer key is needed for the purpose of performing cryptographic operations under the customer key, the domain key may be used to decrypt the customer key for use. The unencrypted customer key may be destroyed in any suitable manner (or at least maintained only in volatile memory and not in non-volatile memory), once the one or more cryptographic operations have been performed. In this manner, the security module maintains the customer keys in an encrypted state and only stores decrypted customer keys as needed for the performance of cryptographic operations.

In such embodiments, destroying 2304 the domain key and destroying 2306 the customer keys may be performed in a single operation of destroying the domain key since destruction of the domain key causes the security module to lose access to the customer keys which are stored in encrypted form with the domain key needed for encryption. Similarly, in such embodiments, rebooting the security module causes the domain key to be destroyed, thereby causing the security module to lose access to the customer keys. Further, in such examples, the security module may store the encrypted customer keys while in service mode. Once the security module leaves service code, the security module may reimport the domain key for use in decrypting the customer keys.

As discussed above, various embodiments of the present disclosure involve operating a cryptography service in a manner that utilizes the concept of a cryptographic domain. A cryptographic domain (sometimes referred to as a security domain) may be considered as a container in which customer keys exist. A cryptographic domain may have one or more security modules as members, one or more operators capable of executing API calls against the cryptographic domain, and one or more domain keys which protect customer keys within the cryptographic domain. A cryptographic domain may be identified by a cryptographic fingerprint that can only be produced by members of the cryptographic domain, that is, a cryptographic fingerprint that cannot be practically forged by non-members of the domain absent extraordinary measures. A cryptographic module may be a member or more cryptographic domains.

Figure 24:
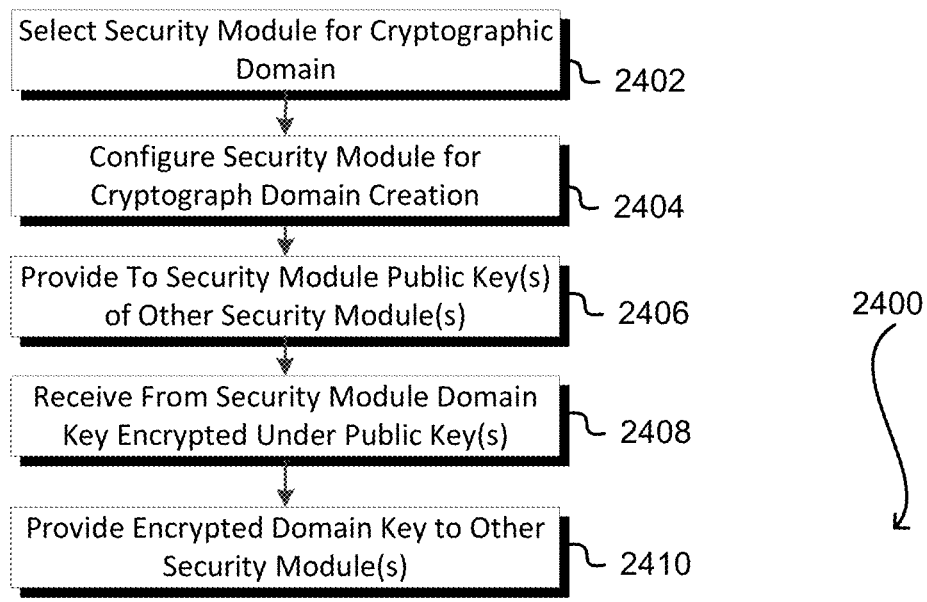
FIG. 24 shows example steps of a process for creating a cryptographic domain in accordance with at least one embodiment.

FIG. 24 shows an illustrative example of a process 2400 for creating a cryptographic domain. Process 2400 may be performed by any suitable system such as suitable components of a cryptography service configured to interact with operators of the cryptography service for administrative purposes. For example, referring to FIG. 19, the process 2400 may be performed by the cryptography service frontend and request processor, in connection with input provided by one or more operators. In an embodiment, the process 2400 includes selecting 2402 a security module for the cryptographic domain that is going to be created. Selection of the security module may be performed in any suitable manner. For example, a system performing the process 2400 may receive an electronic request with an identifier of the security module to be selected. The submitter of the request, such as an operator, may have specified the security module.

The process 2400, as illustrated, includes configuring 2404 a selected security module for cryptographic domain creation. Configuring 2404 the security module for cryptographic domain creation may be performed in any suitable manner and may include performance of administrative tasks to prepare the security module to be a member of a cryptographic domain that is being created. For example, configuring the security module for creation of the cryptographic domain may include causing the security module to be in service mode. Similarly, configuring the security module for cryptographic domain creation may also include providing information to the security module information about the cryptographic domain being created. The information may be provided, for example, as a domain token which contains an identity of the domain. Similarly, configuring the security model for cryptographic domain creation may also include providing quorum rules to the security module to enable the security module to verify that electronic requests submitted by operators have been signed by a quorum in accordance with the provided quorum rules. Generally, any way of configuring 2404 the security module may be performed and may include additional operations not discussed herein.

As noted above, many embodiments include cryptographic domains supported by multiple security modules. Accordingly, in an embodiment, the process 2400 includes providing the security module one or more public keys of one or more other security modules to be used in supporting the cryptographic domain. While not illustrated as such, providing the one or more public keys of the one or more other security modules may also include obtaining the one or more public keys from the respective security modules. Further, configuring the security module for cryptographic domain creation may include transmitting a request to the security module that causes the security module to generate a domain key for the cryptographic domain.

Once a public key has been provided 2406 to the security module, the security module may use its domain key for the cryptographic domain to encrypt the domain key under the received public key. The security module may do this for each public key that has been provided to the security module. Accordingly, the process 2400, in an embodiment, includes receiving 2408 from the security module the domain key encrypted under one or more public keys. Receiving the domain key encrypted under the public keys may also include other information such as respective identifiers of security modules for which the domain key has been encrypted. In other words, when the security module provides an encrypted domain key, it may also provide information identifying the security module operable to decrypt the domain key. The one or more encrypted domain keys received 2408 from the security module may then be provided 2410 to one or more other security modules. It should be noted that while not illustrated as such, additional operations may be performed. For example, other security modules may be configured for joining the cryptographic domain being created. Similarly, providing 2410 the encrypted domain key to one or more other security modules may include obtaining electronic signatures of a quorum of operators. The quorum being specified by quorum rules provided to the security module used to create the cryptographic domain.

Figure 25:
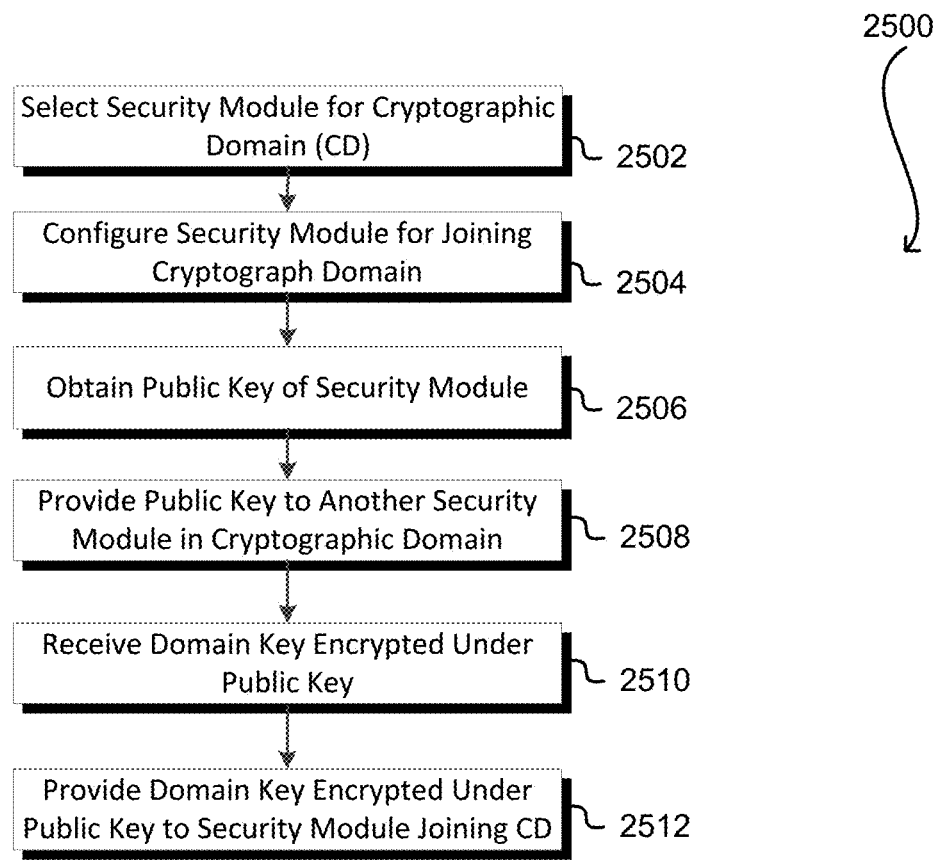
FIG. 25 shows example steps of a process for joining a security module to a cryptographic domain in accordance with at least one embodiment.

FIG. 25 shows an illustrative example of a process 2500 which may be used to join a security module to an existing cryptographic domain. The process 2500 may be performed by any suitable system, such as a system that performs the process 2400 described above. In an embodiment, the process 2500 includes selecting 2502 a security module for the cryptographic domain. Selecting 2502 the security module may be performed in any suitable manner, such as in accordance with operator instructions that specify the security module to be joined to the cryptographic domain. In an embodiment, the process 2500 includes configuring 2504 the selected security module for the joining the cryptographic domain. Configuring 2504 the security module for joining the cryptographic domain may be performed in any suitable manner and may include operations such as causing, if necessary, the security module to be in service mode providing information identifying the domain and characteristics of the domain to the security module providing quorum rules to the security module and/or performing any other operations required by a system implementing various embodiments of the present disclosure.

In an embodiment, the process 2500 includes obtaining a public key of the security module that is to be joined to the cryptographic domain. Obtaining the public key may be performed in any suitable manner, such as by transmitting an electronic request for the public key to the security module and/or accessing the public key from other memory outside of the security module if the public key is stored therein. Once the public key of the security module has been obtained 2506, the process 2500 may include providing 2508 the public key to another security module in the cryptographic domain, that is the public key may be provided to another security module that has already joined the cryptographic domain and, generally, the process 2500 may include providing the public key to any system that has access to the domain key of the cryptographic domain which, in various embodiments, can only be another security module that has already joined the cryptographic domain.

The process 2500 in an embodiment includes receiving 2510 the domain key encrypted under the public key. Receiving 2510 the domain key encrypted under the public key may be performed by receiving an electronic transmission of the encrypted domain key from the security module to which the public key was provided. Accordingly, process 2500 includes providing 2512 the domain key encrypted under the public key to the security module that is joining the cryptographic domain. In this manner, the security module that is joining the cryptographic domain may utilize a private key in its possession that is inaccessible to other security modules and generally to other systems to decrypt the domain key and to further operate in accordance with the domain key, such as described elsewhere herein. As noted above, various embodiments of the present disclosure allows sets of keys to be managed concurrently by multiple security modules. Accordingly, various embodiments of the present disclosure involve secure passage of customer keys from one security module to another in a cryptographic domain, thereby ensuring that security modules in a cryptographic domain have access to the same set of customer keys.

It should be noted that the process described above, and variations thereof, for providing the domain key may be modified for the purpose of rotating the domain key as an additional security measure. For example, a security module can be instructed to generate a new domain key and the process described above can be used to provide the domain key to other security modules in the domain. A cryptography service can be configured to rotate the domain key on schedule which may result in rotation on a regular or irregular basis.

Figure 26:
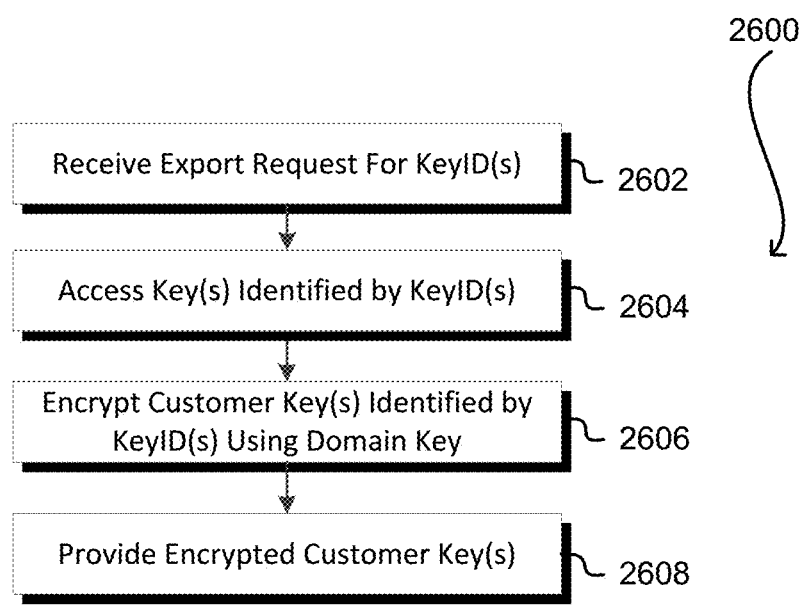
FIG. 26 shows example steps of a process for exporting customer keys in accordance with at least one embodiment.

FIG. 26, accordingly, shows an illustrative example of a process 2600 which may be used to provide one or more customers keys from one security module to another in a cryptographic domain. The process 2600 may be performed by a security module that has joined a cryptographic domain such as described above. In an embodiment, the process 2600 includes receiving 2602 an export request for one or more KeyIDs. The export request may specify a plurality of KeyIDs, such as by listing the KeyIDs explicitly, specifying a range of KeyIDs, and/or by specifying, explicitly or implicitly, that all customer keys for a specified cryptographic domain should be provided. Further, the export request may be made by an operator involved in administering the cryptographic domain.

While not illustrated as such, the process 2600 may include additional operations, such as verifying an electronic signature of the request and/or verifying whether electronic signatures of a quorum required for the request have been provided. Generally, other operations, including operations involving determining the request's authenticity, may be performed. The process 2600 in an embodiment includes accessing 2604 one or more keys identified by respective KeyIDs in the request that was received 2602. Accessing 2604 the one or more keys identified by the one or more received KeyIDs may be performed, such as by accessing 2604 the keys from an SSD or other memory utilized by the security module performing the process 2600. In an embodiment, the process 2600 includes encrypting 2606 the accessed one or more customer keys identified by the respective one or more KeyIDs using the domain key for the cryptographic domain. The one or more encrypted customer key(s) may then be provided 2608 in response to the export request. The encrypted customer key(s) may be provided in a token that includes information identifying the cryptographic domain to which the key(s) belong.

It should be noted that as with all processes described herein, variations of the process 2600 are considered as being within the scope of the present disclosure. For example, as noted above, in some embodiments, a security module stores customer keys in encrypted form, the customer keys being encrypted under the domain key. In response to an export request, the security module may simply provide the encrypted keys. Thus, the process 2600 may omit encrypting the customer keys if the customer keys have already been encrypted. Once the encrypted customer keys have been provided, a security module that has received the customer keys may decrypt the customer keys using the domain key when appropriate in accordance with the various embodiments.

Further, a cryptography service may provide additional features. In some embodiments, for example, customers are able to request that a cryptography service shred (destroy) one or more keys identified by a KeyID. Such a request may result in a loss of access to the identified key(s), such as described above. In some embodiments, a cryptography service frontend and request processor reconfigures itself so that future requests to use the KeyID(s) are denied. Once the cryptography service destroys the key(s) by instructing the appropriate security modules to destroy their copies of the keys, the cryptography service may provide a verification that the key(s) were destroyed.

Further, customers in some embodiments are able to utilize various APIs to cause a cryptography service to perform other operations. One example is an API call that allows a customer to request that the cryptography service create and expose a key. The cryptography service may create a key and return the key in plaintext (or in a form that allows the customer to obtain the plaintext without undue computational expense). Keys provided in this manner may be marked in the cryptography service as "exposed," so that their use can be avoided. For example, a policy on an exposed key may prevent certain operations to be performed in connection with exposed keys due to their greater potential to be used in a security breach.

In some embodiments, customers are able to request a description of a key specified key, which causes the cryptography service to retrieve metadata for a key which may include the key's KeyID, specifications for the key (e.g., the cryptosystem for which the key is configured and/or a mode for the cryptosystem), and a usage mask which specifies which operations can or cannot be performed by the key. A customer may also request that the cryptography service provide a list of KeyIDs that the cryptography service manages on behalf of the customer. As another example of a feature, a customer may request that the cryptography service derive a new key from a key identified by a KeyID. The cryptography service may provide a token that identifies the derived key with its KeyID. In some instances the customer is able to specify that the derived key be exposed and, in such instances, the token may encode the derived key. Customers may also revoke keys identified by their KeyIDs. Such a request may be similar to a shred/destroy request, but may result in the key remaining stored by the cryptography service. Revoked keys may be identified in the cryptography service as revoked, but may remain stored encrypted under a domain key until the domain key is destroyed.

Customers may also request that the cryptography service perform other cryptographic operations under keys identified by a KeyID other than encryption and decryption, such as generation of electronic signatures under keys. For instance, a request to sign a message may cause the cryptography service to provide the message to a security module which may then compute an electronic signature (e.g., using HMAC_Sha256) to be provided to the customer.

Similarly, customers may provide the cryptography service an electronic signature for verification. The cryptography service may cause a security module to compute a reference signature for comparison with the signature provided by the customer and, if the signatures match, the customer may be provided information indicating that the signature is valid. As alternative, the customer-provided signature may be provided to the security module with appropriate information to enable the security module to determine whether the signature is valid and provide information indicating whether the signature is valid accordingly. Other cryptographic operations that customers may request include requests for the cryptography service, with appropriate participation of a security module, generate random bytes (with customer-specified length) and encrypt the random bytes. The cryptography service may provide both the ciphertext and plaintext.

As noted above, various embodiments of the present disclosure include audit-related operations. For example, in various embodiments, operators are allowed to request that a security module provide a list of all log file names for log files maintained on the device. A request for the security module to describe the log may cause a security module to provide a hash of a log (identified by a LogID) and its size. Requests may also be made to obtain a log from a device (or a portion thereof, if only a portion is specified in the request). In some embodiments, operators are allowed to request that a security module delete a log identified by a LogID. Policy may limit fulfillment of this request. For example, in some embodiments, a log file can only be deleted after the log has ceased to be written to. Other requests allow an operator to obtain a status of a security module, which may cause the security module to provide information about itself, such as the amount of disk storage space used, amount of disk storage space remaining, the number of keys stored on the disk, the amount of volatile memory storage space used, and/or other information about the security module. In some embodiments, logs may not be deletable for some amount of time, in some embodiments, deleting a log requires proof that it has been durably stored.

Further, various embodiments of the present disclosure allow various operations in connection with management of a cryptographic domain. Requests may be made, for example to create a cryptographic domain, such as described above. Such requests may specify the set of operators allowed to submit requests to the domain, operator quorum rules for each (or all) operations. A separate API call to ingest the cryptography domain may be required for completion of domain creation using a security module. Requests may also be made to add member security modules to the domain. Such a request may include a public key of the member being added for use such as described above. A response to the request may include a token containing the updated domain that may be ingested, by a separate API call, by the new member (who decrypts encrypted information using its corresponding private key). As another example, an API call may be made to remove a member from a cryptography domain. A response to such an API call may include a token containing information encoding the updated cryptography domain. A subsequent API call to remaining member(s) in the cryptography domain may be required to provide the updated domain to that/those member(s). Similarly, an API call to add an operator may be used to add an operator to a cryptography domain. Such an API call may include a public key of the operator and a mask containing the permissions the operator should possess. A response to such an API call may include a token encoding the updated cryptography domain and, as with adding a member of the cryptography domain, a separate API call (or multiple calls) may be required to inform the members of the cryptography domain of the update to the cryptography domain.

Other API calls that may be made by operators include API calls that cause a security module to produce a new domain key and add it to the cryptography domain. A response may include a token that encodes the updated domain and, as with other API calls, separate API calls and/or other operations may be required to inform other security modules of the updated domain key. Other examples include API calls that cause a domain key for a cryptographic domain to be retired. Such an API call may result in removal of the oldest domain key from the domain. A response to the API call may include a token encoding the updated domain. In some embodiments, domain keys have a forced minimum lifespan, which may be on the order of several minutes or hours, before they may be retired.

Some API calls available to operators allow other management functions to be performed. For example, an API call may be used to initialize a cryptographic domain for the first time. Initialization of a security module may include "wiping" previously stored information on the security module. Initialization may result in an attestation of the overall state of the security module to be provided which, in some embodiments, operators must inspect before the security module can be added to a cryptographic domain. Initialization may also provide the security module a "friendly name" which may allow use of the friendly name instead of more cumbersome information, such as an IP address or other identifier which may lack semantic meaning Other API calls may include calls for causing a security module to ingest a cryptographic domain (by providing a token encoding information about the cryptographic domain). In some embodiments, a security module must be listed in the cryptographic domain before the security module can successfully ingest the cryptographic domain. Other API calls include calls that cause a security module to provide a domain token for a cryptographic domain, list cryptographic domains of which a security module is a member, provide an attestation of a security module's hardware and software (which may be generated by a TPM on the security module). Other variations are also considered as being within the scope of the present disclosure.

Figure 27:
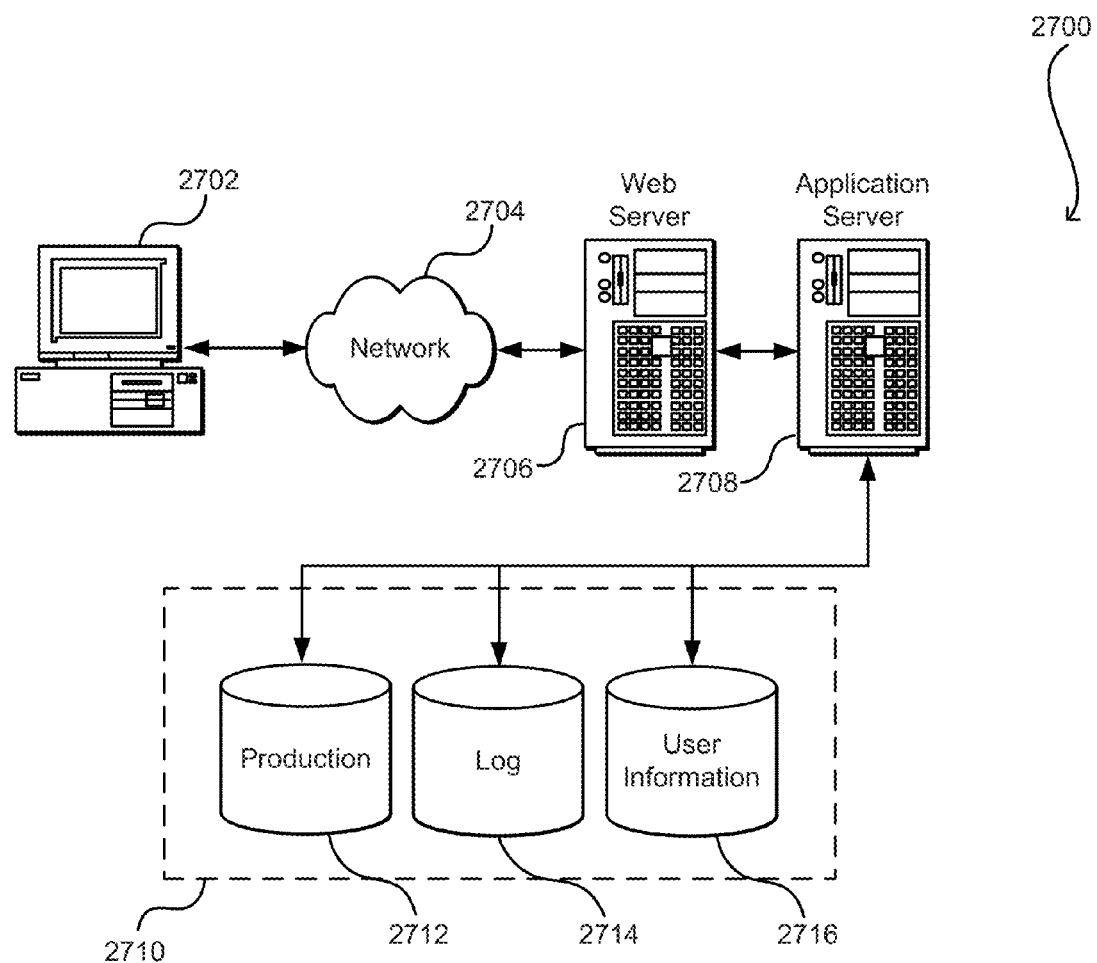
FIG. 27 shows an illustrative example of an environment in which various embodiments may be practiced.

FIG. 27 illustrates aspects of an example environment 2700 for implementing aspects in accordance with various embodiments. As will be appreciated, although a Web-based environment is used for purposes of explanation, different environments may be used, as appropriate, to implement various embodiments. The environment includes an electronic client device 2702, which can include any appropriate device operable to send and receive requests, messages or information over an appropriate network 2704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 2706 for receiving requests and serving content in response thereto, although for other networks an alternative device serving a similar purpose could be used as would be apparent to one of ordinary skill in the art.

The illustrative environment includes at least one application server 2708 and a data store 2710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 2702 and the application server 2708, can be handled by the Web server. It should be understood that the Web and application servers are not required and are merely example components, as structured code discussed herein can be executed on any appropriate device or host machine as discussed elsewhere herein.

The data store 2710 can include several separate data tables, databases or other data storage mechanisms and media for storing data relating to a particular aspect. For example, the data store illustrated includes mechanisms for storing production data 2712 and user information 2716, which can be used to serve content for the production side. The data store also is shown to include a mechanism for storing log data 2714, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 2710. The data store 2710 is operable, through logic associated therewith, to receive instructions from the application server 2708 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 2702. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein. In some embodiments, an operating system may be configured in accordance with or validated under one or more validation regimes such as Evaluation Assurance Level (EAL) level 4.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 27. Thus, the depiction of the system 2700 in FIG. 27 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available models and protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including, without limitation, those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as random access memory ("RAM") or read-only memory ("ROM"), as well as removable media devices, memory cards, flash cards, etc. Various embodiments of the present disclosure may also be implemented using custom hardware including, but not limited to, custom cryptographic processors, smart cards and/or hardware security modules.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for key management, comprising:
   under the control of a computer system configured with executable instructions,
   storing a plurality of keys in memory of the computer system;
   storing a first set of information in volatile memory without storing the first set of information in non-volatile memory, the first set of information comprising a key used to encrypt the plurality of keys and being sufficient to access the plurality of keys in plaintext form;
   using keys from the plurality of keys to respond to requests to perform cryptographic operations;
   detecting an event, the event triggering a transition of the computer system into an administrative mode in which one or more administrative operations are permissible as a result of being in the administrative mode;
   deleting the first set of information from the computer system by at least removing power to the volatile memory so that the plurality of keys is inaccessible to the computer system in plaintext form while the computer system is in the administrative mode;
   after deleting the first set of information, enabling the administrative mode;
   entering and subsequently leaving the administrative mode;
   after leaving the administrative mode, obtaining a second set of information usable to restore access to the plurality of keys, so that the plurality of keys is accessible to the computer system in plaintext form; and
   using the obtained second set of information to access at least one key from the plurality of keys.

2. The computer-implemented method of claim 1, wherein deleting the first set of information includes issuing, to a data storage device, a command to perform a confirmable erase operation.

3. The computer-implemented method of claim 1, wherein the volatile memory is a register of a processor of the computer system.

4. The computer-implemented method of claim 1, wherein deleting the first set of information results in the plurality of keys remaining stored by the computer system in encrypted form while the computer system is in the administrative mode.

5. The computer-implemented method of claim 1, wherein:
   the computer system includes a first processor connected by a bus to a data storage device of a data storage subsystem; and
   deleting the first set of information includes transmitting over the bus, from a second processor that is part of the data storage subsystem, a command to the data storage device to delete the first set of information.

6. The computer-implemented method of claim 1, wherein obtaining the second set of information includes receiving the information from a security module different from the computer system.

7. The computer-implemented method of claim 1, wherein obtaining the second set of information requires intervention by an operator of the computer system.

8. The computer-implemented method of claim 1, wherein the computer system is a security module device.

9. A computer-implemented method for key management, comprising:
   under the control of a computer system configured with executable instructions,
   storing secret information comprising a plurality of keys in memory of the computer system, at least a subset of the plurality of keys used to perform cryptographic operations to respond to requests;
   storing a key used to encrypt the plurality of keys in volatile memory without storing the key in non-volatile memory, the key being usable to access the plurality of keys in plaintext form;
   detecting an event, the event triggering a transition of the computer system into an administrative mode in which one or more administrative operations are permitted as a result of transitioning into the administrative mode; and as a result of detecting the event,
    rendering the key inaccessible to the computer system while in the administrative mode by at least removing power to the volatile memory; and
    after rendering the key inaccessible to the computer system, enabling the administrative mode;
entering and subsequently leaving the administrative mode;
rendering the key accessible to the computer system at a time after leaving the administrative mode; and
using the key to access at least one key from the plurality of keys.

10. The computer-implemented method of claim 9, wherein rendering the information inaccessible includes issuing, to a data storage device, a command to perform a confirmable erase operation.

11. The computer-implemented method of claim 9, wherein the volatile memory includes a register of a processor of the computer system.

12. The computer-implemented method of claim 11, wherein:
    the plurality of keys, encrypted under the key, is persistently stored in a data storage device of the computer system.

13. The computer-implemented method of claim 9, further comprising:
    detecting a tamper event indicating intrusion into the computer system; and
    as a result of detecting the tamper event, deleting the information.

14. The computer-implemented method of claim 13, wherein:
    the computer system includes a first processor in communication, over a bus, with a storage device comprising the memory; and
    deleting the information includes transmitting over the bus, from a second processor that is part of a data storage subsystem, a command to a data storage device.

15. The computer-implemented method of claim 9, wherein deleting the information includes deleting the secret information from the memory of the computer system.

16. A non-transitory computer-readable storage medium having stored thereon instructions that, as a result of execution by a processor of a computer system, cause the computer system to at least:
    store secret information comprising a plurality of keys in memory of the computer system, at least a subset of the plurality of keys used to perform cryptographic operations to respond to requests;
    store a key used to encrypt the plurality of keys in volatile memory without storing the key in non-volatile memory, the key being usable to access the plurality of keys in plaintext form;
    detect an event, the event triggering a transition of the computer system into an administrative mode in which an operator can access contents of the memory; and
    as a result of detecting the event,
        cause the key to be inaccessible to the computer system while in the administrative mode by at least removing power to the volatile memory so that the plurality of keys is inaccessible to the computer system in plaintext form while the computer system is in the administrative mode; and
        enable the administrative mode after the secret information in plaintext form is inaccessible to the computer system;
    leave the administrative mode;
    after leaving the administrative mode, obtain the key so that the plurality of keys is accessible to the computer system; and
    use the key to access at least one key from the plurality of keys.

17. The non-transitory computer-readable storage medium of claim 16, wherein the computer-readable storage medium encodes the instructions such that they are executable by at least two different processors, each processor of the at least two different processors having a different internal architecture that implements a same instruction set architecture.

18. The non-transitory computer-readable storage medium of claim 16, wherein the event is a reboot event.

19. The non-transitory computer-readable storage medium of claim 16, wherein:
    the key is a first key;
    the instructions further cause the computer system to:
        provide a public key;
        obtain, from an operator of the computer system, the first key encrypted under the public key by another computer system; and
        use a private key to decrypt the first key encrypted under the public key.

20. The non-transitory computer-readable storage medium of claim 16, wherein the instructions include instructions that run in user-mode of a general purpose operating system.

21. A system, comprising:
    hardware including one or more processors and memory including instructions executable by the one or more processors, the hardware being configured so that the system:
        stores secret information comprising a plurality of keys in memory of the system, at least a subset of the plurality of keys used to perform cryptographic operations to respond to requests;
        stores a key used to encrypt the plurality of keys in volatile memory without storing the key in non-volatile memory, the key being usable to access the plurality of keys in plaintext form;
        as a result of an event triggering a transition of the system into an administrative mode in which an operator can access contents of the memory:
            cause the key to be inaccessible to the system while in the administrative mode by at least removing power to the volatile memory so that the plurality of keys is inaccessible to the system in plaintext form while the system is in the administrative mode; and
            enable the administrative mode after the secret information in plaintext form is inaccessible to the system;
        leave the administrative mode;
        after leaving the administrative mode, obtain the key so that the plurality of keys is accessible to the system; and
        use the key to access at least one key from the plurality of keys.

22. The system of claim 21, wherein the event is a command to enter the administrative mode.

23. The system of claim 21, wherein at least some of the instructions are executable by at least two different processors of the one or more processors, each processor of the at least two different processors having a different internal architecture that implements a same instruction set architecture.

24. The system of claim 21, wherein the event is a restoration of power to the system.

25. The system of claim 21, wherein the event is a reboot event.

26. The system of claim 21, wherein the system is a hardware security module.

27. The system of claim 21, wherein the hardware is further configured so that the system, as a result of the event, overwrites at least a portion of the volatile memory.

28. The system of claim 21, wherein the hardware is further configured so that the system obtains the key from another system so that the plurality of keys is accessible to the system.

29. The system of claim 21, wherein the event is a tamper event indicating physical intrusion into the system.

30. The system of claim 21, wherein the volatile memory includes a register of a processor of the one or more processors.

* * * * *